United States Patent
Sugiyama et al.

(10) Patent No.: US 7,951,430 B2
(45) Date of Patent: May 31, 2011

(54) CELLULOSE ACYLATE FILM, POLARIZING PLATE AND LIQUID CRYSTAL DISPLAY DEVICE

(75) Inventors: Susumu Sugiyama, Minami-ashigara (JP); Osamu Uchida, Minami-ashigara (JP); Kousuke Hashimoto, Minami-ashigara (JP); Katsumi Sasata, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 819 days.

(21) Appl. No.: 11/817,486

(22) PCT Filed: Mar. 3, 2006

(86) PCT No.: PCT/JP2006/304664
§ 371 (c)(1),
(2), (4) Date: Aug. 30, 2007

(87) PCT Pub. No.: WO2006/093346
PCT Pub. Date: Sep. 8, 2006

(65) Prior Publication Data
US 2009/0051856 A1    Feb. 26, 2009

(30) Foreign Application Priority Data
Mar. 3, 2005    (JP) .................... 2005-058422

(51) Int. Cl.
*C09K 19/40* (2006.01)
(52) U.S. Cl. ........................................ 428/1.1
(58) Field of Classification Search .............. None
See application file for complete search history.

(56) References Cited

U.S. PATENT DOCUMENTS

| | | | | |
|---|---|---|---|---|
| 6,630,973 B1 * | 10/2003 | Matsuoka et al. | ............ | 349/117 |
| 2004/0233363 A1 * | 11/2004 | Murayama et al. | ............ | 349/117 |
| 2006/0093759 A1 * | 5/2006 | Fukagawa | .................... | 428/1.31 |

FOREIGN PATENT DOCUMENTS

| | | |
|---|---|---|
| JP | 02-176625 A | 7/1990 |
| JP | 10-34742 A | 2/1998 |
| JP | 2003-43250 A | 2/2003 |
| JP | 2003-215337 | 7/2003 |
| JP | 2004-315605 A | 11/2004 |
| WO | WO 2006004197 A1 * | 1/2006 |

OTHER PUBLICATIONS

International Search Report for PCT/JP2006/304664, dated May 29, 2006.
Written Opinion for PCT/JP2006/304664, dated May 29, 2006.
International Preliminary Report and Patentability of PCT/JP2006/304684 dated Sep. 11, 2007.
International Search Opinion of PCT/JP2006/304664.
Office Action from Japanese Patent Office issued in Applicant's corresponding Japanese Patent Application No. 2005-058422 dated Aug. 31, 2010.

* cited by examiner

*Primary Examiner* — D. Lawrence Tarazano
*Assistant Examiner* — Nicole T Gugliotta
(74) *Attorney, Agent, or Firm* — Buchanan Ingersoll & Rooney PC

(57) ABSTRACT

A cellulose acylate film comprising a retardation developing agent consisting of a rod-shaped compound, wherein Re is 50 to 100 nm, Rth is 130 to 250 nm, and the thickness is 40 to 90 μm. A liquid crystal display device comprising the film shows reduced the corner irregularity.

9 Claims, 1 Drawing Sheet

CELLULOSE ACYLATE FILM, POLARIZING PLATE AND LIQUID CRYSTAL DISPLAY DEVICE

TECHNICAL FIELD

The present invention relates to a cellulose acylate film used for optical use, a polarizing plate using the cellulose acylate film, and a liquid crystal display device comprising the polarizing plate.

BACKGROUND ART

In general, a liquid crystal display device (LCD) comprises a liquid crystal cell and polarizer. The polarizer comprises protective films and a polarizing film, and is obtained by staining a polarizing film made of a polyvinyl alcohol film with iodine, stretching the polarizing film, and laminating protective films on both sides of the polarizing film. In a transmissive liquid crystal display device, this polarizer is mounted on both sides of the liquid crystal cell, and one or more of optical compensation sheets may be also disposed. In a reflective liquid crystal display device, a reflective plate, a liquid crystal cell, one or more optical compensation sheets and a polarizer are disposed in the same order. The liquid crystal cell comprises liquid crystalline molecules, two sheets of substrates to enclose the molecules in between, and an electrode layer to apply voltage to the liquid crystalline molecules. The liquid crystal cell performs ON/OFF display on the basis of the difference in the orientation state of the liquid crystalline molecules, and there have been suggested display modes such as TN (twisted nematic), IPS (in-plane switching), OCB (optically compensatory bend), VA (vertically aligned) and ECB (electrically controlled birefringence), that are applicable both to the transmissive and reflective types.

Among these LCDs, for the uses where high display quality is needed, a 90° twisted nematic liquid crystal display device (hereinbelow, referred to as TN mode) which employs nematic liquid crystal molecules having positive dielectric anisotropy and is operated by a thin film transistor, are mainly used. However, the TN mode shows such viewing angle characteristics that although the devices have excellent display characteristics when viewed from the front, their display characteristics deteriorate when viewed from a tilted direction, in a manner such that the contrast is reduced, or there occurs tone reversal in which brightness is reversed in grayscale display, or the like. Thus, improvements in these characteristics are highly demanded.

In recent years, as a form of LCD having improvements in such viewing angle characteristics, there has been suggested a vertically aligned nematic liquid crystal display device (hereinbelow, referred to as VA mode), in which nematic liquid crystal molecules having negative dielectric anisotropy are employed such that the longer axes of the liquid crystal molecules are approximately aligned in a vertical direction on the substrate, without any voltage applied, and these liquid crystal molecules are operated by a thin film transistor (See JP-A No. 2-176625). This VA mode shows excellent display characteristics at a level equivalent to the TN mode when viewed from the front, and also exhibits expanded viewing angle characteristics due to the application of a retardation film for viewing angle compensation. It is also known that in the VA mode, even expanded viewing angle characteristics can be realized by using a uniaxially oriented retardation film having positive refractive index anisotropy and a negative uniaxial retardation film having the optical axis in a direction perpendicular to the film plane (See SID 97 DIGEST pp. 845-848)).

However, in such a VA mode liquid crystal display device, if the optical anisotropy of the transparent protective film (also accomplishing the role as a support) holding the retardation films and the polarizing plates is not designed to have an appropriate value, satisfactory viewing angle characteristics cannot be obtained. Furthermore, when the PVA film constituting the polarizing plate contracts under the effect of heat and humidity, stress is exerted on the transparent protective film holding the polarizing plate, whereby a change occurs in the optical anisotropy of the protective film itself. Thus, there have been failures, in particular, deteriorating the display quality of so-called corner spots, which is light leakage at four corners of the screen.

It is known that the corner irregularity is improved by reducing the thickness of a cellulose acylate film used as a protective film of a polarizing plate. However, it is disadvantageous that when the thickness is reduced, retaining a required value of retardation as an optical compensation film becomes difficult.

DISCLOSURE OF THE INVENTION

An object of the invention is to provide a liquid crystal display device, which shows reduced the corner irregularity, and has excellent display characteristics and viewing angle characteristics.

The means to achieve the above-mentioned objects are as follows.
[1] A cellulose acylate film comprising a retardation developing agent consisting of a rod-shaped compound, wherein
the in-plane retardation (Re) is in the range of 50 to 100 nm,
the retardation (Rth) in the thickness direction is in the range of 130 to 250 nm, and
the thickness is in the range of 40 to 90 μm.
[2] The cellulose acylate film as described in [1], wherein the film is stretched by 10% or more in the slow axis direction of the film or in the direction perpendicular to the slow axis.
[3] The cellulose acylate film as described in [1] or [2], wherein the rod-shaped compound is a compound represented by the following Formula (1),

Formula (1)

wherein, $Ar^1$ and $Ar^3$ are each independently an aryl group or an aromatic heterocyclic ring, $Ar^2$ is an arylene group or an aromatic heterocyclic ring, and $L^1$ and $L^2$ are each independently a single bond or a divalent linking group. n is an integer of 3 or greater, and $Ar^2$ and $L^2$ may be the same as or different from each other, respectively.
[4] The cellulose acylate film as described in [3], wherein the compound represented by Formula (1) is a compound represented by Formula (2), Formula (2)

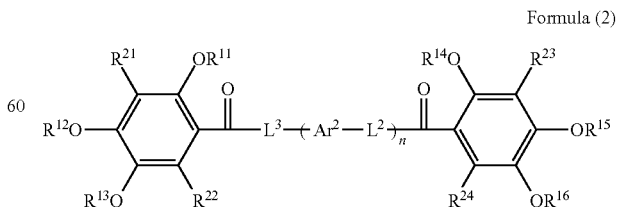

wherein, $R^{11}, R^{12}, R^{13}, R^{14}, R^{15}, R^{16}, R^{21}, R^{22}, R^{23}$ and $R^{24}$ are each independently a hydrogen atom or a substituent. $Ar^2$ is an arylene group or an aromatic heterocyclic ring, and $L^2$ and $L^3$ are each independently a single bond or a divalent linking group. n is an integer of 3 or greater, and $Ar^2$ and $L^2$ may be the same as or different from each other, respectively.

[5] The cellulose acylate film as described in any one of [1] to [4], wherein the cellulose acylate film satisfies the following numerical formulas (VI-a), (VI-b) and (IV):

$$2.0 \leq DS2+DS3+DS6 \leq 3.0 \quad \text{(VI-a)}$$

$$DS6/(DS2+DS3+DS6) \geq 0.315; \quad \text{(VI-b)}$$

and $$1.0 \leq D(MD)/D(TD) \leq 3.0 \quad \text{(VI)}$$

when DS2 represents the degree of substitution of a hydroxyl group by an acyl group at the 2-position of a glucose unit in the cellulose acylate film, DS3 represents the degree of substitution of a hydroxyl group by an acyl group at 3-position and DS6 represents the degree of substitution of a hydroxyl group by an acyl group at 6-position, D(MD) represents the thermal expansion coefficient of the cellulose acylate film in the MD direction, and D(TD) represents the thermal expansion coefficient of the cellulose acylate film in the TD direction.

[6] The cellulose acylate film as described in any one of [1] to [5], wherein the cellulose acylate film contains at least one of a plasticizer, an ultraviolet absorbent and a peel promoting agent.

[7] The cellulose acylate film as described in any one of [1] to [6], wherein the cellulose acylate film was subjected to uniaxial stretching, simultaneous biaxial stretching or sequential biaxial stretching.

[8] A polarizing plate, which comprises a polarizing film and a pair of protective films having the polarizing film disposed in between, wherein at least one sheet of the protective films is the cellulose acylate film as described in any one of [1] to [7].

[9] A liquid crystal display device, which comprises the cellulose acylate film as described in any one of [1] to [7] or the polarizing plate as described in [8].

[10] An OCB or VA mode liquid crystal display device, which comprises a liquid crystal cell and a pair of polarizing plates disposed on both sides of the liquid crystal cell, wherein the polarizing plate is the polarizing plate as described in [8].

[11] A VA mode liquid crystal display device, which comprises the polarizing plate as described in [8] on a backlight side.

According to an aspect of the invention, a liquid crystal display device having excellent viewing angle characteristics, reduced corner irregularity and high display quality can be provided.

BEST MODE FOR CARRYING OUT THE INVENTION

Figure 1:
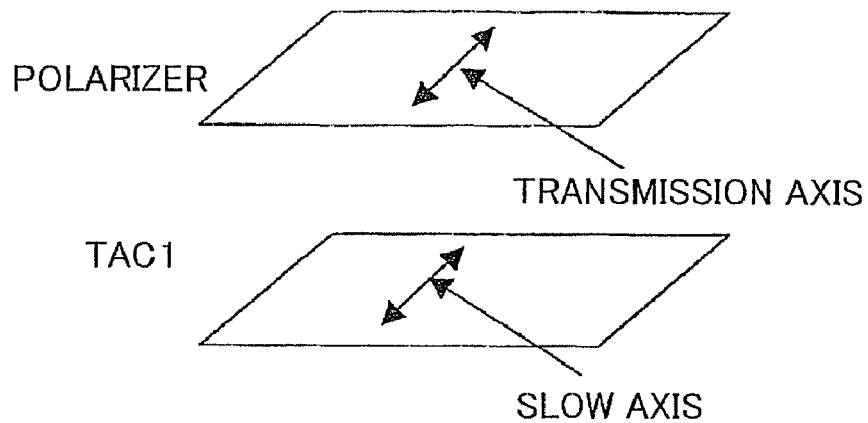
FIG. 1 is a schematic diagram illustrating a method for laminating a cellulose acylate film in producing the polarizing plate of the invention.

Hereinbelow, the invention will be described in detail. The description of the constitutional requirements as described below is based on the representative embodiments of the invention, but the invention is not limited thereto. In addition, the numerical range using 'to' herein means the range including the values denoted after and before 'to' as a lower limit value and an upper limit value.

In the invention, $Re(\lambda)$ and $Rth(\lambda)$ are a front retardation and a retardation in the thickness direction at the wavelength $\lambda$ nm, respectively. $Re(\lambda)$ is measured by entering light having a wavelength of $\lambda$ nm in the normal direction of the film in the KOBRA 21ADH, trade name (manufactured by Oji Scientific Instruments Co. Ltd.). $Rth(\lambda)$ is calculated by using the KOBRA 21ADH, on the basis of retardation values measured in three directions, that is, the $Re(\lambda)$, a retardation value measured by entering the light of wavelength $\lambda$ nm in the direction inclined to +40° over the normal direction of the film, with the in-plane retarded axis (judged by the KOBRA 21ADH) as an inclined axis (an axis of rotation), and a retardation value measured by entering the light of wavelength $\lambda$ nm in the direction inclined to −40° over the normal direction of the film, with the in-plane retarded axis as an inclined axis (an axis of rotation), an assumed value of an average refractive index and a film thickness input. Herein, an assumed value of an average refractive index may use a value in various optical film catalogs and Polymer Handbook (JOHN WILEY&SONS, INC.). As to an average refractive index value other than an existent one, it can be measured using ABBE Refractometer. The value of average refractive index for the main optical films is as follows: Cellulose acylate (1.48), Cycloolefin polymer (1.52), Polycarbonate (1.59), Polymethyl methacrylate (1.49), and Polystyrene (1.59).

With respect to the cellulose acylate film in the invention, the average refractive index of 1.48 is used.

The cellulose acylate film of the invention comprises a retardation developing agent consisting of a rod-shaped compound, and the in-plane retardation (Re) is in the range of 50 to 100 nm, the retardation (Rth) in the thickness direction is in the range of 130 to 250 nm and the film thickness is in the range of 40 to 90 μm. The cellulose acylate film of the invention with comparatively thin film thickness has a retardation value of which is required for an optical compensation film. By using the cellulose acylate film, it is possible to obtain a liquid crystal display device having reduced corner irregularity, and high display quality.

The film thickness of cellulose acylate film of the invention is in the range of 40 to 90 μm. If the film thickness is less than 90 μm, the corner irregularity can be reduced. However, if the film thickness is too thin, additives such as a retardation developing agent should be added in a high proportion to obtain a required retardation value. As a result, precipitation (bleeding) thereof is generated, and the surface state is deteriorated. Here, the thickness in the invention is set within the above-mentioned range. Thereby, good surface property, high retardation, reduced corner irregularity can be realized simultaneously. The film thickness is preferably in the range of 50 to 85 μm, and more preferably in the range of 60 to 80 μm.

The in-plane retardation (Re) and the retardation (Rth) in the thickness direction of the cellulose acylate film of the invention are in the ranges of 50 to 100 nm and 130 to 250 nm, respectively. In this regard, the cellulose acylate film of the invention can contribute to thin film thickness and reduced corner irregularity while maintaining the retardation required for an optical compensation film. The in-plane retardation (Re) of the cellulose acylate film of the invention is preferably in the range of 55 to 90 nm, and more preferably in the range of 60 to 80 nm. Further, the retardation (Rth) in the film thickness thereof is preferably in the range of 150 to 240 nm, and more preferably in the range of 170 to 220 nm.

The cellulose acylate film of the invention includes a retardation developing agent comprising a rod-shaped compound. In the invention, a cellulose acylate film having thin film thickness with the retardation in the above ranges can be obtained by selecting an appropriate type and content of a retardation developing agent. In particular, a cellulose acylate film in the invention having a desired Re and Rth can be obtained by selecting a retardation developing agent that can reach the desired Rth, and by appropriately setting the amount added of the retardation developing agent and the stretch ratio of the film to obtain the desired Re.

The above-mentioned rod-shaped compound is preferably a compound represented by the following Formula (1).

Formula (1)

wherein, $Ar^1$ and $Ar^3$ are each independently an aryl group or an aromatic heterocyclic ring, $Ar^2$ is an arylene group or an aromatic heterocyclic ring, and $L^1$ and $L^2$ are each independently a single bond or a divalent linking group. n is an integer of 3 or greater, and $Ar^2$ and $L^2$ may be the same as or different from each other, respectively.

First, a compound represented by Formula (1) will be described in detail.

In Formula (1), $Ar^1$ and $Ar^3$ are each independently an aryl group or an aromatic heterocyclic ring, $Ar^2$ is an arylene group or an aromatic heterocyclic ring, and $L^1$ and $L^2$ are each independently a single bond or a divalent linking group. n is an integer of 3 or greater, and $Ar^2$ and $L^2$ may be the same as or different from each other, respectively.

$Ar^1$ and $Ar^3$ are each independently an aryl group or an aromatic heterocyclic ring. $Ar^1$ and $Ar^3$ can be the same as or different from each other. An aryl group represented by $Ar^1$ and $AR^3$ is preferably an aryl group having 6 to 30 carbon atoms. The aryl group may form a monocyclic ring, and a condensed ring with other rings. Further, the aryl group may have a substituent, if possible, and for the substituent, the substituent T as will be described hereinbelow can be employed.

In Formula (1), an aryl group represented by $Ar^1$ and $Ar^3$ is preferably an aryl group having 6 to 20 carbon atoms, and particularly preferably an aryl group having 6 to 12 carbon atoms. Examples thereof include a phenyl group, a p-methylphenyl group and a naphthyl group and the like.

$Ar^2$ is an arylene group or an aromatic heterocyclic ring, and the $Ar^2$ within the repeated unit may all be the same as or different from each other. The arylene group is preferably an arylene group having 6 to 30 carbon atoms, may be a monocyclic ring, and may form a condensed ring with other rings. Further, the arylene group may have a substituent, if possible, and for the substituent, the substituent T as will be described hereinbelow can be employed.

In Formula (1), an arylene group represented by $Ar^2$ is preferably an arylene group having 6 to 20 carbon atoms, and particularly preferably an arylene group having 6 to 12 carbon atoms. Examples thereof include a phenylene group, a p-methylphenylene group and a naphthylene group and the like.

In Formula (1), the aromatic heterocyclic ring represented by $Ar^1$, $Ar^2$ and $Ar^3$ is an aromatic heterocyclic ring containing at least one selected from an oxygen atom, a nitrogen atom or a sulfur atom. Preferably, it is a 5- or 6-numbered aromatic heterocyclic ring containing an oxygen atom, a nitrogen atom or a sulfur atom. Further, the aromatic heterocyclic ring may further have a substituent, if possible. For the substituent, the substituent T as will be described hereinbelow can be employed.

In Formula (1), specific examples of the aromatic heterocyclic ring represented by $Ar^1$, $Ar^2$ and $Ar^3$ include furan, pyrrol, thiophene, imidazole, pyrazole, pyridine, pyrazine, pyridazine, triazole, triazine, indole, indazole, purine, thiazoline, thiazole, thidiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole, tetrazaindene, pyrrolotriazole, pyrazolotriazole and the like. An aromatic heterocyclic ring is preferably benzimidazole, benzoxazole, benzthiazole, benzotriazole.

In Formula (1), $L^1$ and $L^2$ are each independently a single bond or a divalent linking group. $L^1$ and $L^2$ may be the same or different from each other. Moreover, $L^2$ within the repeated unit may all be the same or different from each other.

Preferable examples of the divalent linking group include a group represented by —$NR^7$— (wherein $R^7$ is a hydrogen atom, an alkyl group or aryl group which may have a substituent), —$SO_2$—, —CO—, an alkylene group, a substituted alkylene group, an alkenyl group, a substituted alkenyl group, alkynyl group, —O—, —S—, —SO— and a group obtained by combining two or more of these divalent groups. Among these, —O—, —CO—, —$SO_2NR^7$—, —$NR^7SO_2$—, —$CONR^7$—, —$NR^7CO$—, —COO— and —OCO—, and an alkynyl group are more preferred, and —$CONR^7$—, —$NR^7CO$—, —COO— and —OCO—, and an alkynyl group are most preferred.

For a compound represented by Formula (1), $Ar^2$ is bonded with $L^1$ and $L^2$, but when $Ar^2$ is a phenylene group, $L^1$-$Ar^2$-$L^2$ and $L^2$-$Ar^2$-$L^2$ being in the para-position (1,4-position) to each other is most preferred.

In Formula (1), n is an integer of 3 or greater, preferably of 3 to 7, and more preferably of 3 to 5.

Among the compounds represented by Formula (1) is preferably a compound represented by the following Formula (2).

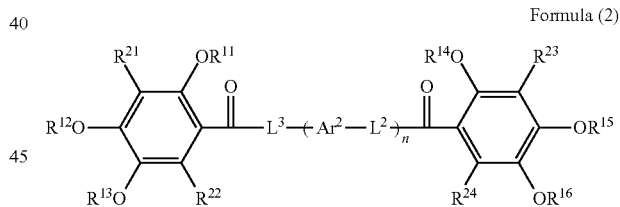

Formula (2)

wherein, $R^{11}$, $R^{12}$, $R^{13}$, $R^{14}$, $R^{15}$, $R^{16}$, $R^{21}$, $R^{22}$, $R^{23}$ and $R^{24}$ are each independently a hydrogen atom or a substituent. $Ar^2$ is an arylene group or an aromatic heterocyclic ring, and $L^2$ and $L^3$ are each independently a single bond or a divalent linking group. n is an integer of 3 or greater, and $Ar^2$ and $L^2$ are the same or different from each other, respectively.

Next, a compound represented by Formula (2) will be described in detail.

In Formula (2), $R^{11}$, $R^{12}$, $R^{13}$, $R^{14}$, $R^{15}$, $R^{16}$, $R^{21}$, $R^{22}$, $R^{23}$ and $R^{24}$ are each independently a hydrogen atom or a substituent. $Ar^2$ is an arylene group or an aromatic heterocyclic ring, and $L^2$ and $L^3$ are each independently a single bond or a divalent linking group. n is an integer of 3 or greater, and $Ar^2$ and $L^2$ are the same or different from each other, respectively.

$Ar^2$, $L^2$ and n are the same as described in Formula (1). $L^3$ is a single bond or a divalent linking group. Examples of the divalent linking group are preferably a group represented by —$NR^7$— (wherein, $R^7$ is a hydrogen group, an alkyl group or an aryl group which may have a substituent), an alkylene group, a substituted alkylene group, —O—, and group obtained by combining two or more of these divalent groups. Among them, —O—, —NR$^7$—, —NR$^7$SO$_2$— and —NR$^7$CO— are more preferred.

$R^{11}$, $R^{12}$, $R^{13}$, $R^{14}$, $R^{15}$ and $R^{16}$ are each independently a hydrogen atom or a substituent, preferably a hydrogen atom, an alkyl group and an aryl group, more preferably a hydrogen atom, an alkyl group having 1 to 4 carbon atoms (e.g., a methyl group, an ethyl group, a propyl group, an isopropyl group, etc.) and an aryl group having 6 to 12 carbon atoms (e.g., a phenyl group and a naphthyl group), and even more preferably an alkyl group having 1 to 4 carbon atoms.

$R^{21}$, $R^{22}$, $R^{23}$ and $R^{24}$ are each independently a hydrogen atom or a substituent, preferably a hydrogen atom, an alkyl group, an alkoxy group, a hydroxyl group, and more preferably a hydrogen atom and an alkyl group (preferably an alkyl group having 1 to 4 carbon atoms, and more preferably a methyl group).

Hereinbelow, the above-mentioned substituent T will be described.

Substituent T is preferably a halogen atom (e.g., a fluorine atom, a chlorine atom, a bromine atom and an iodine atom); an alkyl group (an alkyl group having preferably 1 to 30 carbon atoms such as a methyl group, an ethyl group, an n-propyl group, an isopropyl group, a t-butyl group, an n-octyl group and 2-ethylhexyl group); a cycloalkyl group (preferably a substituted or unsubstituted cycloalkyl group having 3 to 30 carbon atoms such as a cyclohexyl group, cyclopentyl group and a 4-n-dodecylcyclohexyl group); a bicycloalkyl group (preferably a substituted or unsubstituted bicycloalkyl group having 5 to 30 carbon atoms, i.e., a monovalent group that removed a hydrogen atom from bicycloalkane having 5 to 30 carbon atoms such as bicyclo[1,2,2]heptan-2-yl and bicyclo[2,2,2]octan-3-yl); an alkenyl group (preferably a substituted or unsubstituted alkenyl group having 2 to 30 carbon atoms such as a vinyl group and an aryl group); a cycloalkenyl group (preferably a substituted or unsubstituted cycloalkenyl group having 3 to 30 carbon atoms, i.e., a monovalent group that removed a hydrogen atom from cycloalkene having 3 to 30 carbon atoms such as 2-cyclopenten-1-yl and 2-cyclohexen-1-yl); a bicycloalkenyl group (a substituted or unsubstituted bicycloalkenyl group, preferably a substituted or unsubstituted bicycloalkenyl group having 5 to 30 carbon atoms, i.e., a monovalent group that removed a hydrogen atom from bicycloalkene having one double bond such as bicyclo[2,2,1]hept-2-en-1-yl and bicyclo[2,2,2]oct-2-en-4-yl); an alkynyl group (preferably a substituted or unsubstituted alkynyl group having 2 to 30 carbon atoms such as an ethynyl group and a propargyl group); an aryl group (preferably a substituted or unsubstituted aryl group having 6 to 30 carbon atoms such as a phenyl group, a p-toryl group and a naphthyl group); a heterocyclic ring group (preferably a monovalent group that removed a hydrogen atom from a substituted or unsubstituted 5- or 6-numbered aromatic or unaromatic heterocyclic ring compound, and more preferably a 5- or 6-numbered aromatic heterocyclic ring group having 3 to 30 carbon atoms such as a 2-furyl group, a 2-thienyl group, a 2-pyrimidinyl group and 2-benzthiazolyl group); a cyano group; a hydroxyl group; a nitro group; a carboxyl group; an alkoxy group (preferably a substituted or unsubstituted alkoxy group having 1 to 30 carbon atoms such as a methoxy group, an ethoxy group, an isopropoxy group, a t-butoxy group, an n-octyloxy group and 2-methoxyethoxy group); an aryloxy group (preferably a substituted or unsubstituted aryloxy group having 6 to 30 carbon atoms such as a phenoxy group, a 2-methylphenoxy group, a 4-tert-butylphenoxy group, a 3-nitrophenoxy group and a 2-tetradecanoylaminophenoxy group); a silyloxy group (preferably a silyloxy group having 3 to 20 carbon atoms such as a trimethylsilyloxy group and a tert-butyldimethylsilyloxy group); a heterocyclic oxy group (preferably a substituted or unsubstituted heterocyclic oxy group having 2 to 30 carbon atoms such as a 1-phenyltetrazol-5-oxy group and a 2-tetrahydropyranyloxy group); an acyloxy group (preferably a formyloxy group, a substituted or unsubstituted alkylcarbonyloxy group having 2 to 30 carbon atoms, a substituted or unsubstituted arylcarbonyloxy group having 6 to 30 carbon atoms such as a formyloxy group, an acetyloxy group, a pivaloyloxy group, a stearoyloxy group, a benzoyloxy group and a p-methoxyphenylcarbonyloxy group); a carbamoyloxy group (preferably a substituted or un substituted carbamoyloxy group having 1 to 30 carbon atoms such as an N,N-dimethylcarbamoyloxy group, an N,N-diethylcarbamoyloxy group, a morpholinocarbonyloxy group, an N,N-di-n-octylaminocarbonyloxy group and an N-n-octylcarbamoyloxy group); an alkoxycarbonyloxy group (preferably a substituted or unsubstituted alkoxycarbonyloxy group having 2 to 30 carbon atoms such as a methoxycarbonyloxy group, an ethoxycarbonyloxy group, a tert-butoxycarbonyloxy group and an n-octylcarbonyloxy group); an aryloxycarbonyloxy group (preferably a substituted or un substituted aryloxycarbonyloxy group having 7 to 30 carbon atoms such as a phenoxycarbonyloxy group, a p-methoxyphenoxycarbonyloxy group and a p-n-hexadecyloxyphenoxycarbonyloxy group); an amino group (preferably an amino group, a substituted or unsubstituted alkylamino group having 1 to 30 carbon atoms or a substituted or unsubstituted anilino group having 6 to 30 carbon atoms such as an amino group, a methylamino group, a dimethylamino group, an anilino group, an N-methyl-anilino group and a diphenylamino group); an acylamino group (preferably a formylamino group, a substituted or unsubstituted alkylcarbonylamino group having 1 to 30 carbon atoms or a substituted or unsubstituted arylcarbonylamino group having 6 to 30 carbon atoms such as a formylamino group, an acetylamino group, a pivaloylamino group, a lauroylamino group and a benzoylamino group); an aminocarbonylamino group (preferably a substituted or unsubstituted aminocarbonylamino group having 1 to 30 carbon atoms such as a carbamoylamino group, an N,N-dimethylaminocarbonylamino group, an N,N-diethylaminocarbonylamino group and a morpholinocarbonylamino group); an alkoxycarbonylamino group (preferably a substituted or unsubstituted alkoxycarbonylamino group having 2 to 30 carbon atoms such as a methoxycarbonylamino group, an ethoxycarbonylamino group, a tert-butoxycarbonylamino group, an n-octadecyloxy carbonylamino group and an N-methyl-methoxycarbonyl group); an aryloxycarbonylamino group (preferably a substituted or unsubstituted aryloxycarbonylamino group having 7 to 30 carbon atoms such as a phenoxy carbonylamino group, a p-chlorophenoxycarbonylamino group and a m-n-octyloxyphenoxycarbonylamino group); a sulfamoylamino group (preferably a substituted or unsubstituted sulfamoylamino group having 0 to 30 carbon atoms such as a sulfamoylamino group, an N,N-dimethylaminosulfonylamino group and an N-n-octylaminosulfonylamino group); an alkylsulfonylamino group and an arylsulfonylamino group (preferably a substituted or unsubstituted alkylsulfonylamino group having 1 to 30 carbon atoms and a substituted or unsubstituted arylsulfonylamino group having 6 to 30 carbon atoms such as a methylsulfonylamino group, a butylsulfonylamino group, a phenylsulfonylamino group, a 2,3,5-trichlorophenylsulfonylamino group and a p-methylphenylsulfonylamino group); a mercarpto group; an alkylthio group (preferably a substituted or unsubstituted alkylthio group having 1 to 30 carbon atoms such as a methylthio group, an ethylthio group and an n-hexadecylthio group); an arylthio group (preferably a substituted or unsubstituted arylthio group having 6 to 30 carbon atoms such as a phenylthio group, a p-chlorophenylthio group and a m-methoxyphenylthio group); a heterocyclic thio group (preferably a substituted or unsubstituted heterocyclic thio group having 2 to 30 carbon atoms such as a 2-benzothiazolylthio group and a 1-phenyltetrazol-5-ylthio group); a sulfamoyl group (preferably a substituted or unsubstituted sulfamoyl group having 0 to 30 carbon atoms such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group and an N—(N'-phenylcarbamoyl)sulfamoyl group); a sulfo group; an alkylsulfinyl group and an arylsulfinyl group (preferably a substituted or unsubstituted alkylsulfinyl group having 1 to 30 carbon atoms and a substituted or unsubstituted arylsulfinyl group having 6 to 30 carbon atoms such as a methylsulfinyl group, an ethylsulfinyl group, a phenylsulfinyl group and a p-methylphenylsulfinyl group); an alkylsulfonyl group and an arylsulfonyl group (preferably a substituted or unsubstituted alkylsulfonyl group having 1 to 30 carbon atoms and a substituted or unsubstituted arylsulfonyl group having 6 to 30 carbon atoms such as a methylsulfonyl group, an ethylsulfonyl group, a phenylsulfonyl group and a p-methylphenylsulfonyl group); an acyl group (preferably a formyl group, a substituted or unsubstituted alkylcarbonyl group having 2 to 30 carbon atoms and a substituted or unsubstituted arylcarbonyl group having 7 to 30 carbon atoms such as an acetyl group and a pivaloylbenzoyl group); an aryloxycarbonyl group (preferably a substituted or unsubstituted aryloxycarbonyl group having 7 to 30 carbon atoms such as a phenoxycarbonyl group, an o-chlorophenoxycarbonyl group, a m-nitrophenoxycarbonyl group and a p-tert-butylphenoxycarbonyl group); an alkoxycarbonyl group (preferably a substituted or unsubstituted alkoxycarbonyl group having 2 to 30 carbon atoms such as a methoxycarbonyl group, an ethoxycarbonyl group, a tert-butoxycarbonyl group and an n-octadecyloxycarbonyl group); a carbamoyl group (preferably a substituted or unsubstituted carbamoyl group having 1 to 30 carbon atoms such as a carbamoyl group, an N-methylcarbamoyl group, an N,N-dimethylcarbamoyl group, an N,N-di-n-octylcarbamoyl group and an N-(methylsulfonyl)carbamoyl group); an arylazo group and a heterocyclic azo group (preferably a substituted or unsubstituted arylazo group having 6 to 30 carbon atoms or a substituted or unsubstituted heterocyclic azo group having 3 to 30 carbon atoms such as a phenylazo group, a p-chlorophenylazo group and a 5-ethylthio-1,3,4-thiadiazol-2-ylazo group); an imido group (preferably an N-succinimido group and an N-phthalimido group); a phosphino group (preferably a substituted or unsubstituted phosphino group having 2 to 30 carbon atoms such as a dimethylphosphino group, a diphenylphosphino group and a methylphenoxyphosphino group); a phosphinyl group (preferably a substituted or unsubstituted phosphinyl group having 2 to 30 carbon atoms such as a phosphinyl group, a dioctyloxyphosphinyl group and a diethoxyphosphinyl group); a phosphinyloxy group (preferably a substituted or unsubstituted phosphinyl oxy group having 2 to 30 carbon atoms such as a diphenoxyphosphinyloxy group and a dioctyloxyphosphinyloxy group); a phosphinylamino group (preferably a substituted or unsubstituted phosphinylamino group having 2 to 30 carbon atoms such as a dimethoxyphosphinylamino group and a dimethylaminophosphinylamino group); and a silyl group (preferably a substituted or unsubstituted silyl group having 3 to 30 carbon atoms such as a trimethylsilyl group, a tert-butyldimethylsilyl group and a phenyldimethylsilyl group).

Among the above-mentioned substituents, the one having a hydrogen atom may be further substituted with the above-mentioned groups with the hydrogen atom removed. Examples of such a functional group include an alkylcarbonylaminosulfonyl group, an arylcarbonylaminosulfonyl group, an alkylsulfonylaminocarbonyl group, an arylsulfonylaminocarbonyl group. Examples thereof include a methylsulfonylaminocarbonyl group, a p-methylphenylsulfonylaminocarbonyl group, an acetylaminosulfonyl group, a benzoylaminosulfonyl group.

In addition, when there are two more substituents, they may be the same as or different from each other. Moreover, they may bond to each other to form a ring, if possible.

A preferable form of a compound represented by Formula (2) includes:

$R^{11}$, $R^{12}$, $R^{13}$, $R^{14}$, $R^{15}$ and $R^{16}$ being each independently a hydrogen atom or an alkyl group, and preferably an alkyl group having 1 to 4 carbon atoms, and more preferably a methyl group;

$R^{21}$, $R^{22}$, $R^{23}$ and $R^{24}$ being all hydrogen atoms;

$Ar^2$ being a substituted or unsubstituted arylene group, and preferably a substituted or unsubstituted arylene group having 6 to 20 carbon atoms, and more preferably a substituted or unsubstituted phenylene group;

$L^2$ being a single bond, —COO—, —OCO—, —CONR$^7$—, —NR$^7$CO—, —NR$^7$—, —CONR$^7$— (wherein, $R^7$ is a hydrogen atom, and an alkyl group or an aryl group which may have a substituent, and preferably a hydrogen atom), —O— or an alkynyl group; and $L^3$ being —O— or —NR$^7$— (wherein, $R^7$ is a hydrogen atom, and an alkyl group or an aryl group which may have a substituent).

Hereinbelow, the compounds represented by Formula (1) and Formula (2) are described in detail, but the invention is not limited to the following specific examples.

(1)

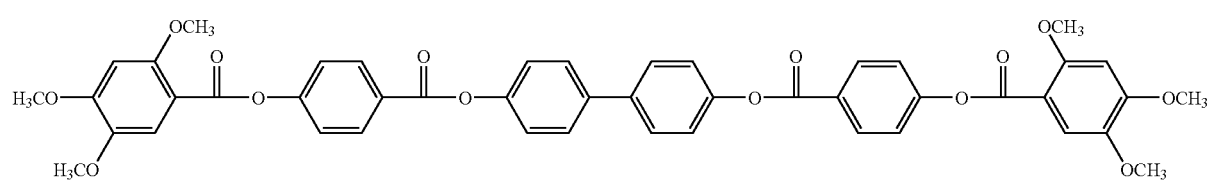

-continued
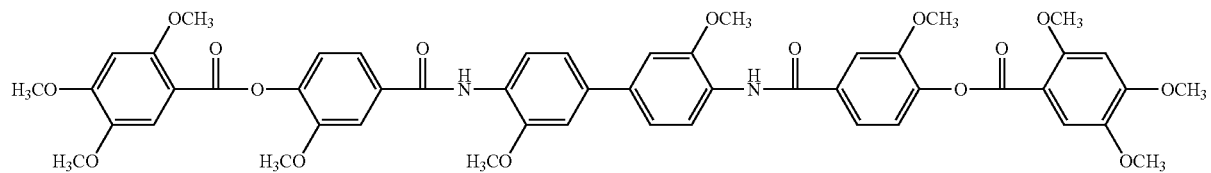
(2)
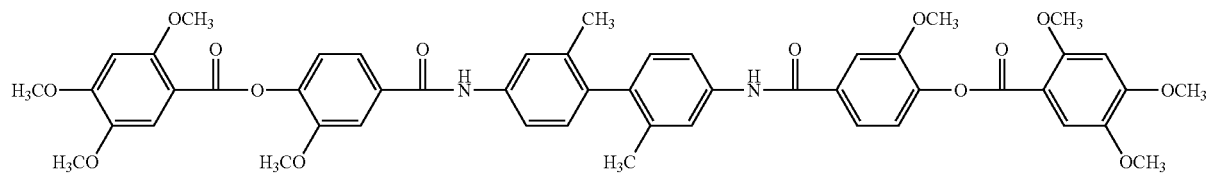
(3)
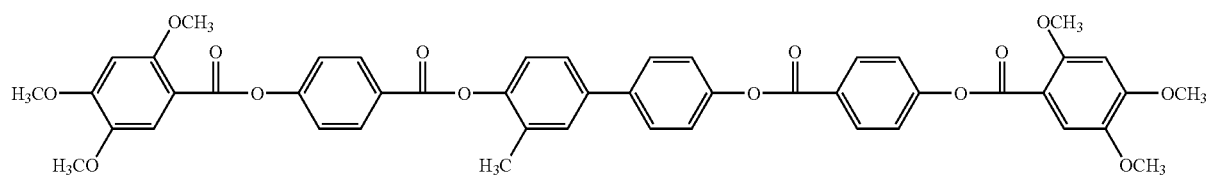
(4)
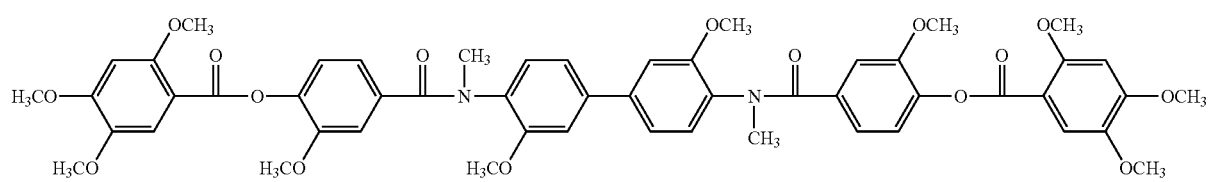
(5)
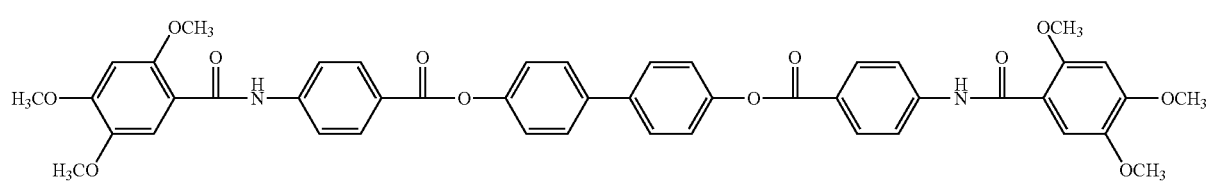
(6)
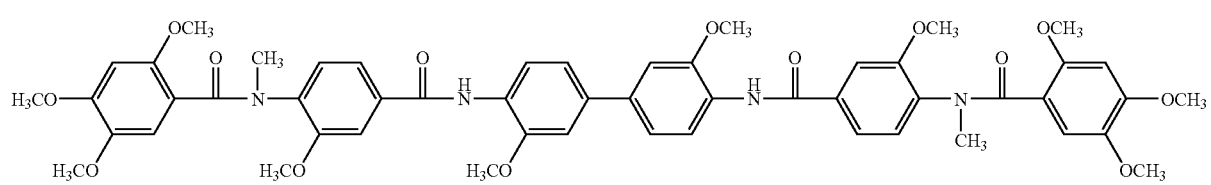
(7)
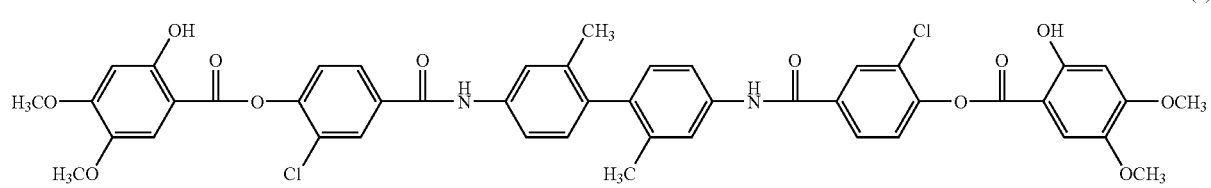
(8)
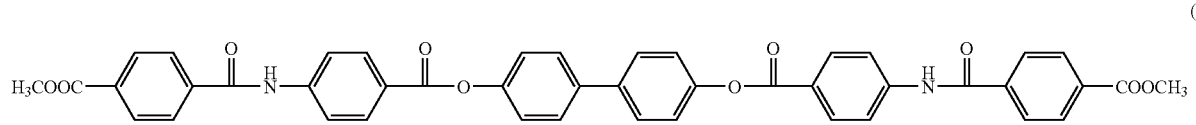
(9)

(10)
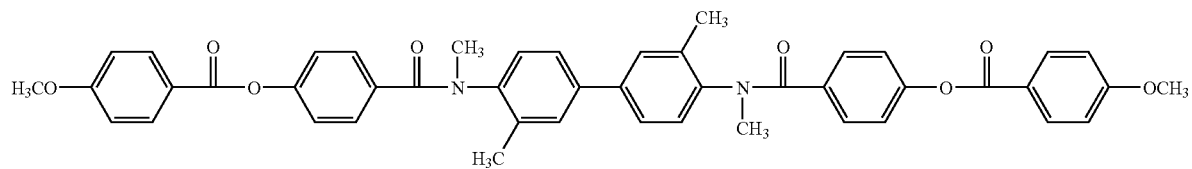
(11)
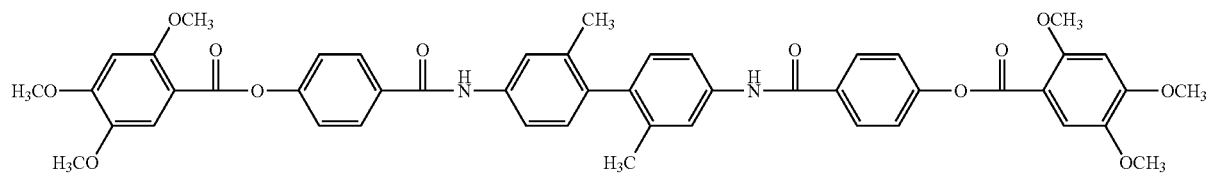
(12)
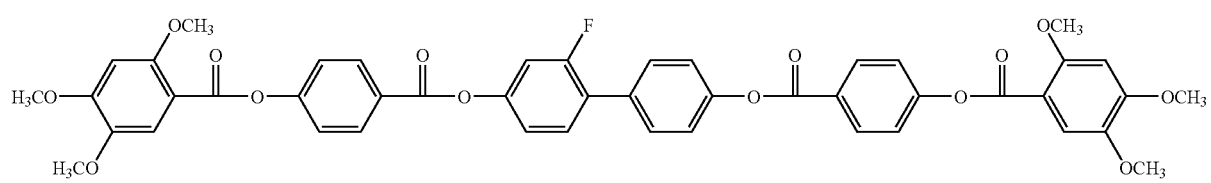
(13)
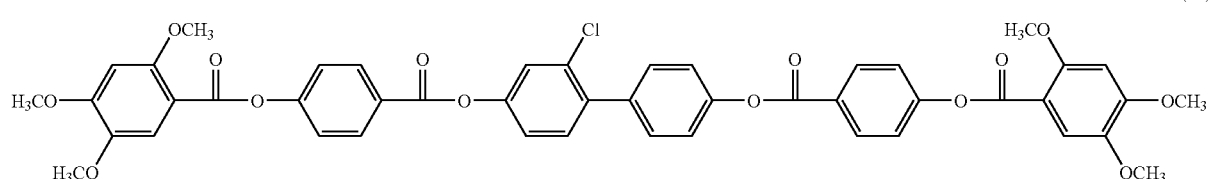
(14)
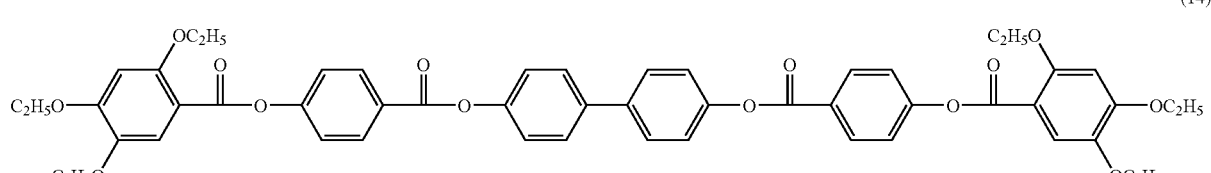
(15)
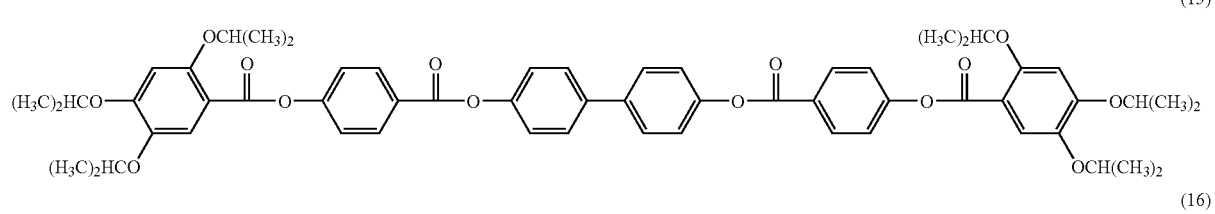
(16)
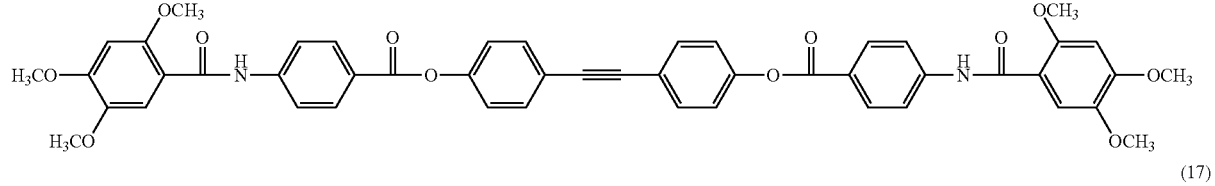
(17)
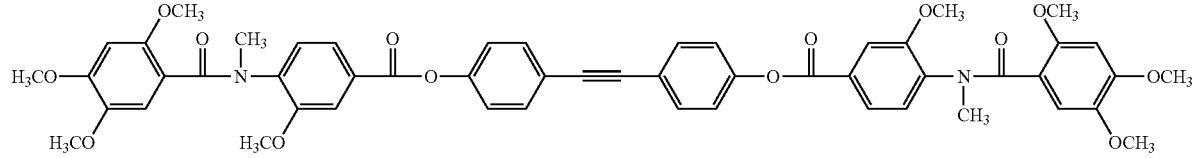

-continued
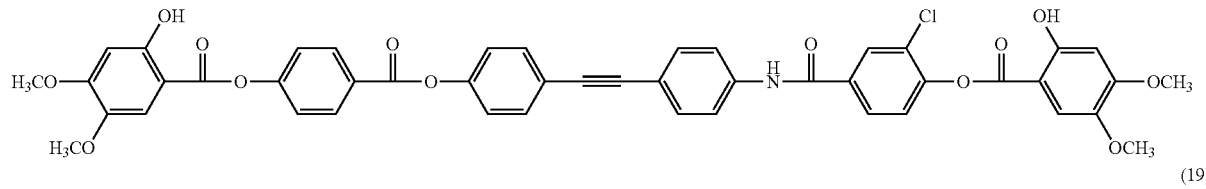
(18)
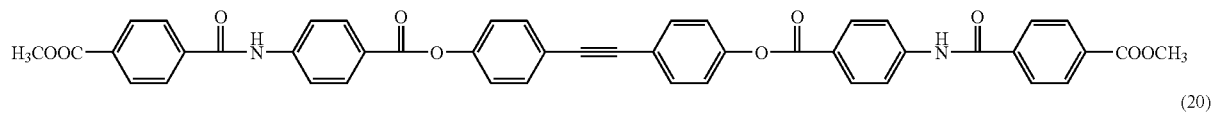
(19)
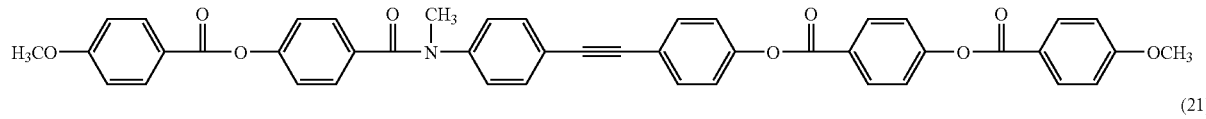
(20)
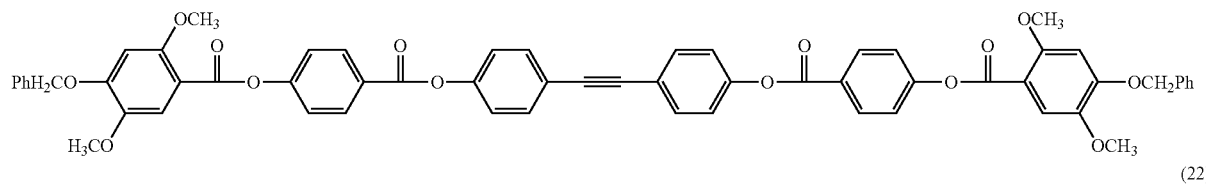
(21)
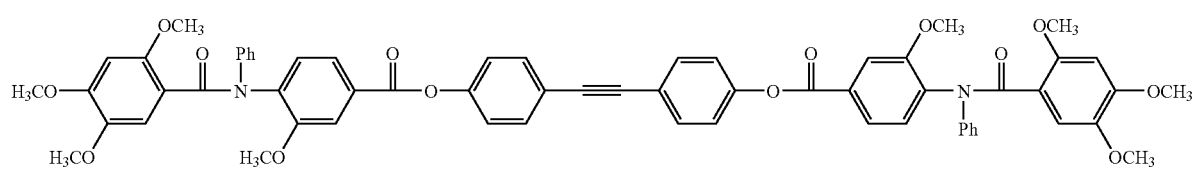
(22)
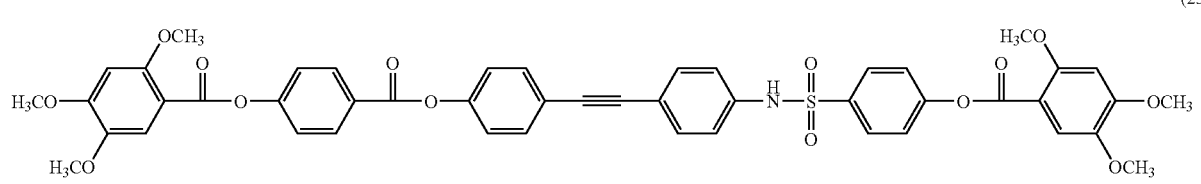
(23)
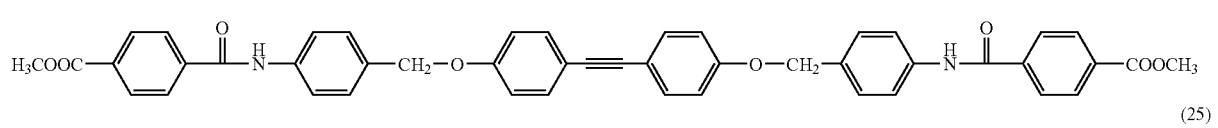
(24)
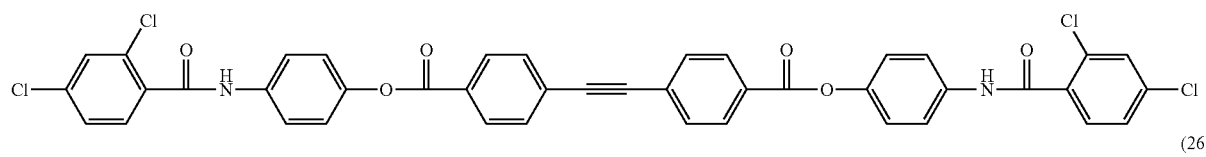
(25)
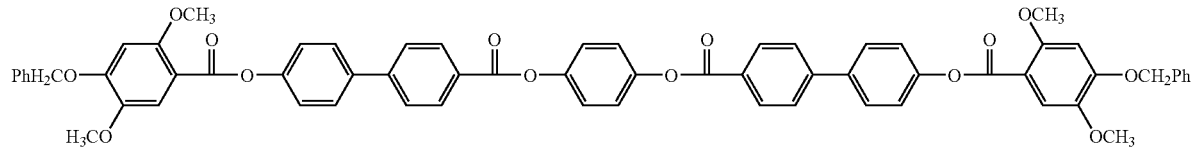
(26)
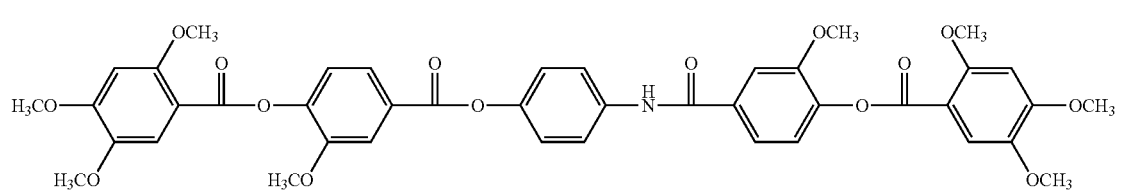
(27)

-continued
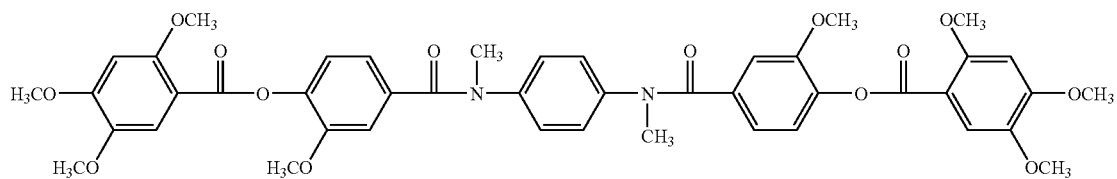
(28)
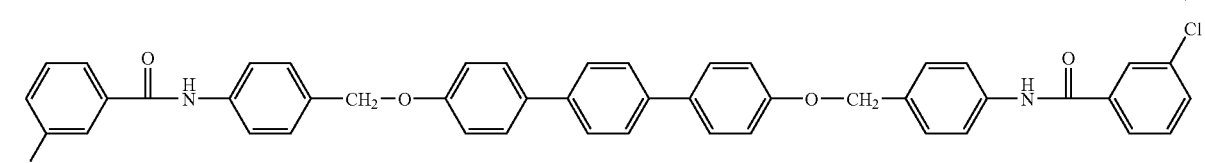
(29)
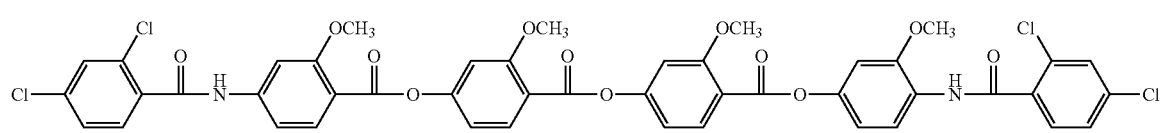
(30)
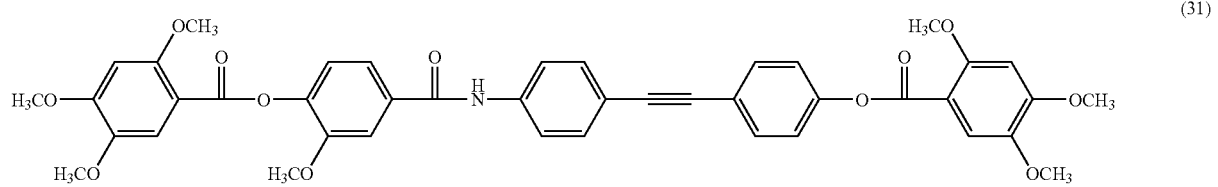
(31)
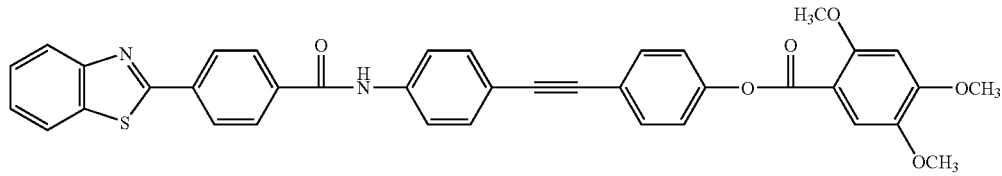
(32)
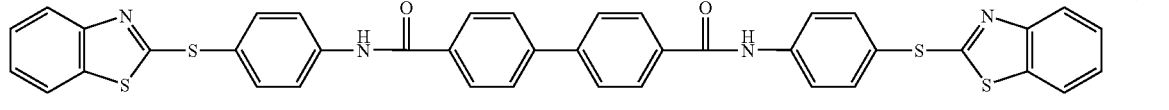
(33)
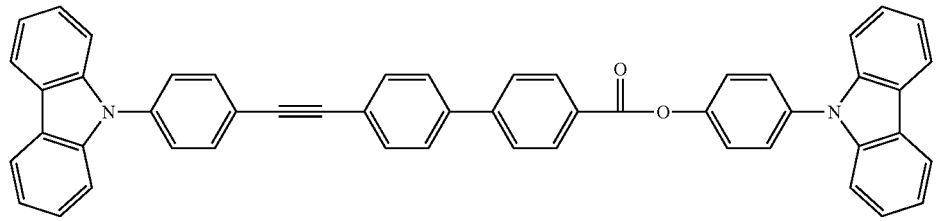
(34)
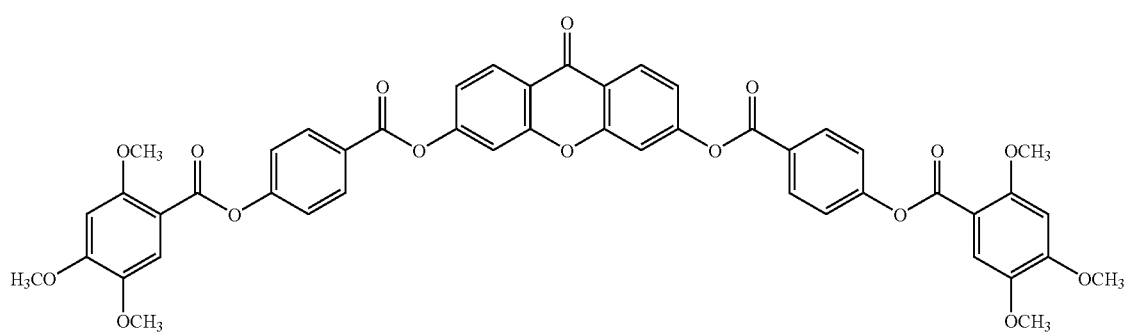
(35)

-continued

(36)
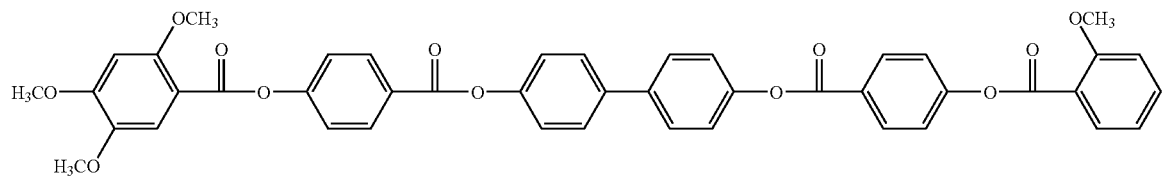

(37)
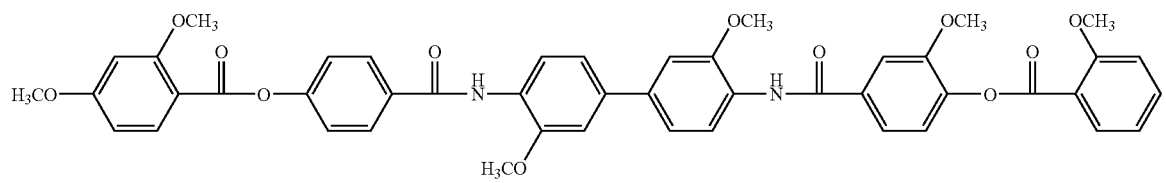

(38)
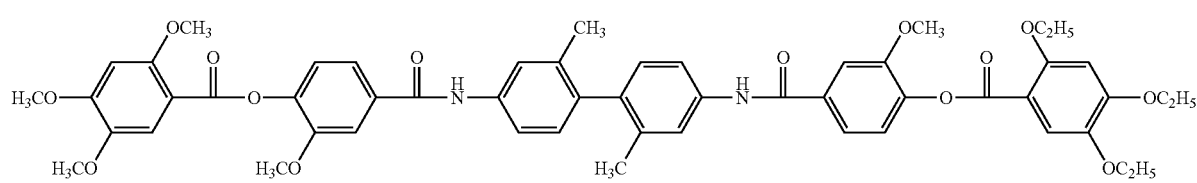

(39)
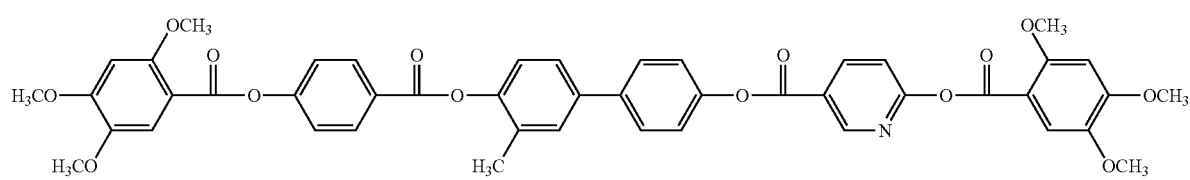

(40)
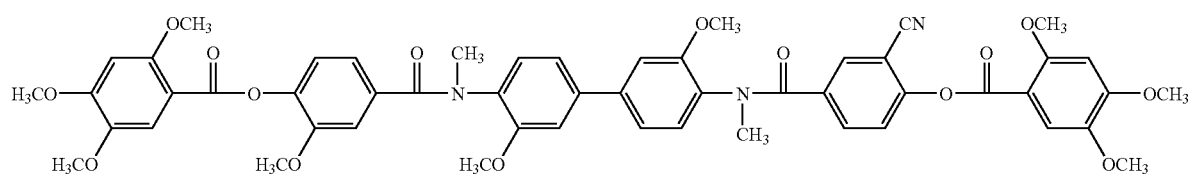

A compound represented by Formula (2) can be synthesized by a well-known method. For example, it can be obtained by subjecting a base compound of the following structure,

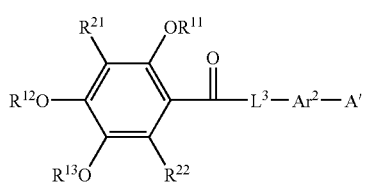

wherein, A is a hydroxyl group or a reactive group such as a halogen group, and $R^{11}$, $R^{12}$, $R^{13}$, $R^{21}$ and $R^{22}$ are the same as described in the above, to a reaction with a derivative having a reactive part such as a hydroxyl group or an amino group to obtain an intermediate, wherein, A' is a reactive group such as a carboxyl group, and $R^{11}$, $R^{12}$, $R^{13}$, $R^{21}$, $R^{22}$, $Ar^2$ and $L^3$ are the same as described in the above, and by bonding two molecules of the intermediate with one molecule of B—$Ar^2$-$L^2$-$Ar^2$—B' wherein, B and B' are a reactive group such as a hydroxyl group or an amino group, and $Ar^2$ and $L^3$ are the same as described in the above.

Further, a compound represented by Formula (1) can also be synthesized by the same method. However, the invention is not limited to this example of synthesis method of the compounds.

The content of the compounds represented by Formula (1) or Formula (2) based on cellulose acylate is preferably 0.1 to 20% by weight, more preferably 0.5 to 16% by weight, even more preferably 1 to 12% by weight, particularly preferably 1 to 8% by weight, and most preferably 1 to 5% by weight.

[Cellulose Acylate]

Next, cellulose acylate to be used in producing cellulose acylate films of the invention will be described in detail.

In the invention, two or more different types of cellulose acylates may be used in a mixture. A specific cellulose acylate is a fatty acid ester of cellulose obtained by substituting a hydroxyl group of cellulose with an acetyl group or an acyl group having 3 or more carbon atoms, and preferably the degree of substitution of the hydroxyl group of cellulose satisfies the following numerical formula (1).

$$2.0 \leq A+B \leq 3.0 \qquad (I)$$

wherein, A and B are the degrees of substitution of hydroxyl group of cellulose by an acyl group, in which A is the degree of substitution by an acetyl group, and B is the degree of substitution by an acyl group having 3 or more carbon atoms.

Glucose units constituting cellulose, which are bonded to each other via β-1,4 bonds, have free hydroxyl group at the 2-, 3- and 6-positions. A cellulose acylate is a polymer in which these hydroxyl groups have been partly or entirely esterified by an acyl group. The degree of substitution by the acyl group means the ratio of the esterification of the cellulose at each of the 2-, 3- and 6-positions (the degree of substitution of 1 standing for the 100% esterification).

When the degree of substitution of a hydroxyl group by an acyl group at the 2-position of a glucose unit in the cellulose acylate film is DS2, the degree of substitution of a hydroxyl group by an acyl group at 3-position is DS3 and the degree of substitution of a hydroxyl group by an acyl group at 6-position is DS6, the cellulose acylate film preferably satisfies the following numerical formulas (VI-a) and (VI-b), as well as the numerical formula (VI) related to the coefficient of thermal expansion as will be described hereinbelow.

$$2.0 \leq DS2+DS3+DS6 \leq 3.0 \qquad (VI\text{-}a)$$

$$DS6/(DS2+DS3+DS6) \geq 0.315. \qquad (VI\text{-}b)$$

According to the invention, the sum of the degrees of substitution (A+B) of hydroxyl group as shown in the above-mentioned numerical formula (I) is preferably 2.0 to 3.0, more preferably 2.2 to 2.9, and particularly preferably 2.40 to 2.85. Further, the degree of substitution B may be 0. When the degree of substitution B is not 0, it is preferably 0.9 or more, and particularly preferably 1.3 or more.

If A+B is 2.0 or more, the hydrophilicity becomes weak, and it is difficult to be affected by the environmental humidity.

Cellulose acetate, which B is 0, is easily affected by the environmental humidity, but the affect of the environmental temperature is small compared with the case where the coefficient of linear thermal expansion, B, is not 0. Thus, development of irregularity when displayed in a liquid crystal display device can be controlled.

It is further preferable that substitution of the hydroxyl group at the 6-position is 28% or more of the degree of substitution B, more preferably 30% or more, even more preferably 31% or more, and particularly preferably 32% or more.

It is further preferable that the total degree of substitution of the hydroxyl group at the 6-position of the cellulose acylate is 0.75 or more, more preferably 0.80 or more, and particularly preferably 0.85 or more. By using such a cellulose acylate film, a film-forming solution having preferable solubility and filtration properties can be prepared and a favorable solution can be prepared even by using a nonchlorine-based organic solvent. Moreover, it is possible to prepare a solution having a low viscosity and favorable filtration properties.

For the acyl group having 3 or more carbon atoms, it may be an aliphatic group or an aromatic hydrocarbon group without particularly limitation. Examples thereof include alkylcarbonyl ester of cellulose, alkenylcarbonyl ester or aromatic carbonyl ester, and aromatic alkylcarbonyl ester, and they may be further substituted, respectively. Preferable examples of such B include a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a t-butanoyl group, a cyclohexanecarbonyl group, an oleoyl group, a benzoyl group, a naphthylcarbonyl group, a cinnamoyl group, and the like. Among these, preferred are a propionyl group, a butanoyl group, a dodecanoyl group, an octadecanoyl group, t-butanoyl group, an oleoyl group, a benzoyl group, a naphthylcarbonyl group, a cinnamoyl group, and the like. Particularly preferred are a propionyl group and a butanoyl group. In addition, in the case of a propionyl group, the degree of substitution B is preferably 0.6 or more.

Specific examples of cellulose acylate include cellulose acetate, cellulose acetate propionate, cellulose acetate butyrate and the like.

[Method of Synthesizing Cellulose Acylate]

The fundamental principle for the synthesis of cellulose acylate is described in Migita et al., Wood Chemistry, Kyoritsu Publications, pp. 180-190 (1968). A typical synthesis method is a liquid phase acetylation method with the use of a carboxylic anhydride/acetic acid/sulfuric acid catalyst.

In particular, the cellulose acylate is obtained by pretreating a cellulose material such as cotton linters or wood pulps with an appropriate amount of acetic acid, and then introducing into a pre-cooled liquid mixed of carboxylation followed by esterification to thereby synthesize a perfectly acylated cellulose (the sum of the degrees of acyl substitution at the 2-, 3- and 6-position is nearly 3.00). The liquid mixed for carboxylation usually contains acetic acid as a solvent, carboxylic anhydrous as an esterification agent and sulfuric acid as a catalyst. For the carboxylic anhydrous, it is common to use the carboxylic anhydrous in stoichiometrically excess for the total amount of water contained in cellulose to be reacted therewith and the reaction system. After completion of esterification reaction, an aqueous solution of neutralizing agent (e.g., carbonates of calcium, magnesium, iron, aluminum or zinc, acetates or oxides) is added to hydrolyze the excessive carboxylic anhydrous remaining in the reaction system and partly neutralize the esterification catalyst. Next, the obtained perfect cellulose acylate was saponified and aged by maintaining at 50 to 90° C., in the presence of a small amount of an acetylation catalyst (in general terms, the remaining sulfuric acid), and the cellulose acylate is converted to a cellulose acylate having the desired degree of acyl substitution and the desired degree of polymerization. When the desired cellulose acylate is obtained, the catalyst remaining in the reaction system is completely neutralized by using such a neutralizing agent as described above. Alternatively, the cellulose acylate solution, which is not neutralized, as such is poured into water or a dilute sulfuric acid (or water or a dilute sulfuric acid is poured into the cellulose acylate solution). Then the cellulose acylate is separated, washed and stabilized. Thus, the specific cellulose acylate as described above can be obtained.

A polymer component constituting the cellulose acylate film preferably comprises the above-mentioned specific cellulose acylate, substantially. The term "substantially" as used herein means 55% by weight or more of the polymer component (preferably 70% by weight, and more preferably 80% by weight).

It is preferable to use the cellulose acylate in as particles. It is preferable that 90% by weight or more of the particles to be used have a particle size of 0.5 to 5 mm, and that 50% by weight or more of the particles to be used have a particle size of 1 to 4 mm. It is preferable that the cellulose acylate particles have a shape close to spherical as possible.

The degree of polymerization of cellulose acylate preferably used in the invention, in terms of the viscosity average degree of polymerization, is preferably 200 to 700, more preferably 250 to 550, even more preferably 250 to 400, and particularly preferably 250 to 350. An average degree of polymerization can be measured by the limiting viscosity method of Uda et al. (Kazuo Uda and Hideo Saito: Journal of the Society of Fiber Science and Technology, Japan, vol. 18, No. 1, pp. 105-120 (1962)). This method is further described in detail in JP-A No. 9-95538.

When the low molecular weight components are removed, the average molecular weight (the degree of polymerization) is increased, but in order to lower the viscosity than a typical cellulose acylate, the cellulose acylate which removed the low molecular components is useful. The cellulose acylate having small amount of low molecular weight components can be obtained by removing the low molecular weight components from a cellulose acylate synthesized by a conventional method. The method for removing low molecular components can be carried out by washing the cellulose acylate with an appropriate organic solvent. Further, when preparing a cellulose acylate having small amount of low molecular components, the content of a phosphoric acid catalyst in the acetylation reaction based on 100 parts by weight of cellulose acylate is preferably controlled to 0.5 to 25 parts by weight. If the content of the phosphoric acid catalyst is in the above range, it is preferable from the viewpoint of molecular weight distribution (homogeneous molecular weight distribution), and cellulose acylate can be synthesized. When used in preparing cellulose acylate, its water content is preferably 2% by weight or lower, more preferably 1% by weight or lower, and particularly 0.7% by weight or lower. In general, cellulose acylate contains water, and the water content is typically 2.5 to 5% by weight. In order to attain the above-mentioned water content of the cellulose acylate in the invention, drying is required, and such method is not particularly limited as long as the desired water content is reached.

For starting cotton material and a synthesis method of cellulose acylate, the starting cotton material and the synthesis method described in detail in Japan Institute of Invention and Innovation, Technical Publication (Technical Publication No. 2001-1745, pp. 7-12, Mar. 15, 2001, published by Japan Institute of Invention and Innovation) are employed.

The cellulose acylate film of the invention can be obtained by using a solution of which the cellulose acylate and retardation developing agent, and, if necessary, an additive is dissolved in an organic solvent.

[Additives]

In the invention, examples of an additive which can be used for the cellulose acylate include a plasticizer, an ultraviolet absorbent, an antidegradants, a retardation (optical anisotropy) developing agent, fine particles, a peel promoting agent, an infrared absorbent and the like. In the invention, it is preferable to use one or more types of a plasticizer, an ultraviolet absorbent and a peel promoting agent. These may be either a solid or an oily matter. That is, its melting point or boiling point is not particularly limited. For example, an ultraviolet absorbent having a melting point of 20° C. or lower and 20° C. or higher can be used in a mixture, and a plasticizer can be used in a mixture in the same manner as described in, for example, JP-A No. 2001-151901 or the like.

For an ultraviolet absorbent, an arbitrary type can be selected depending on its purpose, and an ultraviolet absorbent such as salicylic acid ester-based, benzophenone-based, benzotriazole-based, benzoate-based, cyanoacrylate-based, nickel complex salt-based can be used. Preferred are the benzophenone-based, the benzotriazole-based and the salicylic acid ester-based ultraviolet absorbents. Examples of the benzophenone-based ultraviolet absorbent include 2,4-dihydroxybenzophenone, 2-hydroxy-4-acetoxybenzophenone, 2-hydroxy-4-methoxybenzophenone, 2,2'-di-hydroxy-4-methoxybenzophenone, 2,2'-di-hydroxy-4,4'-methoxybenzophenone, 2-hydroxy-4-n-octoxybenzophenone, 2-hydroxy-4-dodecyloxy benzophenone, 2-hydroxy-4-(2-hydroxy-3-methacryloxy)propoxybenzophenone and the like. Examples of the benzotriazole-based ultraviolet absorbent include 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amylphenyl)benzotriazole, 2(2'-hydroxy-3',5'-di-tert-butylphenyl)-5-chlorobenzotriazole, 2(2'-hydroxy-5'-tert-octylphenyl)benzotriazole and the like. Examples of salicylic acid ester-based ultraviolet absorbent include phenylsalicylate, p-octylphenylsalicylate, p-tert-butylphenylsalicylate and the like. Among these exemplified ultraviolet absorbents, particularly preferred are 2-hydroxy-4-methoxybenzophenone, 2,2'-di-hydroxy-4,4'-methoxybenzophenone, 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amylphenyl)benzotriazole and 2(2'-hydroxy-3',5'-di-tert-butylphenyl)-5-chlorobenzotriazole.

It is preferable to use a combination of plural ultraviolet absorbent differing in absorption wave length, since high shielding effect over a wide wavelength range can be established thereby. From the viewpoint of preventing liquid crystals from degradation, it is preferable that an ultraviolet absorbent for liquid crystals absorbs ultraviolet rays having less than 370 nm wavelength, and, from the viewpoint of liquid crystal display performance, hardly absorbs visible rays having more than 400 nm wavelength. Particularly preferable examples of the ultraviolet absorbent are the benzotriazole-based compounds, the benzophenone-based compounds and the salicylic acid ester compounds as described above. Among these, the benzotriazole-based compounds are favorable because of scarcely causing undesirable coloration in cellulose esters.

In addition, compounds described in respective publications of JP-A Nos. 60-235852, 3-199201, 5-1907073, 5-194789, 5-271471, 6-107854, 6-118233, 6-148430, 7-11056, 7-11055, 7-11056, 8-29619, 8-239509 and 2000-204173 can be used for an ultraviolet absorbent.

The content of an ultraviolet absorbent based on cellulose acylate is preferably 0.001 to 5% by weight, and more preferably 0.01 to 1% by weight from the viewpoint of the addition effect and the inhibition of the ultraviolet absorbent from bleed out on the surface of a film.

Further, an ultraviolet absorbent may be added at the same time with dissolving cellulose acylate, or may be added to a dope after the dissolution. In particular, the form of adding a solution of ultraviolet absorbent to a dope immediately before casting using a static mixer or the like is preferable in that the spectrometric absorption properties can be easily controlled.

The antidegradants can prevent cellulose triacetate or the like from degradation and decomposition. For the antidegradants, a compound such as butyl amine, a hindered amine compound (JP-A No. 8-325537), a guanidine compound (JP-A No. 5-271471), a benzotriazole-based UV absorbent (JP-A No. 6-235819), a benzophenone-based UV absorbent (JP-A No. 6-118233) can be used.

For a plasticizer, phosphoric acid ester and carboxylic acid ester may be preferably used. Specific examples of the plasticizer preferably include triphenyl phosphate (TPP), tricresyl phosphate (TCP), cresyldiphenyl phosphate, octyldiphenyl phosphate, diphenylbiphenyl phosphate, trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), O-acetyltriethyl citrate (OACTE), O-acetyltributyl citrate (OACTB), acetyltriethyl citrate, acetyltributyl citrate, butyl oleate, methylacetyl ricinoleate, dibutyl sebacate, triacetin, tributyrin, butylphthalylbutyl glycolate, ethylphthalylethyl glycolate, methylphthalylethyl glycolate, and the like. More preferable examples of the plasticizer include (di)pentaerythritol esters, glycerol esters and diglycerol esters.

For the peel promoting agent, citric acid ethyl esters may be exemplified. In addition, for the infrared absorbent, an infrared absorbent described, for example, in JP-A No. 2001-194522 or the like can be used.

Although these additives may be added at any stage during the dope preparation, a preparation step of adding the additives may be further employed as the final step of the dope preparation process. Furthermore, the content of each material is not particularly limited as long as their functions are expressed. In addition, if the cellulose acylate film is multi-layered, each layer may have different types of the additives and content. These techniques have been conventionally known as described in, for example, JP-A No. 2001-151902 or the like.

For the coefficient of linear thermal expansion of the cellulose acylate film of the invention, the coefficient D of linear thermal expansion in the cast (conveyance) direction (MD) and the coefficient D of linear thermal expansion in the cast axis direction (cast perpendicular direction) (TD) satisfy the following numerical formulas (II), (III) and (IV), and more preferably satisfy the numerical formulas (V) and (VI):

$$30 \text{ ppm} \leq D(MD) \leq 90 \text{ ppm}; \quad (II)$$

$$25 \text{ ppm} \leq D(TD) \leq 90 \text{ ppm}; \quad (III)$$

$$1.0 \leq D(MD)/D(TD) \leq 5.0; \quad (IV)$$

$$50 \text{ ppm} \leq D(MD) \leq 75 \text{ ppm},$$

$$30 \text{ ppm} \leq D(TD) \leq 75 \text{ ppm}; \quad (V)$$

and $$1.0 \leq D(MD)/D(TD) \leq 3.0. \quad (VI)$$

The coefficient of linear thermal expansion of the cellulose acylate film of the invention can satisfy the above formulas by selecting draw ratio, the type and content of the plasticizer and the line.

The technical definition of the coefficient D of linear thermal expansion in the cast (conveyance) direction (MD) and the coefficient D of linear thermal expansion in the cast axis direction (cast perpendicular direction) (TD) to satisfy the above numerical formulas (II) to (VI) is as in the following. When the environment (temperature) is modified, contraction and expansion is occurred and stress between each part is generated in the composing part of a polarizing plate which is composed of an adhesive layer, a retardation film, a polarizing film, a protective film and the like. By satisfying the above formulas, the stress is well balanced in the composing part of the polarizing plate, and even when environmental temperature is modified, the polarizing plate becomes a liquid crystal display device having small change in viewing angle property, thus a preferable result can be obtained.

The glass transition temperature Tg of the cellulose acylate film of the invention is preferably 70 to 180° C., more preferably 100 to 170° C., and still more preferably 120 to 160° C. The glass transition temperature Tg can be measured with a dynamic viscoelasticity meter (VIBRON: DVA-225 manufactured by IT KEISOKUSEIGYO K.K.). The glass transition temperature can also be controlled within the above ranges by selecting an appropriate type and content of a plasticizer. It is preferable to control the glass transition temperature Tg of the cellulose acylate film of the invention within the above ranges from the viewpoint of handling suitability in processing it into a polarizing plate and setting up a liquid crystal display device.

Further, the additives described in detail in Japan Institute of Invention and Innovation Journal of Technical Disclosure No. 2001-1745 (Mar. 15, 2001, Japan Institute of Invention and Innovation), from p. 16. can be optionally used.

[Wavelength Dispersion Controlling Agent]

With respect to the cellulose acylate film of the invention, a compound which lowers the wavelength dispersion of a film (hereinbelow, referred to as a 'wavelength dispersion controlling agent') can be also added.

Hereinbelow, the wavelength dispersion controlling agent will be described in detail.

In the invention, with respect to the cellulose acylate film, the coloration of the film can be prevented by making the film have the absorbance function in the ultraviolet region of the wavelength range of 200 to 400 nm and the compound capable of controlling wavelength dispersion of $Re(\lambda)$ and $Rth(\lambda)$ of the film is added, thereby, the differences of Re, Rth at the wavelengths 400 nm and 700 nm, preferably $|Re_{(400)}-Re_{(700)}|$ and $|Rth_{(400)}-Rth_{(700)}|$ can be lowered.

In order to improve the chromatic dispersion of Rth of cellulose acylate films, it is desirable to add at least one compound, which lowers the chromatic dispersion of Rth represented by the following formula (iv), $\Delta Rth=|Rth_{(400)}-Rth_{(700)}|$, in condition that the following formulas (v) and (vi) are satisfied:

$$\Delta Rth=|Rth_{(400)}-Rth_{(700)}| \quad (iv)$$

$$(\Delta Rth(B)-\Delta Rth(0))/B \leq -2.0 \quad (v)$$

$$0.01 \leq B \leq 30; \quad (vi)$$

it is more desirable in that the above formulas (v) and (vi) being in the range of:

$$(\Delta Rth(B)-\Delta Rth(0))/B \leq -3.0 \quad (v\text{-a})$$

$$0.05 \leq B \leq 25; \quad (vi\text{-a})$$

and it is even more desirable in that the above formulas (v) and (vi-b) being in the range of:

$$(\Delta Rth(B)-\Delta Rth(0))/B \leq -4.0 \quad (v\text{-b})$$

$$0.1 \leq B \leq 20. \quad (vi\text{-b})$$

The cellulose acylate film has a chromatic dispersion property such that the Re and Rth values in general are larger in the longer wavelength than in the shorter wavelength side. Therefore, in order to enlarge the relatively small Re and Rth in the shorter wavelength side, smoothing the chromatic dispersion is requested. Meanwhile, the compound having absorbance at an ultraviolet region of 200 to 400 nm has a chromatic dispersion property such that the light absorbance is larger in the longer wavelength than in the shorter wavelength side. When the compound itself exists uniformly inside the cellulose acylate film, it is assumed that the birefringence of the compound, that is, the chromatic dispersion of Re, Rth and light absorbance is large in the shorter wavelength side.

As described above, by using a compound having absorbance at 200 to 400 nm, and the chromatic dispersion of Re and Rth of the compound itself assumed to be large in the shorter wavelength side, it is possible to control the Re, Rth chromatic dispersion of the cellulose acylate film. Therefore, the compound which controls the chromatic dispersion being sufficiently and homogeneously soluble to cellulose acylated is requested. The range of the absorbance in the ultraviolet region of these compounds is preferably 200 to 400 nm, more preferably 220 to 395 nm, and even more preferably 240 to 390 nm.

Recently, in the liquid crystal display devices such as television, laptop computer and mobile cellular phone, the brightness was increase with less electrical power. Therefore, a light element, which is used in the liquid crystal display devices, having excellent transmittance is requested. In this regard, it is preferable that cellulose acylate films containing a compound, which has the absorbance at an ultraviolet region of 200 to 400 nm and which lowers $|Re_{(400)}-Re_{(700)}|$ and $|Rth_{(400)}-Rth_{(700)}|$ of the films has an excellent spectral transmittance. According to cellulose acylate films used in the invention, the spectral transmittance at a wavelength of 380 nm is 45% to 95%; however, the spectral transmittance at a wavelength of 380 nm being 10% or less is desired.

Accordingly, the chromatic dispersion regulating agent preferably used in the invention having the molecular weight of 250 to 1000 is preferred in the view point of volatility. It is more preferably 260 to 800, even more preferably 270 to 800, and particularly preferably 300 to 800. Within these ranges of molecular weight, the chromatic dispersion regulating agent may be in a form of specific monomer, or in a form of oligomer or polymer formed from multiple bonding of the monomer unit.

It is preferable not to emit the chromatic dispersion regulating agent during dope casting and drying process of the cellulose acylate film preparation.

(Compound Addition Amount)

The above-mentioned chromatic dispersion regulating agent preferably used in the invention is added preferably in the amount of 0.01 to 30% by mass, more preferably 0.1 to 20% by mass, and particularly preferably 0.2 to 10% by mass with respect to cellulose acylate.

(Compound Addition Method)

Further, the chromatic dispersion regulating agent may be used alone or in combination of 2 or more compounds in an arbitrary ratio.

Also, the timing of the chromatic dispersion regulating agent addition may be any time during the dope preparation process or after the completion of the dope preparation process.

Specific examples of the chromatic dispersion regulating agent preferably used in the invention include benzotriazole compounds, benzophenone compounds, cyano group-containing compounds, oxybenzophenone compounds, salicylic acid ester compounds, nickel complex salt compounds or the like.

Examples of benzotriazole compound represented by Formula (101) can be preferably used as a chromatic dispersion regulating agent of the invention but the compounds which can be used in the invention are not limited thereto.

$$Q^1\text{-}Q^2\text{-}OH \qquad \text{Formula (101)}$$

Wherein $Q^1$ is a nitrogen-containing aromatic heterocyclic ring, $Q^2$ is an aromatic ring.

$Q^1$ is a nitrogen-containing aromatic heterocyclic ring, preferably represents a 5- to 7-membered nitrogen-containing aromatic heterocyclic ring, and more preferably represents a 6-membered nitrogen-containing aromatic heterocyclic ring. Examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene and the like. More preferably, a 5-membered nitrogen-containing aromatic heterocyclic ring include imidazole, pyrazole, triazole, tetrazole, thiazole, oxazole, benzotriazole, benzothiazole, benzoxazole, thiadiazole, oxadiazole preferably with benzotriazole being particularly preferable.

The nitrogen-containing aromatic heterocyclic ring represented by $Q^1$ may be further substituted, and the substituent is preferably the following substituent T. Further, in the case where the nitrogen-containing aromatic heterocyclic ring contains a plurality of substituent, each substituent may be condensed to form a ring structure.

The aromatic ring represented by $Q^2$ may be an aromatic hydrocarbon ring or an aromatic heterocyclic ring. Also, the aromatic rings may be monocyclic or may form a fused ring with other rings.

The aromatic hydrocarbon ring is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring is preferably an aromatic heterocyclic rings containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferable examples of the aromatic heterocyclic ring include pyridine, triazine, and quinoline.

The aromatic ring represented by $Q^2$ is preferably an aromatic hydrocarbon ring, more preferably a naphthalene ring or a benzene ring, and particularly preferably a benzene ring. $Q^2$ may be further substituted, and the substituent is preferably the following substituent T.

Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopenyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 1.6 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (101) is preferably a compound represented by the following formula (101-A):

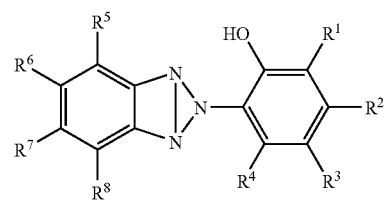

Formula (101-A)

wherein $R^1$, $R^2$, $R^3$, $R^4$, $R^5$, $R^6$, $R^7$ and $R^8$ are each independently a hydrogen or a substituent.

$R^1$, $R^2$, $R^3$, $R^4$, $R^5$, $R^6$, $R^7$ and $R^8$ each independently represent a hydrogen atom or a substituent, and the substituent may be exemplified by the above-described substituent T. These substituents may be further substituted with other substituents, and the substituents may be condensed to form a ring structure.

$R^1$ and $R^3$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; and particularly preferably an alkyl group having 1 to 12 carbon atoms (preferably having 4 to 12 carbon atoms).

$R^2$ and $R^4$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^5$ and $R^8$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^6$ and $R^7$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom or a halogen atom; and particularly preferably a hydrogen atom or a chlorine atom.

The compound represented by Formula (101) is preferably a compound represented by the following formula (101-B):

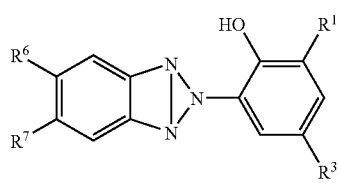

Formula (101-B)

wherein $R^1$, $R^3$, $R^6$ and $R^7$ have the same as meaning as those in Formula (101-A), and their preferable ranges are the same as those in Formula (101-A).

Specific examples of the compound represented by Formula (101) will be given in the following but the compounds which can be used in the invention are not limited thereto.

UV-1
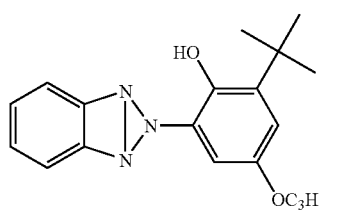

UV-2
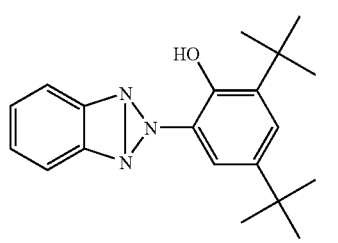

UV-3
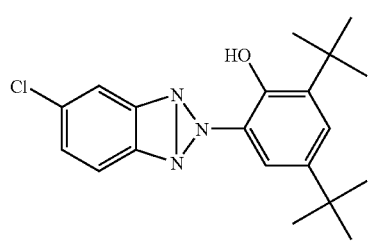

UV-4
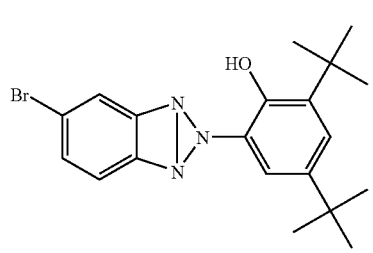

UV-5
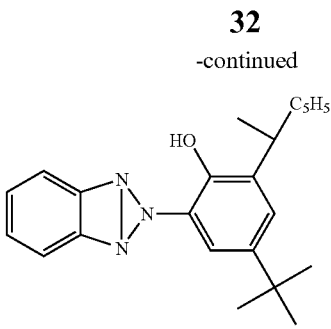

UV-6
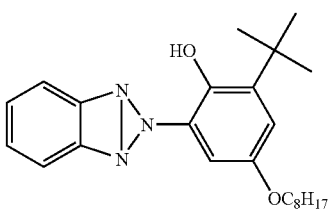

UV-7
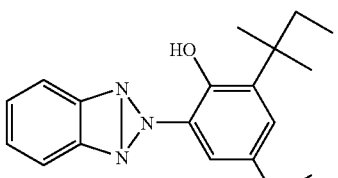

UV-8
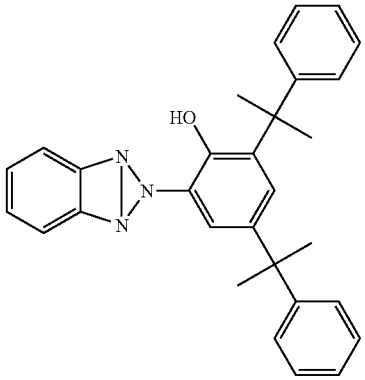

UV-9
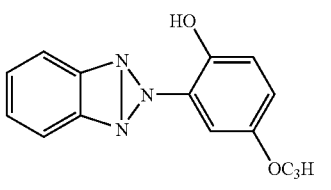

UV-10

UV-11
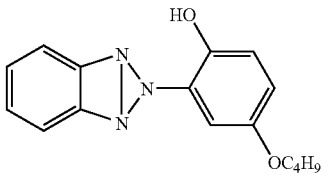

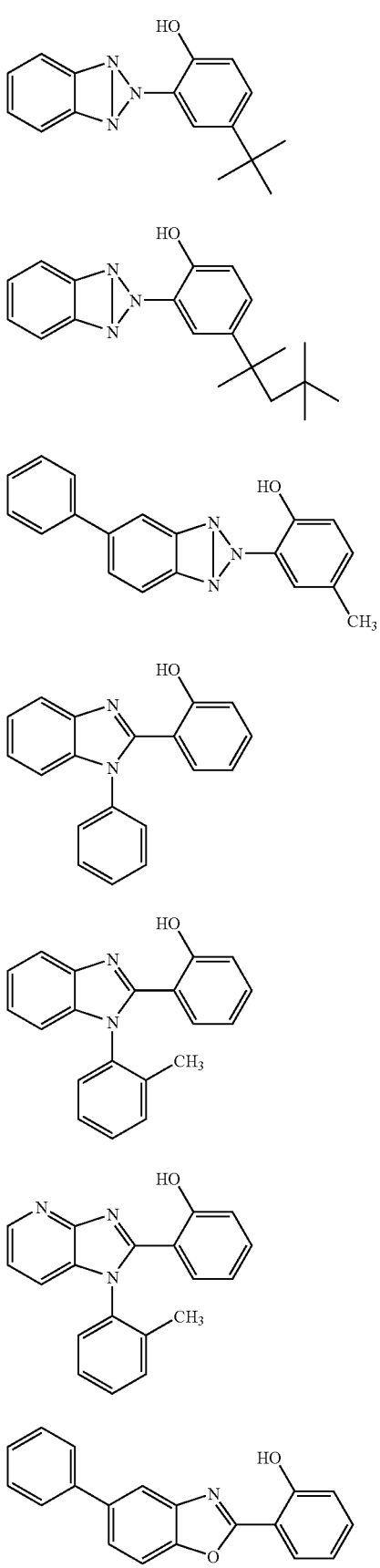

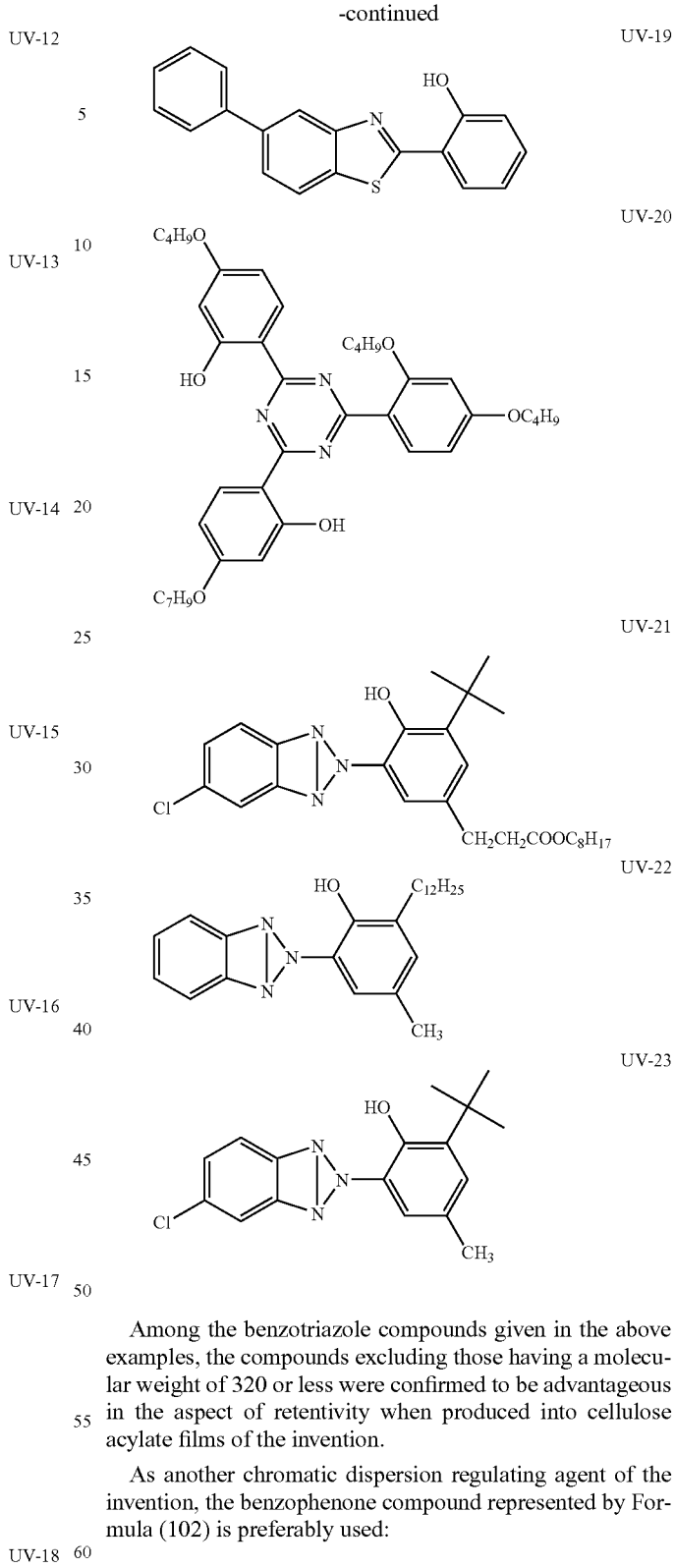

Among the benzotriazole compounds given in the above examples, the compounds excluding those having a molecular weight of 320 or less were confirmed to be advantageous in the aspect of retentivity when produced into cellulose acylate films of the invention.

As another chromatic dispersion regulating agent of the invention, the benzophenone compound represented by Formula (102) is preferably used:

Formula (102)

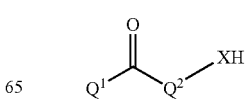

wherein $Q^1$ and $Q^2$ are each independently an aromatic ring, and X is NR (wherein R is a hydrogen atom or a substituent), an oxygen atom or a sulfur atom.

The aromatic ring represented by $Q^1$ and $Q^2$ may be an aromatic hydrocarbon ring or an aromatic heterocyclic ring. These substituents may be monocyclic or may form a fused ring with other rings.

The aromatic hydrocarbon ring represented by $Q^1$ and $Q^2$ is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring represented by $Q^1$ and $Q^2$ is preferably an aromatic heterocyclic rings containing at least one selected from an oxygen atom, a nitrogen atom and a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferred examples of the aromatic heterocyclic ring are pyridine, triazine and quinoline.

The aromatic ring represented by $Q^1$ and $Q^2$ is preferably an aromatic hydrocarbon ring, more preferably an aromatic hydrocarbon ring having 6 to 10 carbon atoms, and even more preferably a substituted or unsubstituted benzene ring.

$Q^1$ and $Q^2$ may be further substituted, and the substituent is preferably the following substituent T. However, the substituent does not include carboxylic acids, sulfonic acids or quaternary ammonium salts. If possible, the substituents may be bonded to each other to form a ring structure.

X is NR (where R is a hydrogen atom or a substituent, and the substituent may be exemplified by the following substituent T), an oxygen atom or a sulfur atom. X is preferably NR (wherein R is preferably an acyl group or a sulfonyl group, and these substituents may be further substituted) or O, and particularly preferably O.

Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopenyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (102) is preferably a compound represented by the following Formula (102-A):

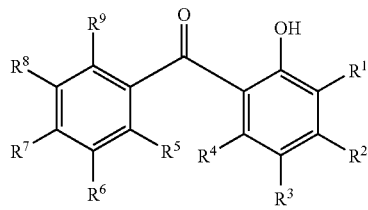

Formula (102-A)

wherein $R^1$, $R^2$, $R^3$, $R^4$, $R^5$, $R^6$, $R^7$, $R^8$ and $R^9$ are each independently a hydrogen atom or a substituent.

$R^1$, $R^2$, $R^3$, $R^4$, $R^5$, $R^6$, $R^7$, $R^8$ and $R^9$ each independently represent a hydrogen atom or a substituent, and the substituent may be exemplified by the above-described substituent T. These substituents may be further substituted with other substituents, and the substituents may be condensed to form a ring structure.

$R^1$, $R^3$, $R^4$, $R^5$, $R^6$, $R^8$ and $R^9$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably an alkoxy group having 1 to 20 carbon atoms; and particularly preferably an alkoxy group having 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 20 carbon atoms (preferably having 1 to 12 carbon atoms, more preferably 1 to 8 carbon atoms, and even more preferably a methyl group); and particularly preferably a methyl group or a hydrogen atom.

The compound represented by Formula (102) is more preferably a compound represented by the following Formula (102-B):

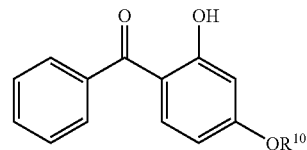

Formula (102-B)

wherein $R^{10}$ is a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group, and the substituents on the aforementioned groups can be exemplified by the substituent T.

$R^{10}$ is preferably a substituted or unsubstituted alkyl group, more preferably a substituted or unsubstituted alkyl group having 5 to 20 carbon atoms, even more preferably a substituted or unsubstituted alkyl group having 5 to 12 carbon atoms (e.g., a hexyl group, a 2-ethylhexyl group, an octyl group, a decyl group, a dodecyl group, a benzyl group, etc.), and particularly preferably a substituted or unsubstituted alkyl group having 6 to 12 carbon atoms (e.g., a 2-ethylhexyl group, an octyl group, a decyl group, a dodecyl group or a benzyl group).

The compound represented by Formula (102) can be synthesized by a known method described in JP-A No. 11-12219.

Specific examples of the compound represented by Formula (102) are given below but the compounds which can be used in the invention are not limited thereto.

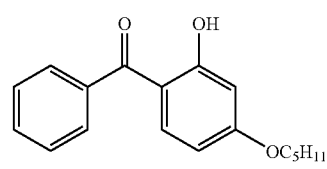

UV-101

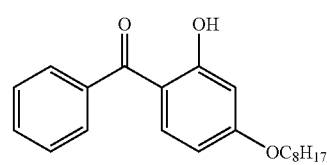

UV-102

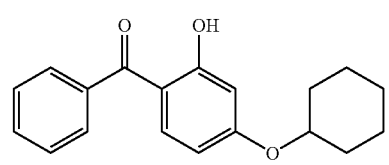

UV-103

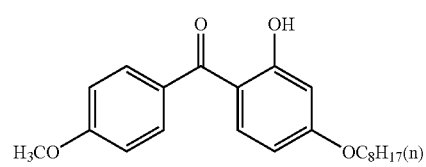

UV-104

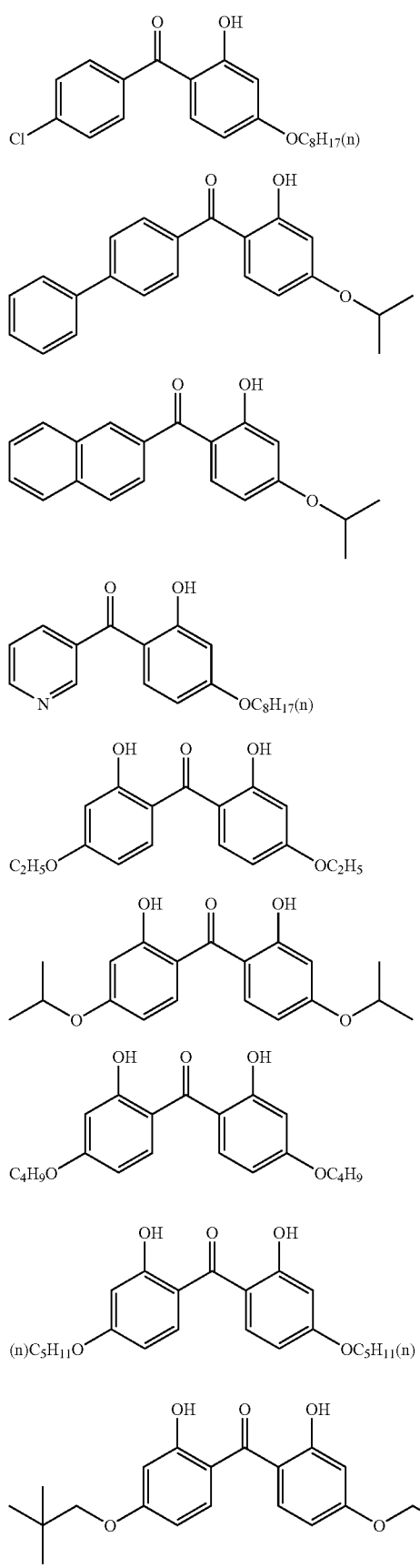
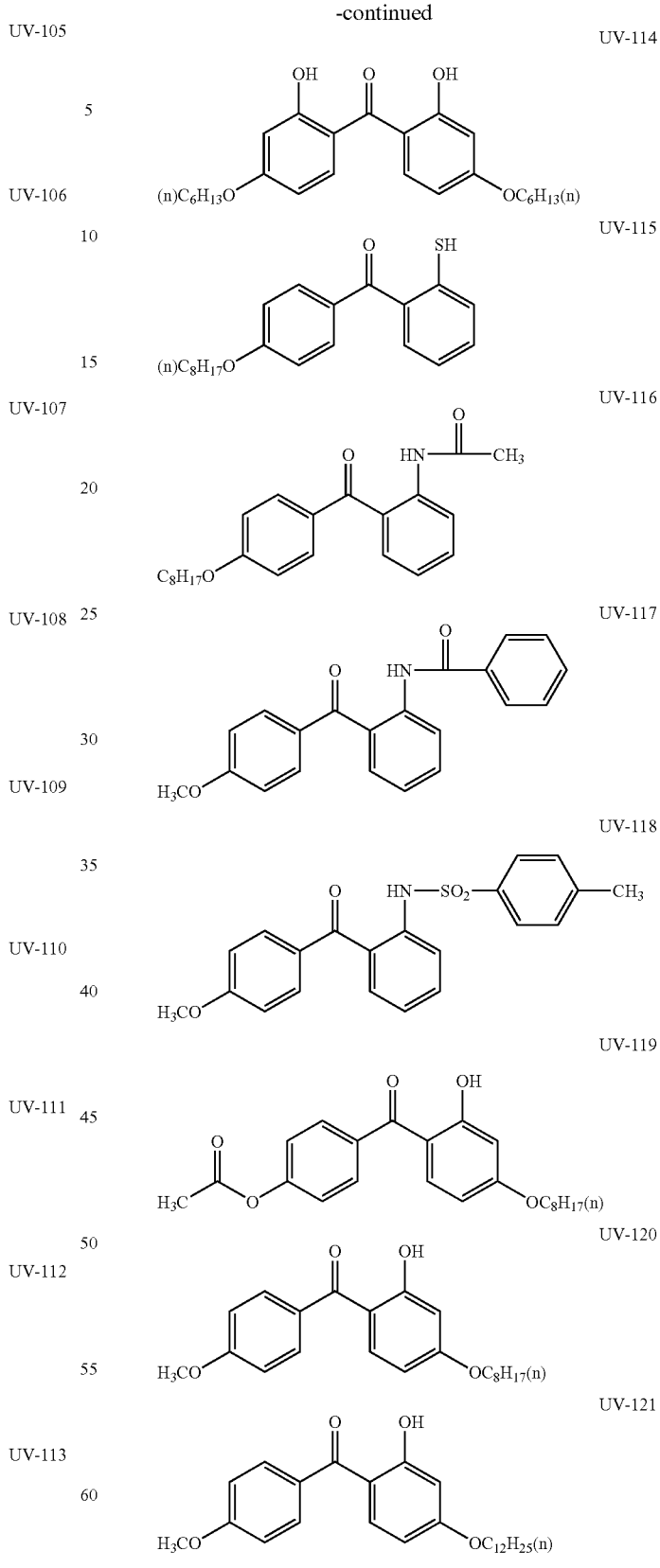
As another chromatic dispersion regulating agent used in the invention, a cyano group-containing compound represented by Formula (103) is preferably used:

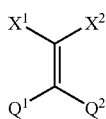

Formula (103)

wherein $Q^1$ and $Q^2$ are each independently an aromatic ring. $X^1$ and $X^2$ are each a hydrogen atom or a substituent, and at least one of them is a cyano group, a carbonyl group, a sulfonyl group or an aromatic heterocyclic ring. The aromatic ring indicated as $Q^1$ and $Q^2$ may be an aromatic hydrocarbon ring or an aromatic heterocyclic ring. Further, these may be monocyclic or may for a fused ring with other rings.

The aromatic hydrocarbon ring is preferably a monocyclic or bicyclic aromatic hydrocarbon ring having 6 to 30 carbon atoms (e.g., benzene ring, naphthalene ring, etc.), more preferably an aromatic hydrocarbon ring having 6 to 20 carbon atoms, even more preferably an aromatic hydrocarbon ring having 6 to 12 carbon atoms, and particularly preferably a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic ring is preferably pyridine, triazine or quinoline.

The aromatic ring indicated as $Q^1$ and $Q^2$ is preferably an aromatic hydrocarbon ring, and more preferably a benzene ring.

$Q^1$ and $Q^2$ may be further substituted, and the following substituent T is preferably used. Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylaminio, etc.), an alkoxy group (preferably having 1 to 20 carbon atoms, more preferably 1 to 12 carbon atom, and particularly preferably 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms, e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atoms, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably 0 to 12 carbon atom; sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably having 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl), and the like. These substituents may be further substituted. When there are two substituents, the may be identical or different. If possible, the substituents may be connected to each other to form a ring.

$X^1$ and $X^2$ are a hydrogen atom or a substituent and at least one group is a cyano group, a carbonyl group, a sulfonyl group, an aromatic heterocyclic ring. A substituent represented by $X^1$ and $X^2$ may be exemplified by the above-mentioned substituent T. In addition, the substituent represented by $X^1$ and $X^2$ may be further substituted by other substituents and each substituent represented by $X^1$ and $X^2$ may be annelated to form a ring structure.

$X^1$ and $X^2$ are preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is preferably a compound represented by the following Formula (103-A):

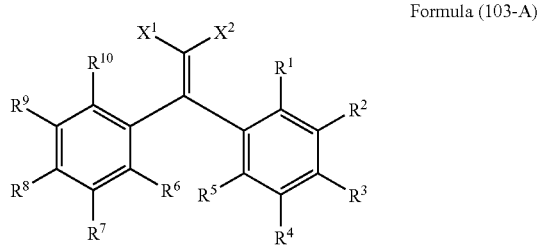

Formula (103-A)

wherein $R^1$, $R^2$, $R^3$, $R^4$, $R^5$, $R^6$, $R^7$, $R^8$, $R^9$ and $R^{10}$ are each independently a hydrogen atom or a substituent. $X^1$ and $X^2$ have the same meanings as those in Formula (103) and their preferable ranges are the same as those in Formula (103).

$R^1$, $R^2$, $R^3$, $R^4$, $R^5$, $R^6$, $R^7$, $R^8$, $R^9$ and $R^{10}$ each independently represent a hydrogen atom or a substituent, and the substituent may be exemplified by the above-described substituent T. These substituents may be further substituted with other substituents, and the substituents may be annelated to form a ring structure.

$R^1$, $R^2$, $R^4$, $R^5$, $R^6$, $R^7$, $R^9$ and $R^{10}$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^3$ and $R^8$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 12 carbon atoms, or an alkoxy group having 1 to 12 carbon atoms; and particularly preferably a hydrogen atom.

The compound represented by Formula (103) is more preferably a compound represented by the following Formula (103-B):

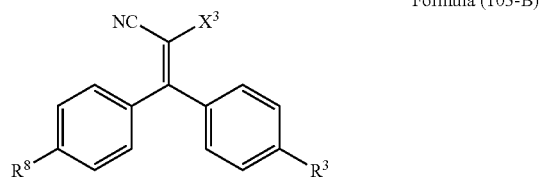

Formula (103-B)

wherein $R^3$ and $R^8$ have the same meanings as those in Formula (103-A) and their preferable ranges are the same as those in Formula (103-A). $X^3$ represents a hydrogen atom or a substituent.

$X^3$ represents a hydrogen atom or a substituent, and the substituent may be exemplified by the above-described substituent T. The substituent may be further substituted with other substituents, if possible. $X^3$ is preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is more preferably a compound represented by the following Formula (103-C):

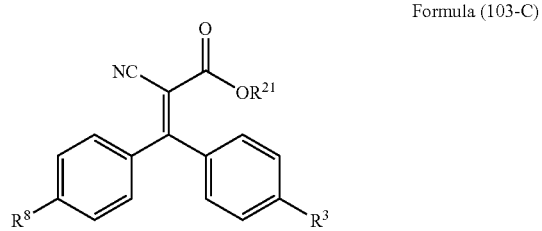

Formula (103-C)

wherein $R^3$ and $R^8$ have the same meanings as those in Formula (103-A) and their preferable ranges are the same as those in Formula (103-A). $R^{21}$ represents an alkyl group having 1 to 20 carbon atoms.

When both of $R^3$ and $R^8$ are a hydrogen atom, $R^{21}$ is preferably an alkyl group having 2 to 12 carbon atoms, more preferably an alkyl group having 4 to 12 carbon atoms, even more preferably an alkyl group having 6 to 12 carbon atoms, particularly preferably an octyl group, a tert-octyl group, a 2-ethylhexyl group, a decyl group, or a dodecyl group, and most preferably 2-ethylhexyl group.

When $R^3$ and $R^8$ are not a hydrogen atom, the compound represented by the Formula (103-C) has a molecular weight of 300 or more and $R^{21}$ is preferably an alkyl group having 20 or less carbon atoms The compound represented by Formula (103) of the invention can be synthesized by a method described in Journal of American Chemical Society, Vol. 63, pp. 3452 (1941).

Specific examples of the compound represented by Formula (103) are given below but the compounds which can be used in the invention are not limited thereto.

UV-201
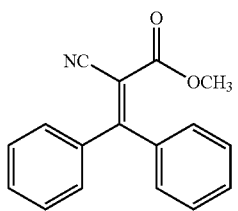
UV-202
UV-203
UV-204
UV-205
UV-206
UV-207
UV-208
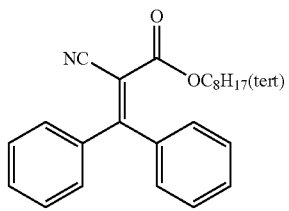
UV-209
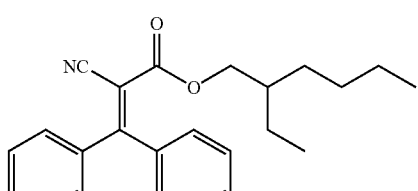
UV-210
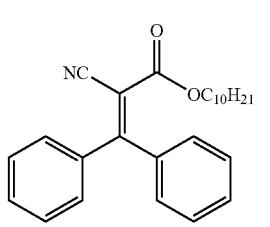
UV-211
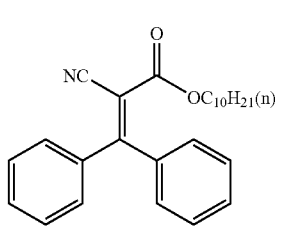
UV-212
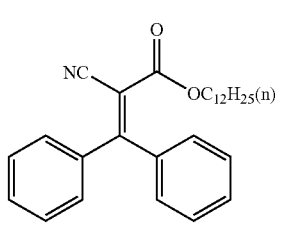
UV-213
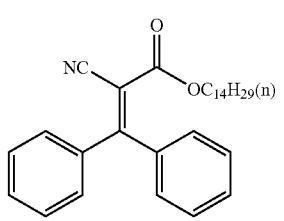
UV-214
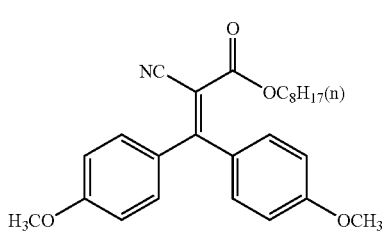

UV-215
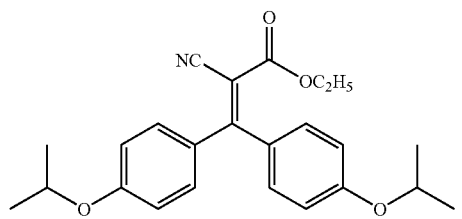
UV-216
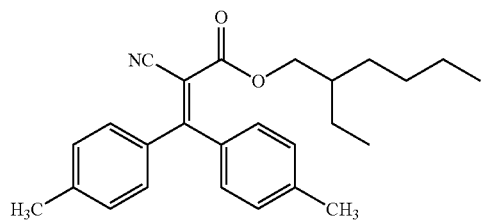
UV-217
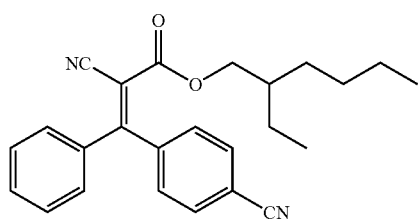
UV-218
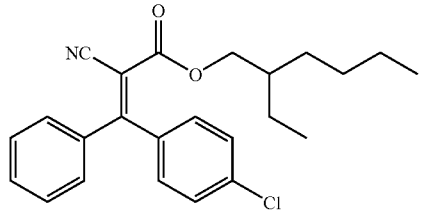
UV-219
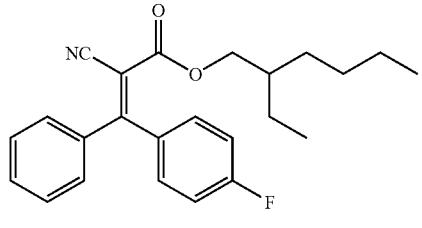
UV-220
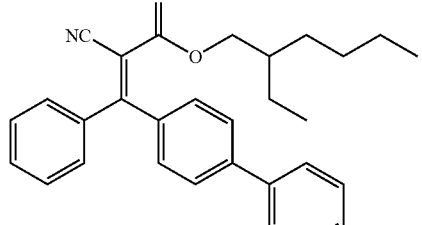
UV-221
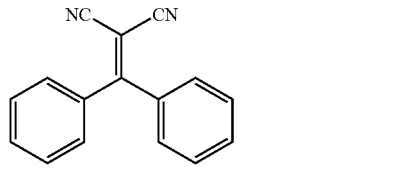
UV-222
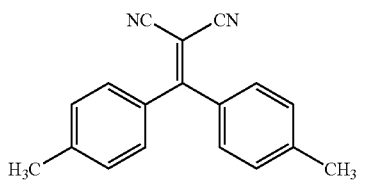
UV-223
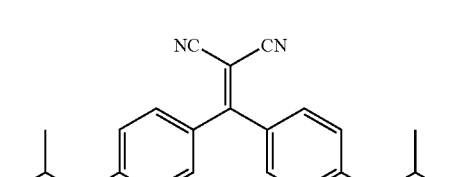
UV-224
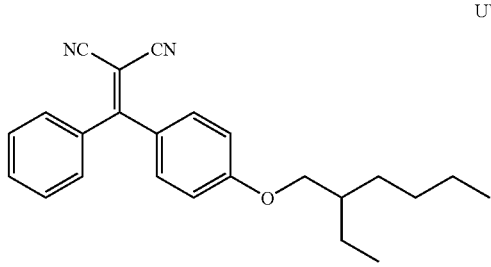
UV-225
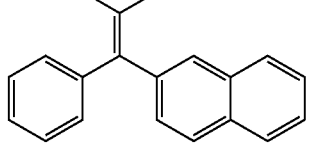
UV-226
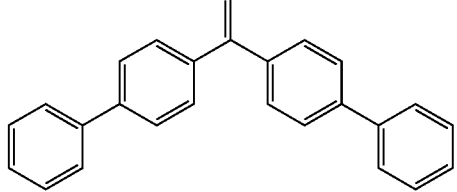
UV-227
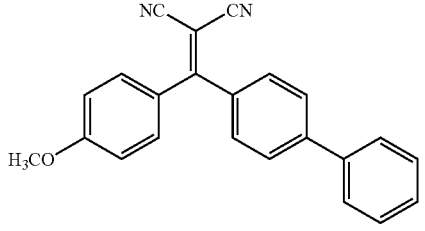
UV-228
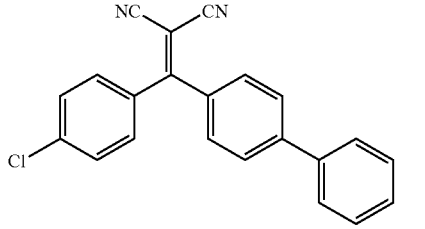

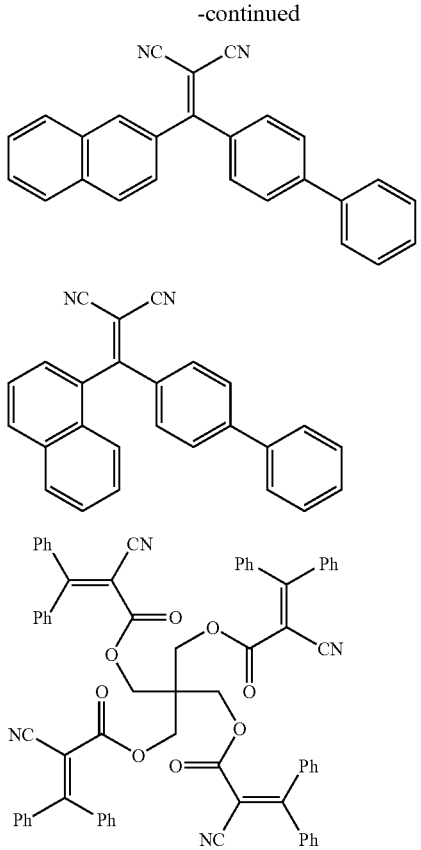

[Fine Particles of Matting Agent]

It is preferable that the cellulose acylate film according to the invention contains fine particles as a matting agent. Examples of the fine particles usable in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferred because of having a low turbidity. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are more preferable, since the haze of the resultant film can be lowered thereby. The apparent specific gravity is preferably form 90 to 200 g/l or more and more preferably from 100 to 200 g/l or more. A higher apparent specific gravity makes it possible to prepare a dispersion having the higher concentration, thereby improving haze and aggregates.

These fine particles form the secondary particles having an average particle size of usually from 0.1 to 3.0 μm. In a film, these fine particles occur as aggregates of the primary particles and provide irregularities of 0.1 to 3.0 μm on the film surface. It is preferred that the average secondary particle size is from 0.2 μm to 1.5 μm, more preferably from 0.4 μm to 1.2 μm and most preferably from 0.6 μm to 1.1 μm. The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, R202, OX50 and TT600 (each manufactured by Dehussa Japan Co., Ltd.). As the fine particles of zirconium oxide, use can be made of products marketed under the trade name of, for example, AEROSIL R976 and R811 (each manufactured by Dehussa Japan Co., Ltd.).

Among these products, AEROSIL 200V and AEROSIL R972V are particularly preferable, since they are fine particles of silicon dioxide having an average primary particle size of 20 nm or less and an apparent specific gravity of 70 g/l or more and exert an effect of largely lowering the coefficient of friction while maintaining the turbidity of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by weight, preferably from 10 to 25% by weight and most preferably from 15 to 20% by weight. A higher dispersion concentration is preferred, since the solution turbidity in response to the amount added is lowered and haze and aggregation are improved thereby. The final content of the cellulose acylate in the dope solution preferably ranges from 0.01 to 1.0 g/m$^2$, more preferably from 0.03 to 0.3 g/m$^2$ and most preferably from 0.08 to 0.16 g/m$^2$.

Preferable examples of lower alcohols usable as the solvent include methyl alcohol, ethyl alcohol, propyl alcohol, isopropyl alcohol and butyl alcohol. As solvents other than lower alcohols, it is preferable to use solvents which have been used in forming cellulose ester films.

Next, the above-mentioned organic solvent used to dissolve cellulose acylate of the invention will be described.

For the organic solvent in the invention, any one of a chlorine-based solvent comprising a chlorine-based organic solvent and a nonchlorine-based solvent without a chlorine-based organic solvent can be used.

[Chlorine-Based Solvent]

When preparing the cellulose acylate solution, according to the invention, it is preferable to use a chlorine-based organic solvent as the main solvent. In the invention, the type of the chlorine-based organic solvent is not particularly limited, as long as the object thereof can be achieved in dissolution, casting and film-forming of the cellulose acylate. These chlorine-based organic solvents are preferably dichloromethane and chloroform, and particularly preferably dichloromethane. Moreover, there is no problem of mixing an organic solvent other than the chlorine-based organic solvents. In this case, the content of dichloromethane should amount at least to 50% by weight in the total amount of the organic solvents. Now, other organic solvents to be used together with the chlorine-based organic solvent in the invention will be described. That is, preferable examples of other organic solvents include solvents selected from esters, ketones, ethers, alcohols and hydrocarbons having 3 to 12 carbon atoms. These esters, ketones, ethers and alcohols may have a cyclic structure. It is also possible to use compounds having two or more functional groups (i.e., —O—, —CO— and —COO—) of esters, ketones and ethers as solvents. For example, these compounds may have another functional group such as alcoholic hydroxyl group at the same time. In the case of a solvent having two or more types of functional groups, the carbon atom number within the range as specified above with respect to a compound having any one of functional groups is acceptable. Examples of esters having 3 to 12 carbon atoms include ethyl formate, propyl formate, pentyl formate, methyl acetate, ethyl acetate, pentyl acetate and the like. Examples of ketones having 3 to 12 carbon atoms include acetone, methylethyl ketone, diethyl ketone, diisobutyl ketone, cyclopentanone, cyclohexanone, methyl cyclohexanone and the like. Examples of ethers having 3 to 12 carbon atoms include diisopropyl ether, dimethoxymethane, dimethoxyethane, 1,4-dioxane, 1,3-dioxolane, tetrahydrofuran, anisole, phenetol and the like. Examples of the organic solvents having two or more types of functional groups include 2-ethoxyethyl acetate, 2-methoxyethanol, 2-butoxyethanol and the like.

The alcohol to be used together with the chlorine-based organic solvent may be a linear, branched or cyclic alcohol. Among these, preferred is a saturated aliphatic hydrocarbon. The hydroxyl group of the alcohol may be any of primary to tertiary hydroxyl groups. Examples of the alcohol include methanol, ethanol, 1-propanol, 2-propanol, 1-butanol, 2-butanol, t-butanol, 1-pentanol, 2-methyl-2-butanol and cyclohexanol. For the alcohol, a fluorinated alcohol can be used. Examples thereof include 2-fluoroethanol, 2,2,2-trifluoroethanol, 2,2,3,3-tetrafluoro-1-propanol and the like. The hydrocarbon may be any one of linear, branched or cyclic. Either an aromatic hydrocarbon or an aliphatic hydrocarbon may be used. The aliphatic hydrocarbon may be either saturated or unsaturated. Examples of the hydrocarbon include cyclohexane, hexane, benzene, toluene and xylene.

Examples of the combination of a chlorine-based organic solvent with other organic solvents are as follows, though the invention is not limited thereto.

Dichloromethane/methanol/ethanol/butanol (80/10/5/5 parts by weight);
dichloromethane/acetone/methanol/propanol (80/10/5/5 parts by weight);
dichloromethane/methanol/butanol/cyclohexane (80/10/5/5 parts by weight);
dichloromethane/methylethyl ketone/methanol/butanol (80/10/5/5 parts by weight);
dichloromethane/acetone/methylethyl ketone/ethanol/isopropanol (75/8/5/5/7 parts by weight)
dichloromethane/cyclopentanone/methanol/isopropanol (80/7/5/8 parts by weight);
dichloromethane/methyl acetate/butanol (80/10/10 parts by weight);
dichloromethane/cyclohexanone/methanol/hexane (70/20/5/5 parts by weight);
dichloromethane/methylethyl ketone/acetone/methanol/ethanol (50/20/20/5/5 parts by weight);
dichloromethane/1,3-dioxolane/methanol/ethanol (70/20/5/5 parts by weight);
dichloromethane/dioxane/acetone/methanol/ethanol (60/20/10/5/5 parts by weight);
dichloromethane/acetone/cyclopentanone/ethanol/isobutanol/cyclohexane (65/10/10/5/5/5 parts by weight);
dichloromethane/methylethyl ketone/acetone/methanol/ethanol (70/10/10/5/5 parts by weight);
dichloromethane/acetone/ethyl acetate/ethanol/butanol/hexane (65/10/10/5/5/5 parts by weight);
dichloromethane/methyl acetoacetate/methanol/ethanol (65/20/10/5 parts by weight); and
dichloromethane/cyclopentanone/ethanol/butanol (65/20/10/5, parts by weight); and the like can be mentioned.

[Nonchlorine-Based Solvent]

Next, a nonchlorine-based organic solvent preferably used in preparing the cellulose acylate solution in the invention will be described. In the invention, the type of the nonchlorine-based organic solvent is not particularly limited, as long as the object thereof can be achieved in dissolution, casting and film-forming of the cellulose acylate. The nonchlorine-based organic solvents used in the invention preferably include solvents selected from esters, ketones and ethers having 3 to 12 carbon atoms. These esters, ketones and ethers may have a cyclic structure. It is also possible to use, as a main solvent, compounds having two or more functional groups (i.e., —O—, —CO— and —COO—) of esters, ketones and ethers. For example, these compounds may have another functional group such as alcoholic hydroxyl group at the same time. In the case of a main solvent having two or more types of functional groups, the carbon atom number within the range as specified above with respect to a compound having any one of functional groups is acceptable. Examples of esters having 3 to 12 carbon atoms include ethyl formate, propyl formate, pentyl formate, methyl acetate, ethyl acetate and pentyl acetate. Examples of ketones having 3 to 12 carbon atoms include acetone, methylethyl ketone, diethyl ketone, diisobutyl ketone, cyclopentanone, cyclohexanone and methyl cyclohexanone. Examples of ethers having 3 to 12 carbon atoms include diisopropyl ether, dimethoxymethane, dimethoxyethane, 1,4-dioxane, 1,3-dioxolane, tetrahydrofuran, anisole and phenetol. Examples of the organic solvents having two or more types of functional groups include 2-ethoxyethyl acetate, 2-methoxyethanol and 2-butoxyethanol.

Although the nonchlorine-based organic solvent to be used in the cellulose acylate is selected from various viewpoints as discussed above, it is favorable to take the following points into consideration. That is, a solvent mixture comprising the above-mentioned nonchlorine-based organic solvent as the main solvent is preferred as a nonchlorine-based solvent. The solvent mixture is a mixture of three or more types of solvents different from each other in which the first solvent is at least one type selected from methyl acetate, ethyl acetate, methyl formate, ethyl formate, acetone, dioxolane, dioxane and mixtures thereof, the second solvent is selected from ketones and acetoacetic acid esters having 4 to 7 carbon atoms, and the third solvent is selected from alcohols and hydrocarbons having 1 to 10 carbon atoms, still preferably alcohols having 1 to 8 carbon atoms. In the case where the first solvent is a mixture of two or more types of solvents, it is possible to employ no second solvent. It is still preferable that the first solvent is methyl acetate, acetone, methyl formate, ethyl formate or a mixture thereof. It is preferable that the second solvent is methylethyl ketone, cyclopentanone, cyclohexanone, methyl acetylacetate or a mixture thereof.

The alcohol as the third solvent may be any one of linear, branched or cyclic. Among these, preferred is a saturated aliphatic hydrocarbon. The hydroxyl group in the alcohol may be any of primary to tertiary hydroxyl groups. Examples of the alcohol include methanol, ethanol, 1-propanol, 2-propanol, 1-butanol, 2-butanol, t-butanol, 1-pentanol, 2-methyl-2-butanol and cyclohexanol. For the alcohol, a fluorinated alcohol can be also used. Examples thereof include 2-fluoroethanol, 2,2,2-trifluoroethanol, 2,2,3,3-tetrafluoro-1-propanol and the like. The hydrocarbon may be anyone of linear, branched or cyclic. Either an aromatic hydrocarbon or an aliphatic hydrocarbon may be used. The aliphatic hydrocarbon may be either saturated or unsaturated. Examples of the hydrocarbon include cyclohexane, hexane, benzene, toluene and xylene. These alcohols and hydrocarbons as the third solvent may be employed either alone or as a mixture of two or more thereof, and not limited thereto. Specific examples of compounds preferable as the third solvent include alcohols such as methanol, ethanol, 1-propanol, 2-propanol, 1-butanol, 2-butanol and cyclohexanol, cyclohexane and hexane. Among these, particularly preferred are methanol, ethanol, 1-propanol, 2-propanol and 1-butanol.

With respect to the mixing ratio of the above-mentioned three solvents in the solvent mixture, it is preferable that the content of the first solvent is 20 to 95% by weight, the content of the second solvent is 2 to 60% by weight and the content of the third solvent is 2 to 30% by weight. It is more preferable that the content of the first solvent is 30 to 90% by weight, the content of the second solvent is 3 to 50% by weight and the content of the third alcohol is 3 to 25% by weight. Further, it is particularly preferable that the content of the first solvent is 30 to 90% by weight, the content of the second solvent is 3 to 30% by weight and the content of an alcohol employed as the third solvent is 3 to 15% by weight. The nonchlorine-based organic solvents to be used in the invention are described in more detail in Japan Institute of Invention and Innovation Journal of Technical Disclosure No. 2001-1745 (Mar. 15, 2001, Japan Institute of Invention and Innovation), p. 12 to 16. Preferable examples of the combination of nonchlorine-based organic solvents in the invention are as follows, though the invention is not limited thereto.

Methyl acetate/acetone/methanol/ethanol/butanol (75/10/5/5/5 parts by weight);
methyl acetate/acetone/methanol/ethanol/propanol (75/10/5/5/5 parts by weight);
methyl acetate/acetone/methanol/butanol cyclohexane (75/10/5/5/5 parts by weight);
methyl acetate/acetone/ethanol/butanol (81/8/7/4 parts by weight);
methyl acetate/acetone/ethanol/butanol (82/10/4/4 parts by weight);
methyl acetate/acetone/ethanol/butanol (80/10/4/6 parts by weight);
methyl acetate/methylethyl ketone/methanol/butanol (80/10/5/5 parts by weight);
methyl acetate/acetone/methylethyl ketone/ethanol/isopropanol (75/8/5/5/7 parts by weight);
methyl acetate/cyclopentanone/methanol/isopropanol (80/7/5/8 parts by weight);
methyl acetate/acetone/butanol (85/10/5 parts by weight);
methyl acetate/cyclopentanone/acetone/methanol/butanol (60/15/14/5/6 parts by weight);
methyl acetate/cyclohexanone/methanol/hexane (70/20/5/5 parts by weight);
methyl acetate/methylethyl ketone/acetone/methanol/ethanol (50/20/20/5/5 parts by weight);
methyl acetate/1,3-dioxolane/methanol/ethanol (70/20/5/5 parts by weight);
methyl acetate/dioxane/acetone/methanol/ethanol (60/20/10/5/5 parts by weight);
methyl acetate/acetone/cyclopentanone/ethanol/isobutanol/cyclohexane (65/10/10/5/5/5 parts by weight);
Methyl formate/methylethyl ketone/acetone/methanol/ethanol (50/20/20/5/5 parts by weight);
methyl formate/acetone/ethyl acetate/ethanol/butanol/hexane (65/10/10/5/5/5 parts by weight);
acetone/methyl acetoacetate/methanol/ethanol (65/20/10/5 parts by weight);
acetone/cyclopentanone/ethanol/butanol (65/20/10/5 parts by weight);
acetone/1,3-dioxolane/ethanol/butanol (65/20/10/5 parts by weight); and
1,3-dioxolane/cyclohexanone/methylethyl ketone/methanol/butanol (55/20/10/5/5/5 parts by weight); and the like can be mentioned.

Using a cellulose acylate solution prepared by the following method is also possible.

A method which comprises preparing a cellulose acylate solution using methyl acetate/acetone/ethanol/butanol (81/8/7/4 parts by weight), filtering, concentrating and then adding 2 parts by weight of butanol thereto.

A method which comprises preparing a cellulose acylate solution using methyl acetate/acetone/ethanol/butanol (84/10/4/2 parts by weight), filtering, concentrating and then adding 4 parts by weight of butanol thereto.

A method which comprises preparing a cellulose acylate solution using methyl acetate/acetone/ethanol (84/10/6 parts by weight), filtering, concentrating and then adding 5 parts by weight of butanol thereto.

The dope used in the invention, in addition to the nonchlorine-based organic solvent as mentioned above, may further contain dichloromethane in an amount of 10% by weight or less based on the total amount of organic solvent contents.

[Characteristics of Cellulose Acylate Solution]

From the viewpoint of suitability for film-forming and casting, it is preferable that the cellulose acylate solution is a solution in which cellulose acylate is dissolved in the above-mentioned organic solvent at a concentration of 10 to 30% by weight, more preferably 13 to 27% by weight and particularly preferably 15 to 25% by weight. The cellulose acylate concentration may be controlled to such a level by controlling the concentration at the dissolution step. Alternatively, it is also possible that a solution of a low concentration (for example, 9 to 14% by weight) is preliminarily prepared and then the concentration is controlled to a predetermined high level in the subsequent concentration step as will be described hereinbelow. It is also possible that a cellulose acylate solution of a high concentration is preliminarily prepared and then various additives are added to give a cellulose acylate solution of a lowered concentration as defined above. Any method may be used without any problem as long as the cellulose acylate solution of a predetermined concentration according to the invention can be obtained thereby.

Next, it is preferable in the invention that the cellulose acylate solution with the organic solvent of the same composition to give a concentration of 0.1 to 5% by weight, has a cellulose acylate aggregate molecular weight of 150,000 to 15,000,000, more preferably 180,000 to 9,000,000. This aggregate molecular weight can be determined by the static light scattering method. It is preferable to make the dissolution to give an inertia square radius, which is determined at the same time, of 10 to 200 nm, and more preferably 20 to 200 nm. It is also preferable to make the dissolution to give a second virial coefficient of $-2\times10^{-4}$ to $+4\times10^{-4}$, and more preferably $-2\times10^{-4}$ to $+2\times10^{-4}$.

Herein, the definitions of the aggregate molecular weight, the inertia square radium and the second virial coefficient will be described. These are measured by using the static light scattering method in accordance with the following procedures. Although the measurement is carried out in a dilute region as a matter of convenience of the device, these measure values reflect behaviors of the dope in the high concentration region of the invention.

First, cellulose acylate is dissolved in a solvent to be used in the dope to give solutions having concentrations of 0.1% by weight, 0.2% by weight, 0.3% by weight and 0.4% by weight. Further, for prevention of water absorption, cellulose acylate which was dried at 120° C. for 2 hours is used and weighed at 25° C. under 10% RH. Dissolution is carried out in accordance with the method employed in dissolving the dope (room-temperature dissolution, cold dissolution and hot dissolution). Subsequently, these solutions and solvents are filtered through a 0.2 μm Teflon filter. Then static light scattering of each solution filtered thereby is measured at 25° C. at 30° to 140° at the intervals of 10° by using a light scattering meter (DLS-700, manufactured by OTUKA ELECTRONICS CO., LTD.). The obtained data are then analyzed by the BERRY plot method. For the refractive index required in the analysis, the value of the solvent is determined using an ABBE refraction system. The concentration gradient (dn/dc) of the refractive index is measured with a differential refractometer (DRM-1021, manufactured by OTUKA ELECTRONICS CO., LTD.) using the solvents and solutions used in measuring light scattering.

[Preparation of Dope]

Next, the preparation of a cellulose acylate solution (dope) will be described. The cellulose acylate dissolving method is not particularly limited, but by room-temperature dissolution, cold dissolution, hot dissolution or a combination thereof can be carried out. Methods of preparing cellulose acylate solutions are described in, for example, JP-A Nos. 5-163301, 61-106628, 58-127737, 9-95544, 10-95854, 10-45950, 2000-53784, 11-322946, 11-322947, 2-276830, 2000-273239, 11-71463, 04-259511, 2000-273184, 11-323017, 11-302388 and the like.

These techniques of dissolving cellulose acylate in organic solvents as mentioned above are appropriately applicable in the invention within the scope of the invention. These techniques can be carried out in accordance with the method described in detail in Japan Institute of Invention and Innovation Journal of Technical Disclosure No. 2001-1745 (Mar. 15, 2001, Japan Institute of Invention and Innovation), p. 22 to 25. Moreover, the cellulose acylate dope solution of the invention is usually concentrated and filtered as described in detail in Japan Institute of Invention and Innovation Journal of Technical Disclosure No. 2001-1745 (Mar. 15, 2001, Japan Institute of Invention and Innovation), p. 25. In hot dissolution, a temperature not lower than the boiling point of the organic solvent employed is used in most cases and the dissolution is performed under elevated pressure.

From the viewpoint of easiness in casting, it is preferable that the cellulose acylate solution has a viscosity and a dynamic storage elastic modulus respectively within the ranges as will be specified below. 1 mL of a sample solution is measured with a rheometer (CLS 500) by using a steel cone of 4 cm/2° in diameter (both manufactured by TA Instruments). The measurement is made by changing the temperature within a range of 40° C. to −10° C. at a rate of 2° C./min with the use of Oscillation Step/Temperature Ramp and the static non-Newtonian viscosity n* (Pa·S) at 40° C. and the storage elastic modulus G' (Pa) at −5° C. are measured. The sample solution is maintained at the starting temperature until the solution temperature remains constant, and then the measurement is started. In the invention, it is preferable that the viscosity at 40° C. is 1 to 400 Pa·S and the dynamic storage elastic modulus at 15° C. is 500 Pa or higher. It is more preferable that the viscosity at 40° C. is 10 to 200 Pa·S and the dynamic storage elastic modulus at 15° C. is 100 to 1,000,000. Moreover, a higher dynamic storage elastic modulus is preferred at a low temperature. In the case where the casting support is −5° C., for example, the dynamic storage elastic modulus at −5° C. preferably is 10,000 to 1,000,000 Pa. In the case where the support is −50° C., the dynamic storage elastic modulus at −50° C. preferably is 10,000 to 5,000,000 Pa.

In the invention, the specific cellulose acylate as defined above is used and thus a dope having a high concentration can be obtained. Thus, a cellulose acylate solution having a high concentration and an excellent stability can be obtained without resort to concentration. To further facilitate the dissolution, the cellulose acylate may be dissolved at a low concentration and then concentrated using a concentration means. The concentration method is not particularly limited. For example, a method which comprises supplying a solution with a low concentration between a cylinder and an outer rotational periphery of rotational blades rotating therein in the peripheral direction and varying the temperature in the solution so as to evaporate a solvent, thereby giving a solution having a high concentration (see, for example, JP-A No. 4-259511), and a method which comprises jetting a heated solution with a low concentration from a nozzle into a container, flush-evaporating a solvent until the solution hits against the inner wall of the container, withdrawing the solvent vapor from the container and then drawing a solution having a high concentration from the bottom of the container (see, for example, U.S. Pat. Nos. 2,541,012, 2,858,229, 4,414,341 and 4,504,355) can be carried out.

Before the casting, the solution is preferably filtered with the use of an appropriate filter material made of, for example, a metallic wire or flannel to thereby eliminate undissolved materials and foreign matters such as dirt and impurities. To filter the cellulose acylate solution, it is preferable to use a filter having an absolute filtration precision of 0.1 to 100 μm, and more preferably to use a filter having an absolute filtration precision of 0.5 to 25 μm. The thickness of the filter is preferably 0.1 to 10 μm, and more preferably 0.2 to 2 μm. In this case, it is preferable to perform the filtration under a filtration pressure of 1.6 MPa or lower, more preferably 1.2 MPa or lower, even more preferably 1.0 MPa or lower and particularly preferably 0.2 MPa or lower. For the filter material, it is preferable to use well-known materials such as glass fiber, cellulose fiber, filter paper or a fluororesin such as ethylene tetrafluoride resin. Among these, ceramics and metals are preferably used therefor. The viscosity of the cellulose acylate solution immediately before the film-forming may be within a range allowing casting in the film-forming. In general, it is preferable to control the viscosity to 10 Pa·S to 2000 Pa·S, more preferably 30 Pa·S to 1000 Pa·S, and still preferably 40 Pa·S to 500 Pa·S. Although the temperature in this step is not particularly limited as long as being the casting temperature, it is preferably −5 to +70° C., and more preferably −5 to +55° C.

[Film-Forming]

The cellulose acylate film of the invention can be obtained by film-forming with the use of the cellulose acylate solution as described above. With respect to a film-forming method and apparatus, the solvent cast film-forming method and a solvent cast film-forming apparatus conventionally employed in forming cellulose triacetate films can be used. A dope (a cellulose acylate solution) prepared in a dissolution machine (pot) is once stored in a storage pot and, after defoaming, the dope is subjected to the final preparation. Then the dope is discharged from a dope exhaust and fed into a pressure die via, for example, a pressure constant-rate pump whereby the dope can be fed at a constant rate at a high accuracy depending on the rotational speed. From the pipe sleeve (slit) of the pressure die, the dope is uniformly cast onto a metallic support continuously running in the casting section. At the peeling point where the metallic support has almost rounded, the half-dried dope film (also called a web) is peeled from the metallic support. The obtained web is clipped at both ends and dried by carrying with a tenter while maintaining the width at a constant level. Subsequently, it is carried with rolls in a dryer to terminate the drying and then wound with a winder in a predetermined length. Combination of the tenter and the rolls in the dryer may vary depending on the purpose. In the solvent cast film-forming method to produce a functional protective film for electronic display, a coater is frequently employed, in addition to the solvent cast film-forming apparatus, so as to process the film surface by providing, for example, an undercoating layer, an antistatic layer, an anti-halation layer or a protective layer. Next, each of the production steps will be briefly described, though the invention is not limited thereto.

First, in forming a cellulose acylate film by the solvent cast method, the cellulose acylate solution (dope) prepared thereby is first cast on a drum or a band and the solvent is evaporated to give a film. Before the casting, it is preferable to control the concentration of the dope to give a solid content of from 5 to 40% by weight. It is preferable that the drum or band surface has been planished. It is preferable that the dope is cast on a drum or a band having a surface temperature of 30° C. or lower and a metallic support temperature of from −10 to 20° C. is particularly preferred. In the invention, it is also possible to employ the methods described in JP-A Nos. 2000-301555, 2000-301558, 07-032391, 03-193316, 05-086212, 62-037113, 02-276607, 55-014201, 02-111511 and 02-208650.

[Layered Casting]

A cellulose acylate solution may be cast as a single layer solution on a smooth band or a drum employed as a metallic support. Alternatively, plural cellulose acylate solutions may be cast in two or more layers. In the case of casting plural cellulose acylate solutions, individual solutions may be cast from plural casting ports provided on the metallic support along the flow direction at certain intervals and laminated to give a film. For example, the methods described in JP-A Nos. 61-158414, 1-122419 and 11-198285 can be used therefor. Further, cellulose acylate solutions may be cast from two casting ports to form a film. For example, the methods described in JP-B No. 60-27562, and JP-A Nos. 61-94724, 61-947245, 61-104813, 61-158413 and 6-134933 can be used therefor. It is also possible to adopt the cellulose acylate film casting method reported in JP-A No. 56-162617 which comprises wrapping a high-viscosity cellulose acylate solution flow in a low-viscosity cellulose acylate solution and extruding both of these high-viscosity and low-viscosity cellulose acylate solutions at the same time. Moreover, it is also a preferred embodiment to employ the methods of JP-A Nos. 61-94724 and 61-94725 in which an outer solution contains an alcoholic solvent, that is a poor solvent in a larger amount than the inner solution. It is also possible to employ the method of, for example, JP-B No. 44-20235 which comprises using two casting ports, peeling a film formed on a metallic support from the first casting port and then effecting the second casting in the side being in contact with the metallic support face to produce a film. The cellulose acylate solutions to be cast may be either the same or different without particular restriction. To impart functions to plural cellulose acylate layers, cellulose acylate solutions appropriate for respective functions may be extruded from the corresponding cast ports. It is also possible to cast the cellulose acylate solution simultaneously with other functional layers (e.g., an adhesive layer, a dye layer, an antistatic layer, an anti-halation layer, an UV absorbing layer and a polarizing layer, etc.).

To achieve a desired film thickness by using a conventional single layer solution, it is necessary to extrude a cellulose acylate solution having a high concentration and a high viscosity. In this case, the poor stability of the cellulose acylate solution frequently causes problems such as machine troubles due to the formation of solid matters and surface irregularities. These problems can be overcome by casting plural cellulose acylate solutions from casting ports. Thus, highly viscous solutions can be simultaneously extruded on the metallic support and thus an excellent film having improved surface smoothness can be obtained. In addition, use of thick cellulose acylate solutions contributes to the reduction in the drying load and, in its turn, the film can be produced at an elevated speed. In the case of the simultaneous casting, the inner thickness and the outer thickness are not particularly limited. It is preferable that the outer thickness amounts to 1 to 50%, and more preferably 2 to 30%, of the total thickness. In the case of simultaneous casting of three or more layers, the total film thickness of the layer being in contact with the metallic support and the layer being in contact with the atmosphere is defined as the outer thickness. In the simultaneous casting, it is also possible to simultaneously cast cellulose acylate solutions differing from each other in the concentrations of additives such as a plasticizer, an ultraviolet absorbent and a matting agent as described above to form a cellulose acylate film of a laminated structure. For example, a cellulose acylate film composed of a skin layer/a core layer/a skin layer can be formed thereby. For example, a matting agent can be added in a larger amount to the skin layers or exclusively to the skin layers. A plasticizer and an ultraviolet absorbent may be added in larger amounts to the core layer than to the skin layer or exclusively to the core layer. It is also possible to use different types of plasticizers or ultraviolet absorbent to the core layer and the skin layers. For example, a less volatile plasticizer and/or ultraviolet absorbent are added to the skin layers, while a plasticizer having an excellent plasticizing effect or an ultraviolet absorbent showing favorable ultraviolet absorption properties may be added to the core layer. It is also a preferred embodiment to add a peeling accelerator exclusively to the skin layer in the metallic support side. Since the solution is gelled by cooling the metallic support by the cooling drum method, it is also preferred to add an alcohol, i.e., a poor solvent in a larger amount to the skin layers than to the core layer. The skin layers and the core layer may have different Tgs. It is preferable that the Tg of the core layer is lower than the Tg of the skin layer. Also, the skin layers and the core layer may show different viscosities of the cellulose acylate solutions in the casting step. It is preferable that the viscosity of the skin layers is lower than the viscosity of the core layer, though the viscosity of the core layer may be lower than the viscosity of the skin layers.

[Casting]

Examples of the method of casting a solution include a method wherein a prepared dope is uniformly extruded from a pressure die to a metallic support, a method with the use of a doctor blade wherein a dope once cast on a metallic support is treated with a blade to control the film thickness, and a method with the use of a reverse roll coater wherein the film is controlled with a coater rotating in the reverse direction. The pressure die method is favorable. There have been known pressure dies of coat hunger type and T-die type and each of them can be preferably employed. In addition to the methods cited above, various methods for forming films by casting cellulose triacetate solutions which have been conventionally known can be used. By setting conditions while considering the differences in boiling point among solvents employed, effects similar to reported in the documents can be established. As the continuously running metallic support to be used in forming the cellulose acylate film according to the invention, use may be made of a drum having chromplated and planished surface or a stainless belt (also called a band) having polished and planished surface. To produce the cellulose acylate film according to the invention, one or more pressure dies may be provided above the metallic support. It is preferred to employ one or two pressure dies. In the case of providing two or more pressure dies, the dope to be cast may be divided into portions in various amounts appropriate for individual dies. It is also possible to feed the dope in various amounts into the dies by using plural precise constant-rate pumps. The temperature of the cellulose acylate solution to be cast preferably ranges from −10 to 55° C., and more preferably 25 to 50° C. The temperature may be maintained at the same level throughout the process or vary from step to step. In the case of varying, the temperature should attain the desired level immediately before the casting.

[Drying]

On the metallic support relating to the production of the cellulose acylate film, the dope is dried generally by the method of blowing a hot air stream from the front face side of the metallic support (a drum or a belt), that is the web surface on the metallic support, the method of blowing a hot air stream form the back face of the drum or the belt, or the liquid heat transfer method comprising bringing a temperature-controlled liquid into contact with the belt or the drum from the back face, which is the opposite face of the dope casting face, thus heating the drum or the belt by heat-transfer and controlling the surface temperature. The back face liquid heat transfer method is favorable. Before the casting, the surface temperature of the metallic support may be at an arbitrary level so long as it is not higher than the boiling points of the solvents employed in the dope. To facilitate the drying or reduce the fluidity on the metallic support, it is preferable to set the surface temperature to a level lower by 1 to 10° C. than the boiling point of a solvent having the lowest boiling point among the solvents employed, which would not apply to the case where the dope having been cast is stripped without cooling and drying.

[Stretching]

The cellulose acylate film of the invention can be produced by stretching 10% or more in the film slow axis direction or in the direction perpendicular to the slow axis. The retardation of the cellulose acylate film of the invention can be controlled by stretching. More particularly, it is also pointed out to stretch in the lateral direction by, for example, JP-A Nos. 62-115035, 4-152125, 4-284211, 4-298310 and 11-48271. In these methods, an obtained film is stretched in order to elevate the in-plane retardation value Re in the cellulose acylate film. The film is stretched at room temperature or under heating. It is preferable that the heating temperature is preferably the glass transition temperature of the film ±20° C. If the end is stretched at an extremely lower temperature than the glass transition temperature, the film is easily cut, and the desired optical characteristics cannot be exhibited. Alternatively, if the end is stretched at an extremely higher temperature than the glass transition temperature, before thermally fixing the molecules which was aligned by stretching, the heat during stretching is weakened whereby the molecules cannot be aligned. Therefore, the exhibition of the optical characteristics is deteriorated.

The film may be stretched either uniaxially in the longitudinal or lateral direction (fixed axis and free axis) or biaxially. The stretching ratio is preferably 10 to 200%, more preferably 12 to 100%, and particularly preferably 15 to 80%. With respect to the multiple refraction of the optical film, it is preferable that the refractive index in the lateral direction exceeds the refractive index in the longitudinal direction. That is, it is preferable to stretch the film at a higher ratio in the lateral direction. The stretching may be carried out in the course of the film-forming. Alternatively, a raw film may be stretched after film-forming and winding. In the former case, the film containing the solvent remaining therein may be stretched. The stretching can be favorably performed at a residual solvent content (residual solvent content/(residual solvent content+solid content)) of 2 to 50%.

Accordingly, the film thickness of the cellulose acylate film of the invention is in the range of 40 to 90 μm. The film thickness may be regulated by controlling the concentration of solid matters contained in the dope, the slit gap at the die sleeve, the extrusion pressure form the die and the speed of the metallic support. The width of the cellulose acylate film obtained thereby is preferably 0.5 to 3 m, more preferably 0.6 to 2.5 m, and even more preferably 0.8 to 2.2 m. It is preferable to wind the film in a length of 100 to 10,000 m per roll, more preferably 500 to 7,000 m, and even more preferably 1000 to 6000 m. In the winding step, it is preferable to provide a knurling at least at one end and the width thereof preferably ranges 3 mm to 50 mm and still preferably 5 mm to 30 mm, while the height thereof preferably ranges 0.5 to 500 μm and still preferably 1 to 200 μm. Knurling may be made either at one end or both ends.

[Optical Characteristics of Cellulose Acylate Film]

It is preferable in the cellulose acylate film of the invention that the $Re_{(633)}$ and $Rth_{(633)}$ values at 25° C. and 60% RH satisfy the following numerical formulas (A) to (C):

$$46 \leq Re_{(630)} \leq 150; \quad (A)$$

$$Rth_{(630)} = a - 5.9 Re_{(630)}; \quad (B)$$

and $$580 \leq a \leq 670. \quad (C)$$

wherein, $Re_{(630)}$ is a in-plane retardation value of the cellulose acylate film at a wavelength of 630 nm, (unit: nm); $Rth_{(630)}$ is a retardation value in the film thickness direction at the wavelength of 630 nm, (unit: nm); and "a" is an adjustable parameter of optical characteristics, (unit: nm).

"a" is an adjustable parameter of Re and Rth, and it is preferably $590 \leq a \leq 660$, and more preferably $600 \leq a \leq 650$. It is preferable that a is within the above range, since the viewing characteristics of vertical alignment liquid crystal display device can be thus enlarged.

From the viewpoint of lessening color change of a liquid crystal display device with the lapse of time, it is preferable in the cellulose acylate film of the invention that the difference between the Re value at 25° C. and 10% RH and the Re value at 25° C. and 80% RH, that is ΔRe (=Re10% RH−Re80% RH) is 0 to 10 nm and the difference between the Rth value at 25° C. and 10% RH and the Rth value at 25° C. and 80% RH, that is ΔRth (=Rth10% RH−Rth80% RH) is 0 to 30 nm.

For the film thickness distribution in the axis direction of Re, 10 samples of 2 cm (axis direction)×3 cm (perpendicular to axis direction), from the 5 cm location of the film end were sampled in the order to obtain 10 pieces in the same interval.

For the film thickness of each sample (2 cm×3 cm), every three locations, total of 9 locations, in the vertical and horizontal directions with respect to the in-plane of the film were measured, and defined as the thickness of the sample.

When the film thickness distribution R is defined as R(%)= (Rmax−Rmin)/Rave×100, wherein Rmax, Rmin and Rave are the maximum value, the minimum value and the average value of the film thickness in the axis direction, respectively, it is preferable that the film thickness distribution R is preferably controlled to 0 to 8%, more preferably controlled to 0 to 7.8%, and even more preferably controlled to 0 to 7.6%. Re and Rth have the values proportional to the film thickness such that the difference between Re(590) and Rth(590) becomes small as much as the film thickness distribution in the axis direction of the film thickness is small, thus preferred.

The distributions of Re(590) and Rth(590) result in irregularity of the above-mentioned film thickness, or result in stretching irregularity, drying irregularity or the like, but it is preferable that the distribution of Re (irregularity) and the distribution of Rth are controlled to 5% or less and 10% or less respectively. More preferably, the distribution of Re is controlled to 4.8% or less and the distribution of Rth is controlled to 9.8% or less, and even more preferably, the distribution of Re is controlled to 4.6% or less and the distribution of Rth is controlled to 9.6% or less.

When the liquid crystal display device (particularly, VA mode liquid crystal display device) is used for displaying with the use of the film, the display irregularity is reduced, thus the above-mentioned film thickness distribution R, the distribution of Re and the distribution of Rth are preferred.

For the cellulose acylate film of the invention, the color difference $\Delta E^*ab$, before and after 500 hours lapse of time at 90° C., is preferably 0.8 or less, still preferably 0.7 or less, more preferably 0.5 or less. Further, the color difference, before and after 24 hours lapse of time at 140° C., is preferably 1.5 or less, more preferably 1.0 or less, and even more preferably 0.5 or less. Under the environment-forcing conditions such as 500 hours lapse of time at 90° C. or 24 hours lapse of time at 140° C., if the film is colored, the optical compensation ability as a retardation film is lowered, which is not preferred, and the appearance is not preferred. Measurement for the color difference was by UV3100 (manufactured by Shimadzu Corporation). For the measurement method, the film was regulated in humidity at 25° C. and 60% RH for 2 hours or more, and then color measurement for the film before thermo lapse of time was carried out to find the initial values (L0*, a0*, b0*). Then, the film was left to stand for a predetermined time in the air theromostatic bath as a single film. After the predetermined time passed, the film was taken out of the constant temperature bath, and regulated in humidity at 25° C. and 60% RH for 2 hours, and then color measurement was carried out again to obtain the values after a thermo lapse of a predetermined time (L1*, a1*, b1*). From this, color difference $\Delta E^*ab=((L0^*-L1^*)^2+(a0^*-a1^*)^2+(b0^*-b1^*)^2)^{1/2}$ was determined.

From the viewpoint of lessening color change of a liquid crystal display device with the lapse of time, it is also preferable in the cellulose acylate film of the invention that the equilibrium moisture content at 25° C. and 80% RH is preferably 5.0% or less, more preferably 4.0% or less, and still more preferably 3.2% or less.

The moisture content is measured by the Karl Fischer method with the use of a sample (7 mm×35 mm) of the cellulose acylate film of the invention, a moisture content meter and a sample dryer (CA-03, VA-05 both manufactured by MITSUBISHI CHEMICAL CO.). The water content (g) is divided by the sample weight (g).

From the viewpoint of lessening color change of a liquid crystal display device with the lapse of time, it is also preferable in the cellulose acylate film of the invention that the water vapor permeability (in terms of 80 μm in film thickness) is preferably 400 g/m²·24 hr to 1800 g/m²·24 hr, in the case of allowed to stand at 60° C. and 95% RH for 24 hours.

The water vapor permeability is lowered with an increase in the film thickness of a cellulose acylate film and elevated with a decrease in the film thickness. It is therefore necessary to convert the water vapor permeability of any sample by setting a standard film thickness of 80 μm. The film thickness is calculated as follows: (water vapor permeability converted as film thickness of 80 μm=measured water vapor permeability×measured film thickness (μm)/80 μm).

For the measuring method, the method described in "The physical property of polymer II" (polymer experiment study 4, published by Kyoritsu Publication) page 285 to 294: measurement of vapor permeability (mass method, thermo-hygrometer, vapor pressure method and absorption amount method) can be applied.

Glass transition temperature is measured as follows. A sample (5 mm×30 mm) of the cellulose acylate film (in an unstretched state) is conditioned at 25° C. and 60% RH for 2 hours or longer and then the glass transition temperature is measured with a dynamic viscoelasticity meter (VIBRON: DVA-225 manufactured by IT KEISOKUSEIGYO K.K.) at a sample length between grips of 20 mm at a heating rate of 2° C./min, over a measurement temperature range of 30° C. to 200° C., and at a frequency of 1 Hz. In a graph having storage elastic modulus as the logarithmic ordinate and temperature (° C.) as the linear abscissa, a line 1 (solid region) and a line 2 (glass transition region) showing a rapid decrease in storage elastic modulus observed at the conversion from the solid region to the glass transition region are drawn. Thus, the intersection of the lines 1 and 2 indicates the temperature from which the storage elastic modulus is rapidly lowered and softening of the film starts. Since the conversion into the glass transition region starts at this point, the temperature is referred to as the glass transition temperature Tg (dynamic viscoelasticity).

Elastic modulus is measured as follows. A sample (10 mm×150 mm) of the dry cellulose acylate film is conditioned at 25° C. and 60% RH for 2 hours or longer and then the elastic modulus is measured with a tensile test machine (STROGRAPHY R2 manufactured by TOYO SEIKI KOGYO Co.) at a distance between chucks of 100 mm, at a temperature of 25° C. and at a stretching speed of 10 mm/min.

It is also preferable that the cellulose acylate according to the invention has a haze of preferably 0.01 to 2%. Haze is measured as follows.

That is, haze is measured by using a sample (40 mm×80 mm) of the cellulose acylate film in accordance with the method defined in JIS K-6714 at 25° C. and 60% RH with the use of a haze meter (HGM-2DP manufactured by SUGA SHIKENKI).

It is also preferable that the cellulose acylate film shows a weight change of preferably 0 to 5% in the case of being allowed to stand at 80° C. and 90% RH for 48 hours.

It is also preferable that the cellulose acylate film shows a dimensional change of preferably 0 to 5% in the cases of being allowed to stand at 60° C. and 95% RH for 24 hours and allowed to stand at 90° C. and 5% RH for 24 hours.

From the viewpoint of lessening color change of a liquid crystal display device with the lapse of time, it is also preferable that the cellulose acylate film according to the invention has a photoelastic coefficient of preferably $50 \times 10^{-3}$ cm$^2$/dyne or less.

Specifically, photoelastic coefficient is measured by applying a tensile stress in the longitudinal direction to a sample (10 mm×100 mm) of the cellulose acylate film according to the invention and measuring the retardation with an ellipsometer (M150 manufactured by JASCO ENGINEERING). Then the photoelastic coefficient is calculated based on the change in retardation due to the stress.

[Polarizing Plate]

Next, the polarizing plate according to the invention will be illustrated.

Usually, a polarizing plate comprises a polarizer and two protective films provided on both side of the polarizer. In the invention, the cellulose acylate film according to the invention is used as at least one of protective films. As the other protective film, use may be made of either the cellulose acylate film according to the invention or a commonly employed cellulose acylate film. Examples of the polarizer include an iodine polarizer, a dye polarizer using a dichromatic dye and a polyene polarizer. The iodine polarizer and the dye polarizer are generally prepared from polyvinyl alcohol films. In the case of using the cellulose acylate film according to the invention as a protective film for a polarizing plate, the polarizing plate may be produced by a commonly employed method without restriction. For example, a method comprising treating the obtained cellulose acylate film with an alkali and bonded to both faces of a polarizer, which has been formed by immersing a polyvinyl alcohol film in an iodine solution and stretching, with the use of an aqueous solution of completely saponified polyvinyl alcohol can be used. As a substitute for the alkali treatment, it is also possible to employ an easy adhesion processing as described in JP-A Nos. 6-94915 and 6-118232. As an adhesive to be used in bonding the treated face of the protective film to the polarizer, use may be made of, for example, polyvinyl alcohol-based adhesives such as polyvinyl alcohol and polyvinylbutyral and vinyl-based latexes such as butyl acrylate. The polarizing plate is composed of the polarizer and the protective film protecting both faces thereof. It may further have a protect film on one face of the polarizing plate and a separate film on the opposite face thereof. The protect film and the separate film are employed in order to protect the polarizing plate during shipment, product inspection and other steps. In this case, the protective film, which aims at protecting the surface of the polarizing plate, is bonded to the face opposite to the face of the polarizing plate to be bonded to a liquid crystal plate. On the other hand, the separate film, which aims at covering the adhesive layer to be bonded to the liquid crystal plate, is bonded to the face of the polarizing plate to be bonded to the liquid crystal face.

As shown in FIG. 1, it is preferable that the cellulose acylate film is bonded to a polarizer so that the transmission axis of the polarizer agrees with the slow axis of the cellulose acylate film (TAC1 in FIG. 1).

Further, in the case where the orthogonal accuracy of the slow axis of the cellulose acylate film to the absorption axis (being orthogonal to the transmission axis) of the polarizer exceeds 1°, a polarizing plate produced under cross Nicols suffers from lowering in polarization degree performance and, in its turn, light leaks. By combining such a polarizing plate with a liquid crystal cell, it is impossible to attain a sufficient black level or contrast. It is therefore favorable that the deviation in angle between the direction of the main refractive index nx of the cellulose acylate film according to the invention and the direction of the transmission axis of the polarizing plate is not more than 1°, and still preferably not more than 0.5°.

According to the invention, the single plate transmittance TT, the parallel transmittance PT and the cross transmittance CT of the polarizing plate are measured by using UV3100PC (manufactured by SHIMZDZU CORPORATION) within a range of 380 nm to 780 nm at 25° C. and 60% RH. In each of TT, PT and CT, the mean of values measured 10 times is adopted. The polarizing plate durability test is carried out in two modes including (1) the polarizing plate alone and (2) the polarizing plate bonded to a glass plate via a pressure-sensitive adhesive. To measure the polarizing plate alone, two samples each having an optical compensating film inserted between two polarizers are prepared and located orthogonally. In the mode of bonding the polarizing plate to a glass plate, two samples (about 5 cm×5 cm) each having the polarizing plate bonded to the glass plate in such a manner that the optical compensating film is in the glass plate side are prepared. The single plate transmittance is measured by setting the film side of the samples toward a light source. Two samples are measured respectively and the mean is referred to as the transmittance of single plate. As a preferred range of the polarizing performance, the single plate transmittance, the parallel transmittance and the cross transmittance are sequentially measured, and each of the values satisfies the conditions: $40.0 \leq TT \leq 45.0$, $30.0 \leq PT \leq 40.0$, and $CT \leq 2.0$, more preferably $40.2 \leq TT \leq 44.8$, $32.2 \leq PT \leq 39.5$, and $CT \leq 1.6$, and still more preferably $41.0 \leq TT \leq 44.6$, $34 \leq PT \leq 39.1$, and $CT \leq 1.3$.

From these transmittances, a polarization degree, P is calculated, and as the polarization degree, P is higher, the performance of the polarizing plate is higher due to less amount of light leaked when cross aligned. The polarization degree, P is preferably 95.0% or more, more preferably 96.0% or more, and still more preferably 97.0% or more.

As for the polarizing plate according to the invention, $T_{(380)}$, $T_{(410)}$ and $T_{(700)}$ preferably satisfy at least one of the conditions (e) to (g):

$$T_{(380)} \leq 2.0; \quad \text{(e)}$$

$$T_{(410)} \leq 1.0; \quad \text{(f)}$$

and $$T_{(700)} \leq 0.5 \quad \text{(g)}$$

wherein $T(\lambda)$ is a cross transmittance at the wavelength of λ nm.

More preferably, they satisfy the conditions: $T(380) \leq 1.95$, $T(410) \leq 0.9$; and $T(700) \leq 0.49$, and still more preferably $T(380) \leq 1.90$, $T(410) \leq 0.8$; and $T(700) \leq 0.48$.

As for the polarizing plate of the invention, ΔCT and ΔP preferably satisfy at least one of the following conditions (j) and (k):

$$-6.0 \leq \Delta CT \leq 6.0; \quad \text{(j)}$$

and $$-10.0 \leq \Delta P \leq 0.0 \quad \text{(k)}$$

wherein ΔCT and ΔP each represent a change in cross transmittance and polarization degree, respectively, in a test that the polarizing plate is allowed to stand at 60° C. and 95% RH for 500 hours (provided that the change means a value calculated by subtracting a measurement value before the test from a measurement value after the test).

The polarizing plate of the invention further preferably satisfies −5.8≦ΔCT≦5.8, and −9.5≦ΔP≦0.0, and further more preferably −5.6≦ΔCT≦5.6, and −9.0≦ΔP≦0.0.

As for the polarizing plate of the invention, ΔCT and ΔP preferably satisfy at least one of the conditions (h) and (i)

$$-3.0 \leq \Delta CT \leq 3.0; \quad \text{(h)}$$

and $$-5.0 \leq \Delta P \leq 0.0 \quad \text{(i)}$$

wherein ΔCT and ΔP each represent a change in cross transmittance and polarization degree, respectively, in a test that the polarizing plate is allowed to stand at 60° C. and 90% RH for 500 hours As for the polarizing plate of the invention, ΔCT and ΔP preferably satisfy at least one of the conditions (l) and (m)

$$-3.0 \leq \Delta CT \leq 3.0; \quad \text{(l)}$$

and $$-2.0 \leq \Delta P \leq 0.0 \quad \text{(m)}$$

wherein ΔCT and ΔP each represent a change in cross transmittance and polarization degree, respectively, in a test that the polarizing plate is allowed to stand at 80° C. for 500 hours.

Further, in the polarizing plate durability test, larger changes denote better performance.

The optically anisotropic layer may be provided on the surface of the cellulose acylate film having optical anisotropy. An alignment film which controls the alignment of the liquid crystalline compound in optically anisotropic layer, may be provided between the cellulose acylate film and the optically anisotropic layer.

[Optically Anisotropic Layer]

The optically anisotropic layer can be formed from the liquid crystalline compound, and thus may be formed on the surface of the support made of the cellulose acylate film, or may be formed on an orientation film thus formed. Further, the liquid crystalline compound layer formed on another base material is transferred onto the cellulose acylate film with a sticker, an adhesive, or the like to prepare an optical compensation film.

The liquid crystalline compound used in formation of the optically anisotropic layer includes rod-shaped liquid crystalline compounds and disc-shaped liquid crystalline compounds (hereinbelow, sometimes referred to as discotic liquid crystalline compounds). The rod-shaped liquid crystalline compounds and the discotic liquid crystalline compounds may be high-molecular liquid crystals or low-molecular liquid crystals. In addition, the compounds which are consequently incorporated into the optically anisotropic layer do not have to already exhibit liquid-crystallinity, and for example, when low-molecular liquid crystalline compounds are used for preparing the optically anisotropic layer, during the formation of the optically anisotropic layer, the compound may not be cross-linked and liquid crystalline.

(Rod-Shaped Compound Liquid Crystalline Compounds)

The rod-shaped compound liquid crystalline compounds used in the invention preferably include azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolanes and alkenylcyclohexylbenzonitriles. Further, the rod-shaped compound liquid crystalline compounds also include metal complexes. Liquid-crystal polymers that contain the rod-shaped compound liquid crystalline compounds in the repetitive units are also usable. In other words, the rod-shaped compound liquid crystalline compounds for use herein may bond to (liquid-crystal) polymer.

The rod-shaped compound liquid crystalline compounds are described in Quarterly Journal of General Chemistry, Vol. 22, Liquid Crystal Chemistry (1994), Chapters 4, 7 and 11, edited by the Chemical Society of Japan; Liquid Crystal Devices Handbook, edited by the 142$^{nd}$ Committee of the Nippon Academic Promotion, Chapter. 3.

The birefringence of the rod-shaped compound liquid crystalline compound used in the invention may preferably be in the range of 0.001 and 0.7.

Preferably, the rod-shaped compound liquid crystalline compounds have a polymerizable group for fixing their orientation condition. The polymerizable group is preferably a polymerizable unsaturated group or an epoxy group, more preferably polymerizable unsaturated group, and most preferably an ethylenically polymerizable unsaturated group.

(Discotic Liquid Crystalline Compound)

As a discotic liquid crystalline compound, there is a benzene derivative described in the research report by C. Destrade, et al., Mol. Cryst., Vol. 71, p. 111 (1981), a truxene derivative described in the research report by C. Destrade, et al., Mol. Cryst., Vol. 122, p. 141 (1985) and Physics lett, A, Vol. 78, p. 82 (1990), a cyclohexane derivative described in the research report by B. Kohne, et al., Angew. Chem. Vol. 96, p. 70 (1984), and azacrown or phenylacetylene macrocycle described in the research report by J. M. Lehn, et al., J. Chem. Commun., p. 1794 (1985) and the research report by J. Zhang, et al., J. Am. Chem. Soc. Vol. 116, p. 2655 (1994).

The discotic liquid crystalline compound includes a compound in which liquid crystallinity is shown and the molecular center nucleus is radically substituted with a linear alkyl, alkoxy or substituted benzoyloxy group as the side chain of the mother nucleus. Preferably, the molecules or the molecular aggregates of the compounds are rotary-symmetrical and may undergo certain alignment.

It is no always necessary that, when an optically anisotropic layer is formed of such liquid crystalline compound, the compound that is finally in the optically anisotropic layer is a liquid crystalline compound. For example, when a low-molecular discotic liquid crystalline compound has a group capable of reacting with heat or light, and they polymerize or crosslink through thermal or optical reaction to give a high-molecular compound to form an optically anisotropic layer, the compound contained in the optically anisotropic layer may always have no liquid crystallinity. Preferred examples of the discotic liquid crystalline compound are described in JP-A No. 8-50206. Further, polymerization of the discotic liquid crystalline compound is described in JP-A No. 8-27284.

In order to fix the discotic liquid crystalline compound through polymerization, the discotic core of the discotic liquid crystalline compound must be substituted with a polymerizable group. However, if the polymerizable group directly bonds to the discotic core, it is difficult to keep the alignment condition in the polymerization reaction. A linking group is introduced between the discotic core and the polymerizable group. Thus, the discotic liquid crystalline compound having the polymerizable group is preferably a compound represented by the following Formula (III).

$$D(-L-Q)_n \quad \text{Formula (III)}$$

wherein, D is a discotic core, and L is a divalent linking group, Q is a polymerizable group, and n is an integer of 4 to 12.
An example of the discotic core (D) is shown as follows. In each of the following examples, LQ (or QL) means a combination of the divalent linking group (L) with the polymerizable group (Q).
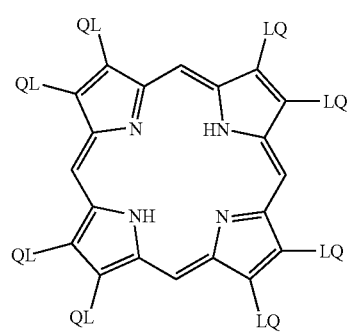
(D1)
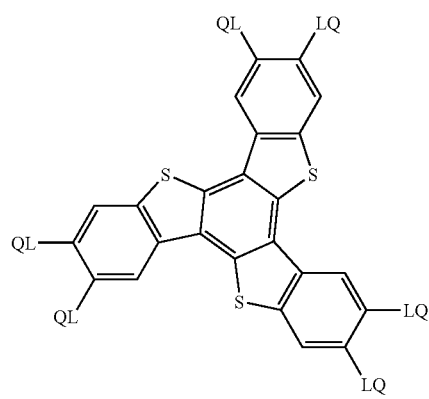
(D2)
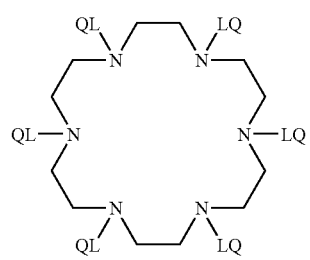
(D3)
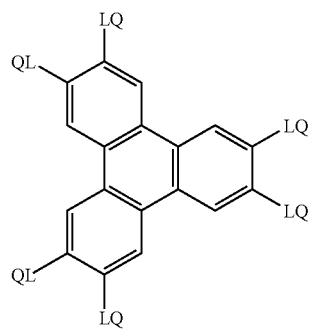
(D4)
-continued
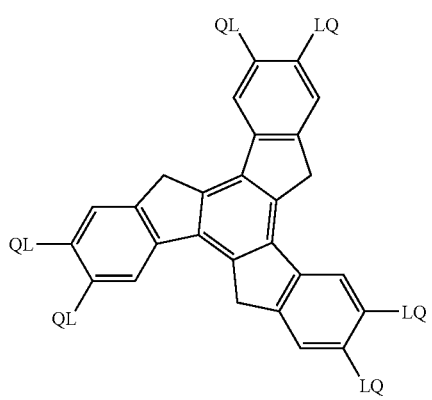
(D5)
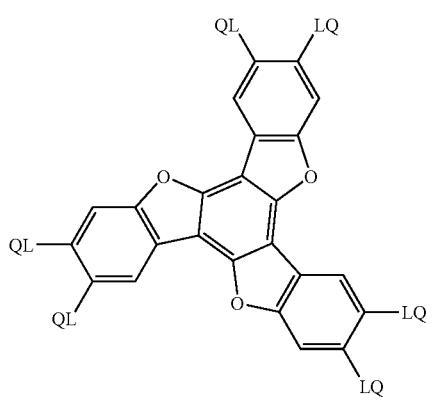
(D6)
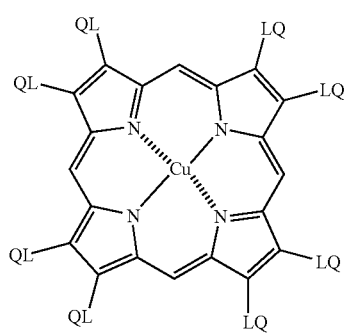
(D7)
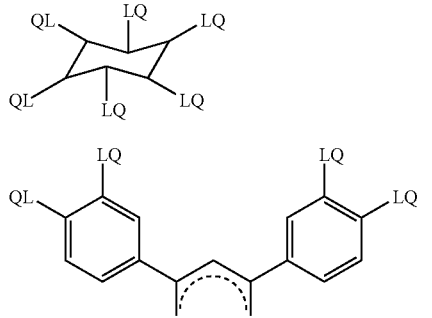
(D8)
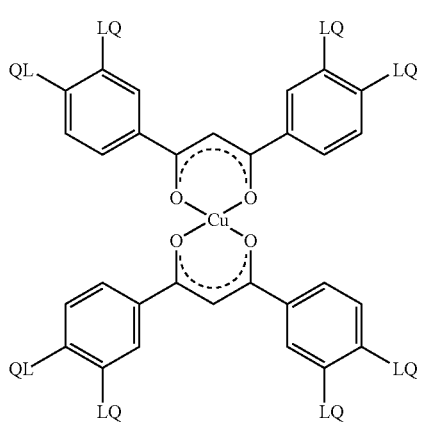
(D9)

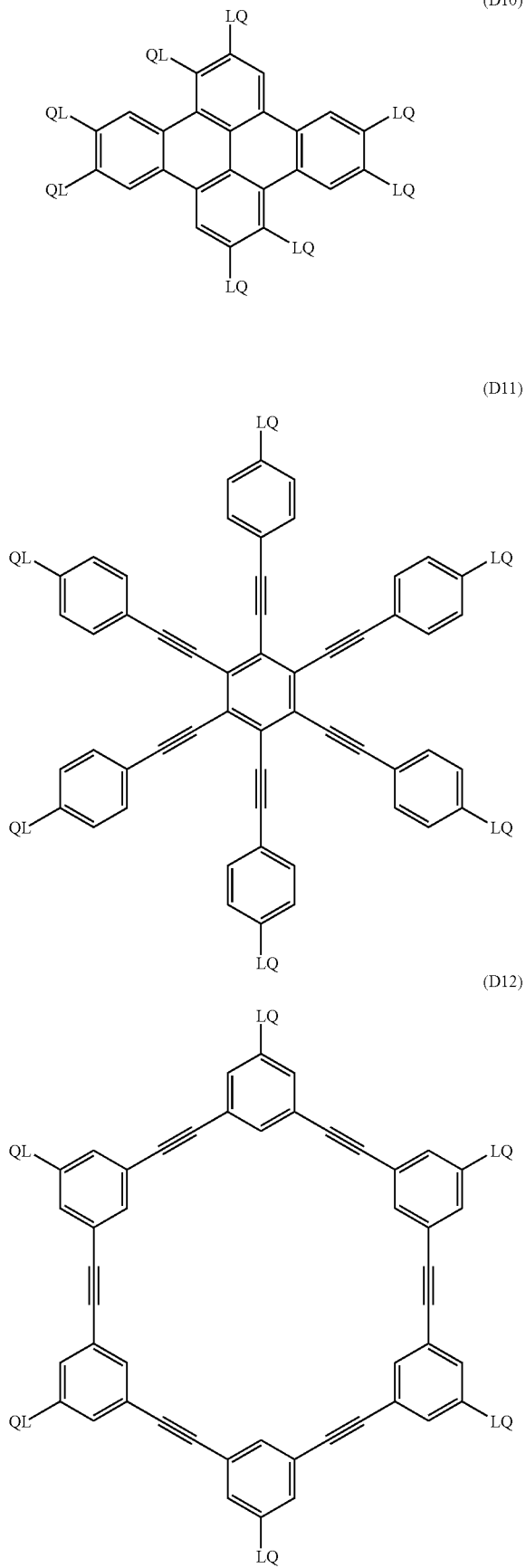

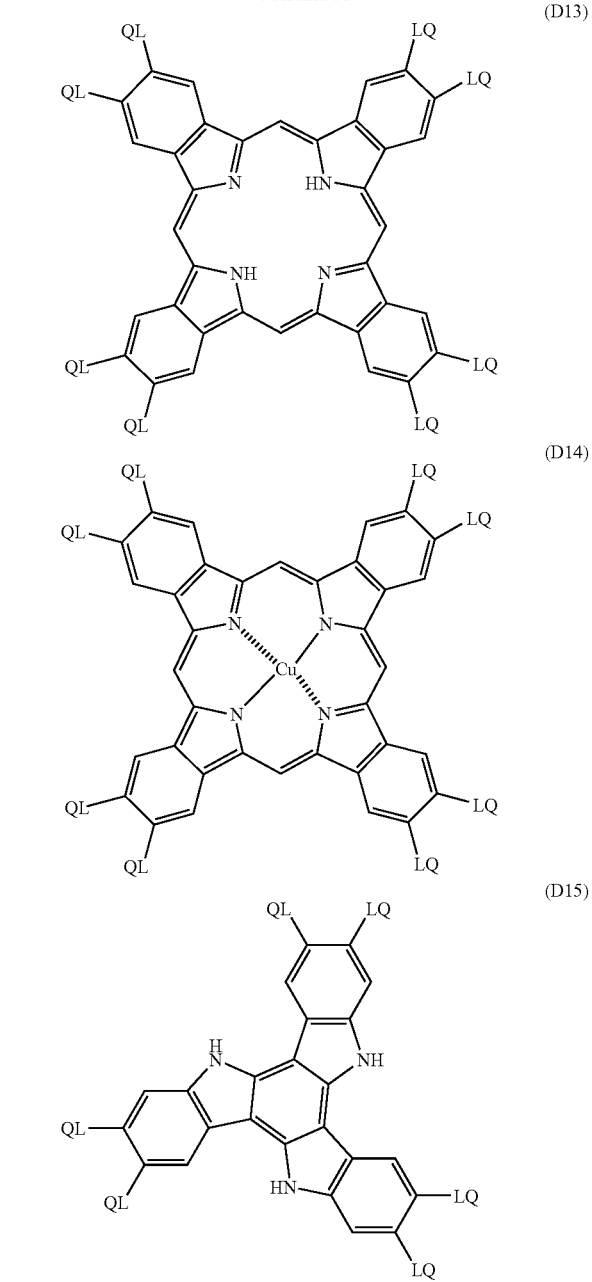

In Formula (III), it is preferable that the divalent linking group (L) is a divalent linking group selected from the group comprising an alkylene group, an alkenylene group, an arylene group, —CO—, —NH—, —O—, —S— and combination thereof. More preferably, the divalent linking group (L) is a divalent linking group of at least two in combination of a divalent group selected from the group comprising an alkylene group, an arylene group, —CO—, —NH—, —O— and —S—. Most preferably, the divalent linking group (L) is a divalent linking group of at least two in combination of a divalent group selected from the group comprising an alkylene group, an arylene group, —CO— and O—. The alkylene group preferably has 1 to 12 carbon atoms. The alkenylene group preferably has 2 to 12 carbon atoms. The arylene group preferably has 6 to 10 carbon atoms.

An example of the divalent linking group (L) is shown as follows. Left sides bond to the discotic core (D), and right sides bond to the polymerizable group (Q). AL means an alkylene group or an alkenylene group, and AR means an arylene group. In addition, the alkylene group, the alkenylene group and the arylene group may have substituents (for example, an alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR—O-AL-
L6: —CO-AR—O-AL-O—
L7: —CO-AR—O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR—O-AL-CO—
L17: —O—CO-AR—O-AL-O—CO—
L18: —O—CO-AR—O-AL-O-AL-O—CO—
L19: —O—CO-AR—O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) in Formula (III) is determined in accordance with the kind of polymerization reactions. The polymerizable group (Q) is preferably an unsaturated polymerizable group or an epoxy group, more preferably an unsaturated polymerizable group, and most preferably an ethylenic unsaturated polymerizable group. In Formula (III), n is an integer of 4 to 12. Specific number is determined in accordance with the kind of the discotic core (D). In addition, it is preferable that a combination of a plurality of L and Q may be the same as or different from each other.

In the invention, molecules of the above-described rod-shaped compound or discotic compound are fixed as they are in alignment in the above-described optically anisotropic layer. The crossing angle of the average alignment direction of the molecular symmetry axis of the liquid crystalline compound in the interface of the above-described cellulose acylate film side and the slow axis within the plane of the above-described cellulose acylate film is simply referred as 45°. Further, in the specification, "simply referred as 45°" means the angle in the range of 45°±5°, preferably 42 to 48°, and more preferably 43 to 47°. Preferably, the average direction of the molecular symmetry axis of the liquid crystalline compound in the above-described optically anisotropic layer is 43 to 47° with respect to the longitudinal direction of the support (i.e., the fast axis direction of the support).

In general, the average alignment direction of the molecular symmetry axis of the liquid crystalline compound can be adjusted by selecting a liquid crystalline compound or materials of an alignment film, or the rubbing treatment. In the invention, for example, in the case of preparing an alignment film for forming optically anisotropic layers by the rubbing treatment, the film is subjected to rubbing in the direction of 45° with respect to the slow axis of the support, to form an optically anisotropic layer where the average alignment direction of the molecular symmetry axis of the liquid crystalline compound at least in the interface of the support is 45° with respect to the slow axis of the cellulose acylate film. For example, the optical compensation film used in the invention can be continuously prepared using a long cellulose acylate film parallel with the longitudinal direction of the slow axis. Specifically, a coating solution for forming alignment films is continuously coated on the surface of the long cellulose acylate film to prepare a film. Then, the surface of the film is continuously subjected to rubbing in the direction of 45° with respect to the longitudinal direction to prepare an alignment film. Next, a coating solution for forming optically anisotropic layers containing liquid crystalline compounds is continuously coated on the prepared alignment film, and then molecules of the liquid crystalline compound are aligned. By fixing the alignment condition, an optically anisotropic layer can be prepared to continuously prepare a long optical compensation film. The long optical compensation film thus prepared is cut out into a desired shape before incorporated in the liquid crystal display device.

In addition, in the average alignment direction of the molecular symmetry axis of the surface side (the air side) of the liquid crystalline compound, the average alignment direction of the molecular symmetry axis of the liquid crystalline compound in the air interface side is preferably simply referred as 45°, more preferably 42 to 48°, and even more preferably 43 to 47° with respect to the slow axis of the cellulose acylate film. In general, the average alignment direction of the molecular symmetry axis of the liquid crystalline compound in the air interface side can be adjusted by selecting liquid crystalline compounds or the kind of additives to be used together with the liquid crystalline compounds. Examples of the additives to be used together with the liquid crystalline compounds include a plasticizer, a surfactant, polymerizable monomers, polymers or the like. The degree of the alignment direction of the molecular symmetry axis to be changed can be also adjusted by selecting liquid crystalline compounds or additives as described above. Particularly, it is preferable to use the surfactant capable of controlling the surface tension of the above-described coating solution.

Since the plasticizer, the surfactant and the polymerizable monomers used together with the liquid crystalline compound have compatibility with the discotic liquid crystalline compound, it is preferable to change the inclined angle of the liquid crystalline compound or not to inhibit the alignment. The polymerizable monomers (for example, a compound having a vinyl group, a vinyloxy group, an acryloyl group and a methacryloyl group) are preferable. An amount of the above-described compound to be added is generally in the range of 1 to 50% by weight and preferably in the range of 5 to 30% by weight with respect to the liquid crystalline compound. Moreover, when the polymerizable monomer having four or more reactive functional groups is mixed and then used, the adhesion between the alignment film and the optically anisotropic layer may be enhanced.

When the discotic liquid crystalline compound is used as the liquid crystalline compound, it is preferable to use polymers having a certain degree of compatibility with the discotic liquid crystalline compound and having influence on the inclined angle change to the discotic liquid crystalline compound.

Example of the polymer may include cellulose ester. Preferred examples of the cellulose ester may include cellulose acetate, cellulose acetate propionate, hydroxypropyl cellulose and cellulose acetate butyrate. In order not to inhibit the alignment of the discotic liquid crystalline compound, an amount of the polymer to be added is preferably in the range of 0.1 to 10% by weight, more preferably in the range of 0.1 to 8% by weight, and further preferably in the range of 0.1 to 5% by weight with respect to the discotic liquid crystalline compound.

The transition temperature of discotic nematic liquid crystal phase-solid phase of the discotic liquid crystalline compound is preferably 70 to 300° C. and more preferably 70 to 170° C.

In the invention, the above-described optically anisotropic layer has optical anisotropy at least within the plane. In the above-described optically anisotropic layer, a front retardation Re is preferably 3 to 300 nm, more preferably 5 to 200 nm and further preferably 10 to 100 nm, and a retardation in the thickness direction Rth is preferably 20 to 400 nm and more preferably 50 to 200 nm. Further, a thickness of the optically anisotropic layer is preferably 0.1 to 20 μm, more preferably 0.5 to 15 μm, and most preferably 1 to 10 μm.

[Alignment Film]

The optical compensation film used in the invention may have an alignment film between the support and the optically anisotropic layer. Further, the alignment film is used only when the optically anisotropic layer is prepared. Thus, after preparing the optically anisotropic layer on the alignment film, only the optically anisotropic layer may be transferred on the cellulose acrylate film.

In the invention, the alignment film is preferably a layer comprising a crosslinked polymer. As the polymer used in the alignment film, any of a polymer which is crosslinkable by itself and a polymer which is crosslinkable with a crosslinking agent can be used. The alignment film can be formed by causing reaction among polymers having functional groups, or polymers to which functional groups have been introduced, with light, heat or pH change; or introducing bonding groups derived from crosslinking agent into polymers to cause a crosslinking reaction among the polymers using the crosslinking agent, which is a compound having reaction activity.

An alignment film comprising the crosslinked polymer can be usually formed by coating a coating solution containing the above polymer or a mixture of the polymer and the crosslinking agent on the support, and then heating.

In the rubbing process as described later, it is preferable to increase a degree of crosslinking in order to prevent dust generation of the alignment film. When a value (1−(Ma/Mb)) of subtracting the ratio (Ma/Mb) of an amount (Ma) of the crosslinking agent remaining after crosslinking to an amount (Mb) of the crosslinking agent to be added to the coating solution from 1 is defined as a degree of crosslinking, the degree of crosslinking is preferably 50% to 100%, more preferably 65% to 100% and most preferably 75% to 1.00%.

In the invention, the polymer used in the above-described alignment film can employ either a polymer which is crosslinkable by itself, or a polymer which is crosslinkable with a crosslinking agent, or may also be a combination of the two. Examples of the above-described polymer include the compounds, for example, a polymer such as polymethylmethacrylate, an acrylic acid/methacrylic acid copolymer, a styrene/maleinimide copolymer, a polyvinyl alcohol and modified polyvinyl alcohol, poly(N-methylolacrylamide), a styrene/vinyltoluene copolymer, chlorosulfonated polyethylene, nitrocellulose, polyvinylchloride, chlorinated polyolefin, polyester, polyimide, a vinyl acetate/vinyl chloride copolymer, an ethylene/vinyl acetate copolymer, carboxymethyl cellulose, gelatin, polyethylene, polypropylene and polycarbonate, and a silane coupling agent. Examples of the preferable polymer include a water-soluble polymer such as poly(N-methylolacrylamide), carboxymethyl cellulose, gelatin, polyvinyl alcohol and modified polyvinyl alcohol, preferably gelatin, polyvinyl alcohol and modified polyvinyl alcohol, and particularly polyvinyl alcohol and modified polyvinyl alcohol.

When polyvinyl alcohol and modified polyvinyl alcohol are directly provided on the support, a method of providing a hydrophilic undercoat, or a method of performing a saponification treatment as described in Japanese Patent Application No. 2000-369004 is preferably used.

Of the above polymers, polyvinyl alcohol and modified polyvinyl alcohol are preferred.

Polyvinyl alcohols have a saponification degree of from 70 to 100%, generally preferably from 80 to 100%, and more preferably from 82 to 98%. The polymerization degree is preferably from 100 to 3,000.

As modified polyvinyl alcohols, polyvinyl alcohols modified by copolymerization (as the modifying groups, e.g., COONa, Si(OX)$_3$, N(CH$_3$)$_3$.Cl, C$_9$H$_{19}$COO, SO$_3$Na and C$_{12}$H$_{25}$ are introduced), polyvinyl alcohols modified by chain transfer (as the modifying groups, e.g., COONa, SH and SC$_{12}$H$_{25}$ are introduced), and polyvinyl alcohols modified by block polymerization (as the modifying groups, e.g., COOH, CONH$_2$, COOR, and C$_6$H$_5$ are introduced), can be exemplified. The polymerization degree is preferably from 100 to 3,000. Of these compounds, unmodified or modified polyvinyl alcohols having a saponification degree of from 80 to 100% are preferred, and unmodified polyvinyl alcohols or alkylthio-modified polyvinyl alcohols having a saponification degree of from 85 to 95% are more preferred.

The modified polyvinyl alcohol used in the alignment film is preferably a reaction product of polyvinyl alcohol and the compound represented by the following Formula (6):

Formula (6)

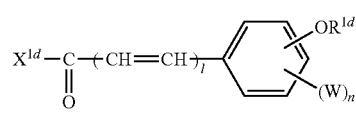

wherein, R$^{1d}$ is an unsubstituted alkyl group or a substituted alkyl group with an acryloyl group, a methacryloyl group or an epoxy group; W is a halogen atom, an alkyl group or an alkoxy group; X$^{1d}$ is an atomic group required to form an active ester, an acid anhydride or an acid halide; 1 is 0 or 1; and n is an integer of 0 to 4.

In addition, the modified polyvinyl alcohol used in the alignment film is preferably a reaction product of polyvinyl alcohol and the compound represented by the following Formula (7):

Formula (7)

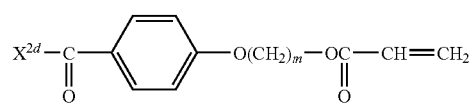

wherein, X$^{2d}$ is an atomic group required to form an active ester, an acid anhydride or an acid halide; and m is an integer of 2 to 24.

For polyvinyl alcohol used in order to react with the compounds represented by the above-described Formulae (6) and (7), mention may be made of the above-described unmodified polyvinyl alcohols and modified polyvinyl alcohols such as polyvinyl alcohols modified by copolymerization, polyvinyl alcohols modified by chain transfer, and polyvinyl alcohols modified by block polymerization. Preferred examples of the specific modified polyvinyl alcohols are described in detail by JP-A No. 8-338913.

When a hydrophilic polymer such as polyvinyl alcohol is used in the alignment film, it is preferable to control the moisture content in the viewpoint of the hardening degree, and the moisture content is preferably 0.4% to 2.5% and more preferably 0.6% to 1.6%. The moisture content can be measured by a commercially available Karl Fischer's moisture content measuring apparatus.

In addition, the thickness of the alignment film is preferably 10 μm or less.

[Surface Treatment]

If necessary, the cellulose acylate film according to the invention may be surface-treated to thereby improve the adhesion thereof to various functional layers (for example, an undercoat layer and a back layer). As the surface treatment, glow discharge treatment, ultraviolet irradiation treatment, corona discharge treatment, flame treatment and acid- or alkali-treatment can be used. The glow discharge treatment as used herein may be either low-temperature plasma treatment under a low gas pressure of $10^{-3}$ to 20 Torr or plasma treatment under atmospheric pressure. Examples of a plasma excitation gas, which is a gas plasma excited under the above conditions, include argon, helium, neon, krypton, xenon, nitrogen, carbon dioxide, chlorofluorocarbons such as tetrafluoromethane and mixtures thereof. These gases are described in detail in Japan Institute of Invention and Innovation Journal of Technical Disclosure No. 2001-1745 (2001 Mar. 15, Japan Institute of Invention and Innovation), p. 30 to 32. For the plasma treatment under atmospheric pressure that has become specifically noted recently, preferably used is irradiation energy of 20 to 500 Kgy under 10 to 1000 Kev, more preferably 20 to 300 Kgy under 30 to 500 Kev. Of the above-mentioned treatments, the most preferred treatment is alkali saponification, and this is extremely effective for the surface treatment of cellulose acylate films.

The alkali saponification treatment is preferably carried out by directly dipping the cellulose acylate film in a tank containing a saponification solution or coating the cellulose acylate film with a saponification solution. Examples of the coating method include a dip coating method, a curtain coating method, an extrusion coating method, a bar coating method, and an E type coating method. The solvent for the alkali saponification coating solution is preferably so selected that the saponification solution comprising it is well wettable on the cellulose acylate film to which the solution is applied, and that the solvent does not roughen the surface of the cellulose acylate film and may keep the cellulose acylate film having a good surface condition. Specifically, alcohol solvents are preferred, and isopropyl alcohol is particularly preferred. An aqueous solution of a surfactant may also be used as the solvent. The alkali to be in the alkali saponification coating solution is preferably an alkali soluble in the above-mentioned solvent. More preferably, it is KOH or NaOH. The pH of the saponification coating solution is preferably 10 or more, and more preferably 12 or more. The conditions of the alkali saponification are preferably 1 second to 5 minutes at room temperature, more preferably 5 seconds to 5 minutes, and particularly preferably 20 seconds to 3 minutes. After the alkali saponification treatment, it is desirable that the saponification solution-coated surface of the film is washed with water or with an acid, and then further washed with water.

Figure 2:
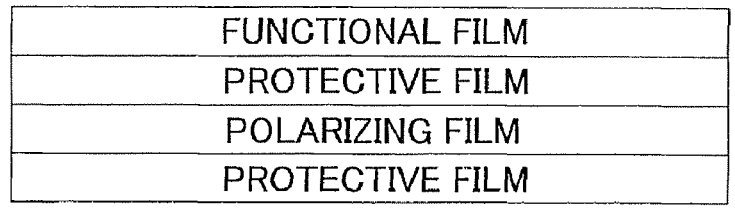
FIG. 2 is a sectional view schematically illustrating the cross-sectional structure of the polarizing plate of the invention.

It is preferable that the polarizing plate according to the invention has at least one of a hard coat layer, an antiglare layer and an antireflective layer provided on the surface of a protective film on the other side of the polarizing plate. As shown in FIG. 2, namely, it is preferable that a protective film provided in the opposite side of the polarizing plate to a liquid crystal cell when employed in a liquid crystal display device has a functional layer such as an antireflective layer. It is preferable to provide at least one of a hard coat layer, an antiglare layer and an antireflective layer as such functional layer. It is unnecessary to form individual layers separately. For example, it is possible to impart the function as the antiglare layer to the antireflective layer so as to make the antireflective layer serve both as the antireflective layer and the antiglare layer.

[Antireflective Layer]

It is appropriate in the invention to employ an antireflective layer having at least a light scattering layer and a lower refractive index layer superposed in this order on a protective film, or an antireflective layer having a medium refractive index layer, a higher refractive index layer and a lower refractive index layer superposed in this order on a protective film. Hereinafter, preferable examples thereof will be illustrated. Now, a preferable example of an antireflective layer having a light scattering layer and a lower refractive index layer on a protective film will be described.

It is preferable that the light scattering layer contains matting particles. It is preferable that the refractive index of the part of the light scattering layer other than the matting particles ranges 1.50 to 2.00. It is also preferable that the refractive index of the lower refractive index layer ranges 1.20 to 1.49. In the invention, the light scattering layer also has antiglare and hard coat properties. It may be composed of either a single layer or plural layers such as 2 to 4 layers.

To achieve a sufficient antiglare performance and a uniform matting appearance observed with the naked eye, it is preferable that the antireflective layer has such surface irregularity as expressed in an average central roughness Ra of 0.08 to 0.40 μm, an average 10 score roughness Rz not more than 10 times as much as Ra, an average peak-valley distance Sm of 1 to 100 μm, a standard deviation of the peak height measured from the deepest point of 0.5 μm or less, a standard deviation of the average peak-valley distance Sm based on the center line of 20 μm or less and the ratio of face with an incline angle of 0 to 5° of 10% or more. Under a C light source, it is also preferable that reflective light shows tint values a* of from −2 to 2 and b* of from −3 to 3 and a ratio of the minimum refractive index to the maximum refractive index of 0.5 to 0.99 within a range of 380 nm to 780 nm. This is because a neutral tint of the reflective light can be thus obtained. It is also preferable that the b* value of transmitted light under the C light source is 0 to 3, since yellowness in white indication can be reduced thereby in the case of employing in a display. Furthermore, it is preferable that, in the case of inserting a lattice (120 μm×40 μm) between a face light source and the antireflective film according to the invention and determining brightness distribution on the film, the standard deviation of the brightness distribution is 20 or less. This is because the glareness can be reduced thereby, when the film according to the invention is employed in an ultrafine panel.

With respect to optical characteristics, it is preferable that the antireflective layer usable in the invention has a specular reflectance of 2.5% or less, a transmittance of 90% or more and a 60° glossiness of 70% or less to thereby regulate reflection of external light and improve visibility. It is still preferable that the specular reflectance is 1% or less, most desirably 0.5% or less. To prevent glareness on an ultrafine LCD panel and reduce unsharpness in characters, it is preferable to achieve a haze of 20% to 50%, an inner haze/total haze ratio of 0.3 to 1, a decrease between the haze till the light scattering layer and the haze after the formation of the lower refractive index layer of not more than 15%, a transmission image clearness at a frame width of 0.5 mm of 20% to 50% and a transmission ratio of perpendicular transmission light/the direction inclining by 2° to the perpendicular direction of 1.5 to 5.0.

[Lower Refractive Index Layer]

The lower refractive index layer of an antireflective layer having at least a light scattering layer and a lower refractive index layer superposed in this order on a protective film will be described hereinafter.

The refractive index of the lower refractive index layer preferably ranges 1.20 to 1.49, more preferably 1.30 to 1.44. To achieve a lower refractive index, it is still preferred that the lower refractive index layer fulfills the following numerical formula (XV):

$$(m/4)\lambda \times 0.7 < n1d1 < (m/4)\lambda \times 1.3 \qquad (XV)$$

In the above formula, m is a positive odd number, n1 is the refractive index of the lower refractive index layer, and d1 is the film thickness (nm) of the lower refractive index layer. $\lambda$ is a wavelength within a range of 500 to 550 nm.

A material for forming the lower refractive index layer will be illustrated hereinafter.

It is preferable that the lower refractive index layer contains a fluorine-containing polymer as a low refractive index binder. As the fluorine-containing polymer, it is preferable to employ a fluorine-containing polymer which has a coefficient of dynamic friction of 0.03 to 0.20, a contact angle to water of from 90 to 120° and a sliding angle of pure water of 70° or less and which is crosslinked by heating or ionizing radiation. In the case of loading the polarizing plate according to the invention on an image display, a lower peeling force from a marketed adhesive tape is preferred, since a scratch pad or a seal bonded thereto can be easily stripped off. Namely, a peeling force measured with a tensile test machine of 500 gf or less is preferable, 300 gf or less is more preferable and 100 gf or less is most preferable. A higher surface hardness measured with a microhardness meter is preferred because of indicating the better scuff proofness. Namely, a surface hardness of 0.3 GPa or more is preferable and 0.5 GPa or more is more preferable.

Examples of the fluorine-containing polymer usable in the lower refractive index layer include products obtained by hydrolyzing or dehydration-condensing silane compounds having a perfluoroalkyl group (for example, (heptadecafluoro-1,1,2,2-tetrahydrodecyl)triethoxysilane) and fluorine-containing copolymers having a fluorine-containing monomer unit and another constitutional unit for imparting crosslinking reactivity.

Examples of the fluorine-containing monomer constituting the fluorine-containing copolymer include fluoroolefins (for example, fluoroethylene, vinylidene fluoride, tetrafluoroethylene, perfluorooctylethylene and hexafluoropropylene, perfluoro-2,2-dimethyl-1,3-dioxole), partly or completely fluorinated alkyl ester derivatives of (meth) acrylic acid (for example, BISCOAT 6FM manufactured by OSAKA ORGANIC CHEMICAL INDUSTRIES and M-2020 manufactured by DAIKIN) and completely or partly fluorinated vinyl ethers. Among these, perfluoroolefins are preferable and hexafluoropropylene is particularly preferred from the viewpoints of refractive index, solubility, transparency and availability.

Examples of the constitutional unit for imparting crosslinking reactivity include constitutional units obtained by polymerizing monomers having a self-crosslinkable functional group in a molecule such as glycidyl (meth)acrylate and glycidyl vinyl ether, constitutional units obtained by polymerizing monomers having carboxyl, hydroxy, amino and sulfo groups (for example, (meth)acrylic acid, methylol (meth)acrylate, hydroxyalkyl (meth)acrylates, allyl acrylate, hydroxyethyl vinyl ether, hydroxybutyl vinyl ether, maleic acid and crotonic acid), and constitutional units obtained by introducing crosslinkable groups such as (meth)acryloyl group to these constitutional units by a polymer reaction (the introduction can be made by, for example, treating a hydroxy group with acrylic acid chloride).

In addition to the fluorine-containing monomer unit and the constitutional unit for imparting crosslinking reactivity, it is possible to optionally copolymerize a fluorine-free monomer form the viewpoint of solubility to a solvent and transparency of the film. The monomer unit usable together is not particularly limited and, for example, olefins (for example, ethylene, propylene, isoprene, vinyl chloride and vinylidene chloride), acrylic acid esters (for example, methyl acrylate, ethyl acrylate and 2-ethylhexyl acrylate), methacrylic acid esters (for example, methyl methacrylate, ethyl methacrylate, butyl methacrylate and ethylene glycol dimethacrylate), styrene derivatives (for example, styrene, divinylbenzene, vinyltoluene and α-methylstyrene), vinyl ethers (for example, methyl vinyl ether, ethyl vinyl ether and cyclohexyl vinyl ether), vinyl esters (for example, vinyl acetate, vinyl propionate and vinyl cinnamate), acrylamides (for example, N-tert-butylacrylamide and N-cyclohexylacrylamide), methacrylamides and acrylonitrile derivatives can be used.

The above-described polymers may be used together with appropriate hardening agents as described in JP-A Nos. 10-25388 and 10-147739.

[Light Scattering Layer]

The light scattering layer is formed in order to impart hard coat properties to the film to thereby improve the light diffusion properties due to at least one of surface scattering and inner scattering and scuff proofness of the film. Accordingly, the light scattering layer contains a binder for imparting the hard coat properties and matting particles for imparting the light diffusion properties, optionally together with an inorganic filler for elevating the refractive index, preventing shrinkage due to crosslinkage and improving the strength. Moreover, the light scattering layer thus formed also serves as an antiglare layer and, therefore, the polarizing plate is also provided with the antiglare layer.

To impart the hard coat properties, the film thickness of the light scattering layer preferably ranges 1 to 10 μm, more preferably 1.2 to 6 μm. In the case where the film is too thin, only insufficient hard coat properties can be obtained. In the case where the film is too thick, curling and fragility are worsened and the processing suitability becomes insufficient.

As the binder of the light scattering layer, it is preferable to use a polymer having a saturated hydrocarbon chain or a polyether chain as the main chain and a polymer having a saturated hydrocarbon chain as the main chain is more preferable. It is also preferable that the binder polymer has a crosslinked structure. As the binder polymer having a saturated hydrocarbon chain as the main chain, a polymer of an ethylenically unsaturated monomer is preferred. As the binder polymer having a saturated hydrocarbon chain as the main chain and a crosslinked structure, a (co)polymer of monomer(s) having two or more ethylenically unsaturated groups is preferable. To achieve a high refractive index of the binder polymer, it is possible to select a monomer having an aromatic ring or at least one atom selected from among halogen atoms other than fluorine, a sulfur atom, a phosphorus atom and a nitrogen atom in its structure.

Examples of the monomer having two or more ethylenically unsaturated groups include esters of polyhydric alcohol with (meth)acrylic acid (for example, ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa (meth)acrylate, pentaerythritol hexa(meth)acrylate, 1,2,3-cyclohexane tetramethacrylate, polyurethane polyacrylate and polyester polyacrylate), ethylene oxide-denatured derivatives thereof, vinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), acrylamides (for example, methylenebisacrylamide) and methacrylamides. Two or more of these monomers may be used together.

Specific examples of the monomer having higher refractive index include bis(4-methacryloylthiophenyl)sulfide, vinyl naphthalene, vinyl phenyl sulfide, 4-methacryloxyphenyl-4'-methoxyphenylthioether and the like. Two or more of these monomers may be used together.

Such a monomer having ethylenically unsaturated bonds can be polymerized by ionizing radiation or heating in the presence of a photo radical initiator or a heat radical initiator.

That is to say, a coating solution containing the monomer having ethylenically unsaturated bonds, a photo radical initiator or a heat radical initiator, matting particles and an inorganic filler is prepared. Then the coating solution is applied to a protective film and hardened by polymerization under ionizing radiation or heating to form an antireflective film. As the photo radical initiator, conventionally known ones can be used.

As the polymer having polyether as the main chain, it is preferable to employ a ring-opening polymer of a polyfunctional epoxy compound. The ring-opening polymerization of the polyfunctional epoxy compound can be carried out by ionizing radiation or heating in the presence of a photo acid generator or a heat acid generator. That is to say, a coating solution containing the polyfunctional epoxy compound, a photo acid generator or a heat acid generator, matting particles and an inorganic filler is prepared. Then the coating solution is applied to a protective film and hardened by polymerization under ionizing radiation or heating to form an antireflective film.

It is also possible to use a monomer having a crosslinking functional group, as a substitute for the monomer having two or more ethylenically unsaturated bonds or in addition thereto, to thereby introduce the crosslinking functional group into the polymer. Thus, a crosslinking structure can be introduced into the binder polymer owing to the reaction of this crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinking structure, use can be also made of vinylsulfonic acid, acid anhydrides, cyanoacrylate derivatives, melamine, etherified methylol, esters and urethane and metal alkoxides such as tetramethoxysilane. It is also possible to use a functional group which shows crosslinking ability as the result of a decomposition reaction, for example, a blocked isocyanate group. Namely, the crosslinking functional group to be used in the invention may be either one showing an immediate reactivity or one showing a reactivity after decomposition.

The binder polymer containing such a crosslinking functional group can form a crosslinked structure by heating after the application.

To impart antiglare properties, the light scattering layer contains matting particles which are larger than the filler particles and have an average particle size of 1 to 10 μm, preferably 1.5 to 7.0 μm, such as particles of an inorganic compound or resin particles.

Specific examples of the matting particles include particles of inorganic compounds such as silica particles and $TiO_2$ particles; and resin particles such as acryl particles, crosslinked acryl particles, polystyrene particles, crosslinked styrene particles, melamine resin particles and benzoguanamine resin particles. Among these, crosslinked styrene particles, crosslinked acryl particles, crosslinked acryl styrene particles and silica particles are preferred. The matting particles may be either in a spherical or irregular shape.

Also, two or more types of matting particles having different particle sizes can be used. Thus, the matting particles having a larger particle size can impart antiglare properties, while the matting particles having a smaller particle size can impart other optical characteristics.

With respect to the particle size distribution of the matting particles as described above, monodistribution is most desirable. That is to say, it is preferred that the sizes of individual particles are as close as possible. In the case where particles having particle size larger by 20% or more than the average particle size are specified as coarse particles, for example, it is preferable that the content of these coarse particles is 1% or less of all particles, still preferably 0.1% or less and still preferably 0.01% or less. Matting particles having such a particle size distribution can be obtained by classifying particles after the completion of a usual synthesis reaction. Matting particles having a still preferable distribution can be obtained by performing the classification in an increased number or at an elevated level.

The matting particles are added to the light scattering layer so as to give a matting particle content in the light scattering layer of preferably 10 to 1000 $mg/m^2$, still preferably 100 to 700 $mg/m^2$.

The particle size distribution of the matting particles is measured by the Coulter counter method and the distribution thus measured is converted into the particle number distribution.

To elevate the refractive index of the layer, the light scattering layer preferably contains, in addition to the matting particles as described above, an inorganic filler which comprises oxide of at least one metal selected from among titanium, zirconium, aluminum, indium, zinc, tin and antimony and has an average particle size of 0.2 μm or less, preferably 0.1 μm or less and still preferably 0.06 μm or less.

To enlarge the difference in refractive index from the matting particles, on the contrary, it is also possible in a light scattering layer with the use of matting particles having a higher refractive index to employ silicon oxide to thereby maintain the refractive index of the layer at a low level. The preferable particle size thereof is the same as the inorganic filler as described above.

Specific examples of the inorganic filler employed in the light scattering layer include $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are preferred from the viewpoint of elevating refractive index. It is also preferable that the inorganic filler is surface-treated by silane coupling or titanium coupling, and use is preferably made of a surface-treating agent having a functional group capable of reacting with the binder on the filler surface.

The content of such an inorganic filler is preferably 10 to 90% based on the total weight of the light scattering layer, still preferably 20 to 80% and particularly preferably 30 to 75%.

Because of having a particle size sufficiently smaller than the light wavelength, the filler causes no scattering. Therefore, a dispersion having the filler dispersed throughout the binder polymer behaves as an optically homogeneous substance.

The bulk refractive index of the mixture of the binder with the inorganic filler in the light scattering layer is preferably 1.50 to 2.00, still preferably 1.51 to 1.80. The refractive index can be controlled within the range as specified above by appropriately selecting the types and contents of the binder and the inorganic filler. It can be easily understood through experiments how to select these materials.

To ensure an excellent plane uniformity free from, for example, coating irregularity, drying irregularity or defect spots, the light scattering layer contains a fluorinated surfactant, a silicone-based surfactant or both of them in the coating solution for forming light scattering layer. It is particularly preferable to employ a fluorinated surfactant, since it can exert effects of improving plane failures such as coating irregularity, drying irregularity or defect spots of the antireflective film even in a smaller amount. Such surfactants are added in order to improve the plane uniformity while imparting suitability for high-speed coating to thereby elevate the productivity.

Next, an antireflective layer having a medium refractive index layer, a higher refractive index layer and a lower refractive index layer laminated on a protective film in this order will be illustrated.

An antireflective layer at least having a medium refractive index layer, a higher refractive index layer and a lower refractive index layer (the outermost layer) laminated on a protective film in this order is designed so as to give a refractive index fulfilling the following relationship: refractive index of higher refractive index layer>refractive index of medium refractive index layer>refractive index of protective film>refractive index of lower refractive index layer.

Further, a hard coat layer may be provided between the protective film and the medium refractive index layer. It is also possible to employ the constitution of medium refractive index hard coat layer, higher refractive index layer and lower refractive index layer. Use may be made of antireflective layers described in, for example, JP-A Nos. 8-122504, 8-110401, 10-300902, 2002-243906 and 2000-111706.

Each layer may further have additional function(s). Examples thereof include a stainproof lower refractive index layer and an antistatic higher refractive index layer (see, for example, JP-A Nos. 10-206603 and 2002-243906).

The haze of the antireflective layer is preferably 5% or less, still preferably 3% or less. The strength of the film is preferably H or above, still preferably 2H or above and most desirably 3H or above, when determined by the pencil hardness test in accordance with JIS K5400.

[Higher Refractive Index Layer and Medium Refractive Index Layer]

In the antireflective layer, the layer having a higher refractive index is made of a hardening film containing at least fine particles of an inorganic compound with a higher refractive index having an average particle size of 100 nm or less and a matrix binder.

As the fine particles of an inorganic compound with a higher refractive index, use can be preferably made of an inorganic compound having a refractive index of 1.65 or above, still preferably 1.9 or above. Examples thereof include oxides of Ti, Zn, Sb, Sn, Zr, Ce, Ta, La and In and complex oxides containing these metal atoms.

These fine particles having 100 nm or less of the average particle size can be obtained by, for example, treating the particle surface with a surfactant (for example, a silane coupling agent: JP-A Nos. 11-295503, 11-153703 and 2000-9908, an anionic compound or an organic metal coupling agent: JP-A No. 2001-310432), employing a core-shell structure with the use of higher refractive index particles as the core (JP-A No. 2001-166104), or using together a specific dispersant (for example, JP-A No. 11-153703, U.S. Pat. No. 6,210,858 B1 and JP-A No. 2002-2776069).

As examples of the material forming the matrix, publicly known thermoplastic resins and hardening resin films may be cited.

It is also preferable to employ at least one composition selected from among a composition containing a polyfunctional compound having at least two radical polymerizable and/or cationic polymerizable groups and a composition comprising an organic metal compound having a hydrolysable group and a partial condensation product thereof. Examples thereof include compositions reported in JP-A Nos. 2000-47004, 2001-315242, 2001-31871 and 2001-296401.

Also, use may be preferably made of a hardening film obtained from a composition comprising a colloidal metal oxide obtained from a hydrolysis condensation product of a metal alkoxide and a metal alkoxide. Such a film is described in, for example, JP-A No. 2001-293818.

The refractive index of the higher refractive index layer preferably ranges 1.70 to 2.20. The thickness of the higher refractive index layer preferably ranges 5 nm to 10 μm, still preferably 10 nm to 1 μm.

The refractive index of the medium refractive index layer is controlled to an intermediate level between the refractive index of the lower refractive index layer and the refractive index of the higher refractive index layer. The refractive index of the medium refractive index layer preferably ranges 1.50 to 1.70. The thickness thereof preferably ranges 5 nm to 10 μm, still preferably 10 nm to 1 μm.

[Lower Refractive Index Layer]

Next, the lower refractive index layer will be illustrated in the antireflective layer wherein the medium refractive index layer, the higher refractive index layer and the lower refractive index layer are laminated in this order on the protective film.

The lower refractive index layer is successively laminated on the higher refractive index layer. The refractive index of the lower refractive index layer preferably ranges 1.20 to 1.55, still preferably 1.30 to 1.50.

It is preferable to form the lower refractive index layer as the outermost layer having scuff proofness and stain proofness. As means of largely improving the scuff proofness, it is effective to impart slipperiness to the surface, which can be established by applying a publicly known thin film layer technique such as introduction of silicone or fluorine.

As a fluorine-containing compound, a compound containing crosslinkable or polymerizable functional group containing 35 to 80% by weight of fluorine atom is preferred.

Examples thereof include compounds cited in paragraphs to [0026] in JP-A No. 9-222503, paragraphs [0019] to in JP-A No. 11-38202, paragraphs [0027] to [0028] in JP-A Nos. 2001-40284, and 2000-284102.

The refractive index of the fluorine-containing compound preferably ranges 1.35 to 1.50, still preferably 1.36 to 1.47.

A silicone compound is a compound having a polysiloxane structure and a compound having a hardening functional group or a polymerizable functional group in its polymer chain and gives a crosslinked structure in the film is preferable. Examples thereof include a reactive silicone (for example, SILAPLANE manufactured by CHISSO CORPO- RATION), polysiloxane having silanol groups at both ends (for example, JP-A No. 11-258403).

To perform the crosslinking or polymerization reaction of the fluorine and/or siloxane polymer having a crosslinking or polymerizable group, it is preferable to irradiate or heat a coating composition for forming the outermost layer, which contains a polymerization initiator or a sensitizer, simultaneously with the application or after the application, thereby forming the lower refractive index layer.

It is also preferable to employ a sol gel hardening film which hardens via a condensation reaction between an organic metal compound such as a silane coupling agent and a silane coupling agent having a specific fluorinated hydrocarbon group in the coexistence of a catalyst. Examples thereof include polyfluoroalkyl group-containing silane compounds or partly hydrolyzed condensation products thereof (compounds described in, for example, JP-A Nos. 58-142958, 58-147483, 58-147484, 9-157582 and 11-106704), Silyl compounds having poly"perfluoroalkyl ether" group (i.e., a fluorine-containing long chain) (compounds described in, for example, JP-A Nos. 2000-117902, 2001-48590 and 2002-53804).

In addition to the components as described above, the lower refractive index layer may contain additives such as a filler (for example, particles of inorganic compounds having a low refractive index and an average primary particle size of 1 to 150 nm such as silicon dioxide (silica) and fluorine-containing particles (magnesium fluoride, calcium fluoride and barium fluoride) and fine organic particles described in paragraphs [0020] to [0038] in JP-A No. 11-3820)), a silane coupling agent, a slip agent and a surfactant.

In the case where the lower refractive index layer is provided below the outermost layer, the lower refractive index layer may be formed by a gas phase method (for example, the vacuum deposition method, the sputtering method, the ion plating method or the plasma CVD method). It is preferable to employ the coating method by which the lower refractive index layer can be formed at low cost.

The film thickness of the lower refractive index layer preferably ranges 30 to 200 nm, still preferably 50 to 150 nm and most desirably 60 to 120 nm.

[Hard Coat Layer]

In order to elevate the physical strength of the protective film having the antireflective layer, it is preferable to form a hard coat layer on the surface of the protective film. It is particularly preferable to provide the hard coat layer between the transparent supporter and the higher refractive index layer as described above. The hard coat layer is formed preferably by a crosslinking reaction or a polymerization reaction of a hardening compound by means of light and/or heat. As a hardening functional group in the hardening compound, a photo polymerizable functional group is preferred. It is also preferable to use an organic metal compound or an organic alkoxysilyl compound having a hydrolysable functional group. Specific examples of these compounds include those cited above with respect to the higher refractive index layer. Specific examples of a composition constituting the hard coat layer include those described in JP-A Nos. 2002-144913 and 2000-9908, and WO00/46617.

The hard coat layer may also serve as the higher refractive index layer. In this case, it is preferable to form the hard coat layer by finely dispersing fine particles by using a technique as described with respect to the higher refractive index layer.

The hard coat layer may contain particles having an average particle size of form 0.2 to 10 μm and also serve as an antiglare layer having an antiglare function.

The film thickness of the hard coat layer can be appropriately designed depending on the purpose. The film thickness of the hard coat layer preferably ranges 0.2 to 10 μm and still preferably 0.5 to 7 μm.

The strength of the hard coat layer is preferably H or above, still preferably 2H or above and most desirably 3H or above, when determined by the pencil hardness test in accordance with JIS K5400. In the Taber abrasion test in accordance with JIS K5400, a less Taber volume loss in a test sample after the test, compared with the volume before the test, is the preferable.

[Other Layers in Antireflective Layer]

It is also possible to form, for example, a forward scattering layer, a primer layer, an antistatic layer, an undercoat layer and a protective layer.

[Antistatic Layer]

In the case of forming an antistatic layer, it is preferable to impart an electrical conductivity represented by a volume resistivity of $10^{-8}$ ($\Omega cm^{-3}$) or less. Although a volume resistivity of $10^{-8}$ ($\Omega cm^{-3}$) can be established by using, for example, a hygroscopic substance, a water-soluble inorganic salt, a certain surfactant, a cationic polymer, an anionic polymer or colloidal silica, the volume resistivity highly depends on temperature and humidity and, therefore, there arises a problem that a sufficient conductivity cannot be ensured under a low humidity. Therefore, it is preferable to employ a metal oxide as a conductive layer material. Although some metal oxides are colored, it is undesirable to employ such a colored metal oxide as a material of the conductive layer. This is because the whole film is colored in the case of using such a colored metal oxide. Examples of metals providing non-colored metal oxides include Zn, Ti, Al, In, Si, Mg, Ba, Mo, W and V. It is preferable to employ a metal oxide containing at least one of these metals as the main component. Specific examples of the metal oxide include ZnO, $TiO_2$, $SnO_2$, $Al_2O_3$, $In_2O_3$, $SiO_2$, MgO, BaO, $MoO_3$, $V_2O_5$ and complex oxides thereof. In particular, ZnO, $TiO_2$ and $SnO_2$ are preferred. The metal oxide may contain different atoms. That is to say, it is effective to add, for example, Al or In to ZnO, Sb, Nb or halogen atoms to $SnO_2$, or Nb or TA to $TiO_2$. Moreover, use may be made of a material in which other crystalline metal particles or fibers (for example, titanium oxide) are bonded to the metal oxide, as described in JP-B No 59-6235. Although volume resistivity differs from surface resistivity and these two factors cannot be simply compared, conductivity represented by the volume resistivity of $10^{-8}$ ($\Omega cm^{-3}$) or less can be ensured in the case where the antistatic layer has a surface resistivity of about $10^{-10}$ ($\Omega/\square$), preferably $10^{-8}$ ($\Omega/\square$). The surface resistivity of the antistatic layer should be measured as a value referring the antistatic layer as the outermost layer. Namely, it can be measured in the course of the formation of a laminated film.

[Liquid Crystal Display Device]

The liquid crystal display device according to the invention involves a liquid crystal display device using either cellulose acylate film according to the invention or the polarizing plate according to the invention as described above (first embodiment), a liquid crystal display device of OCB or VA mode having two polarizing plates according to the invention as described above and a liquid crystal cell between the polarizing plates (second embodiment), and a liquid crystal display device of VA mode having one polarizing plate according to the invention in the backlight side (third Embodiment).

The polarizing plate of the invention can be used in liquid crystal cell of various display modes. There have been proposed various display modes such as TN (twisted nematic) mode, IPS (in-plane switching) mode, FLC (ferroelectric liquid crystal) mode, AFLC (anti-ferroelectric liquid crystal) mode, OCB (optically compensatory bend) mode, STN (super twisted nematic) mode, VA (vertically aligned) mode and HAN (hybrid aligned nematic) mode. Among these, VA mode or OCB mode can be preferably used.

In a liquid crystal cell of the VA mode, rod-like liquid crystal molecules are essentially vertically aligned while voltage is not applied. Liquid crystal cells of the VA mode include: (1) a liquid crystal cell of VA mode in a narrow sense, in which rod-like liquid crystal molecules are essentially vertically aligned while voltage is not applied, and the molecules are essentially horizontally aligned while voltage is applied; and the molecules are essentially horizontally aligned while voltage is applied (JP-A No. 2-176625); (2) a liquid crystal cell of MVA mode, in which the VA mode is modified to be multi-domain type so as to enlarge the viewing angle (described in SID97, Digest of tech. Papers, 28 (1997), 845); (3) a liquid crystal cell of n-ASM mode, in which rod-like liquid crystal molecules are essentially vertically aligned while voltage is not applied, and the molecules are essentially oriented in twisted multi-domain alignment while voltage is applied (described in Nippon Ekisho Toronkai [Liquid crystal forum of Japan], Digest of tech. Papers (1998), 58-59); and (4) a liquid crystal cell of SURVIVAL mode (published in LCD international 98).

Figure 3:
FIG. 3 is a sectional view schematically illustrating the cross-sectional structure of the polarizing plate of the invention.

As a liquid crystal display device of the VA mode, one has a liquid crystal cell (VA mode cell) and two polarizing plates which are arranged on both sides of it as shown in FIG. 3. The liquid crystal cell holds liquid crystal between two electrode substrates, though not shown in the figure.

In an embodiment of the liquid crystal display device according to the invention, the cellulose acylate film according to the invention is provided between the liquid crystal cell and the polarizer as a protective film for the polarizing plate. The cellulose acylate film may be employed as a protective film provided between the liquid crystal cell and the polarizer in one of the polarizing plates. Alternatively, one sheet of the cellulose acylate film may be used as a protective film provided each between the liquid crystal cell and the polarizer in the both polarizing plates. In the case where the above-described cellulose acylate film is employed exclusively as the protective film located between the liquid crystal cell and the polarizer in one of the polarizing plates, it may be located either in the upper polarizing plate (the observer side) or in the lower polarizing plate (the backlight side). No functional problem occurs in each case. When the cellulose acylate film is employed in the upper polarizing plate, however, it is needed to form a functional layer in the observe side (the upper side), which brings about a risk of lowering productivity. In a preferred embodiment, therefore, the cellulose acylate film is employed in the lower polarizing plate.

In a liquid crystal display device of the second embodiment, the polarizing plates according to the invention are employed in both of the light source side and the observer side in FIG. 3. In a liquid crystal display device of the third embodiment, the polarizing plate according to the invention is employed exclusively in the light source side.

The protective film other than the protective film comprising the cellulose acylate film of the invention may be a commonly employed cellulose acylate film. The film thickness preferably ranges 40 to 80 μm. Examples thereof include marketed films KC4UX2M (manufactured by KONICA OPT Co., Ltd., 40 μm), KC5UX (manufactured by KONICA OPT Co., Ltd., 60 μm) and TD80 (manufactured by FUJI PHOTO-FILM Co., Ltd., 80 μm), though the invention is not limited thereto.

EXAMPLES

Hereinbelow, the invention will be further described in detail by way of Examples and Comparative Examples. Materials, contents, ratios, processing contents, processing order and the like presented hereinbelow may be suitably changed as long as the object of the invention is not impaired. However, the scope of the invention is not limited to these specific examples below.

Example 1

Production of Cellulose Acylate Film (1) Cellulose Acylate

Using cellulose triacetate (a derivative of cellulose ester wherein the acyl group comprises only an acetate group), cellulose acylate having 2.82 acetyl group substitution degree and DS6/(DS2+DS3+DS6)=0.321 was prepared. After adding sulfuric acid (7.8 parts by weight per 100 parts by weight of cellulose) serving as a catalyst, each carboxylic acid providing the corresponding acyl substituent was added and the acylation was carried out at 40° C. At this time, substitution degree of the acyl group was regulated by controlling the amount of the carboxylic acid. Aging was performed at 40° C. after the acylation. Subsequently, low-molecular weight components of cellulose acylate were washed off with acetone.

(2) Preparation of Dope

<1-1> Cellulose Acylate Solution

The following composition was fed into a mixing tank and individual components were dissolved under stirring. After heating to 90° C. for about 10 minutes, the mixture was filtered through a paper filter having an average pore size of 34 μm and a baked metal filter having an average pore size of 10 μm to give a cellulose acylate solution.

| Composition of Cellulose Acylate Solution | |
|---|---|
| Cellulose acylate | 100.0 parts by weight |
| Triphenylphosphate | 8.0 parts by weight |
| Biphenyldiphenylphosphate | 4.0 parts by weight |
| Methylene chloride | 403.0 parts by weight |
| Methanol | 60.2 parts by weight |

<1-2> Matting Agent Dispersion

The following composition of a matting agent dispersion containing the cellulose acylate solution prepared above was fed into a dispersing machine to prepare a matting agent dispersion.

| Composition of Matting Agent Dispersion | |
|---|---|
| Silica particles of 16 nm in average particle size (Aerosil R972: NIPPON AEROSIL Co., Ltd.) | 2.0 parts by weight |
| Methylene chloride | 72.4 parts by weight |
| Methanol | 10.8 parts by weight |
| Cellulose Acylate Solution | 10.3 parts by weight |

<1-3> Retardation Increasing Agent Solution

The following composition of a retardation increasing agent solution containing the cellulose acylate solution prepared above was fed into a mixing tank and stirred under heating to give a retardation increasing agent solution A.

| Composition of Retardation Increasing Agent Solution | |
|---|---|
| Retardation Increasing Agent A | 20.0 parts by weight |
| Methylene chloride | 58.3 parts by weight |
| Methanol | 8.7 parts by weight |
| Cellulose Acylate Solution | 12.8 parts by weight |

A film-forming dope was prepared by mixing 100 parts by weight of the cellulose acylate solution, 1.35 parts by weight of the matting agent dispersion, and further the solution of the retardation increasing agent in such an amount as giving 2.5 parts by weight of the retardation increasing agent in the cellulose acylate film. The addition ratio of the retardation increasing agent represents parts by weight referring the amount of cellulose acylate as 100 parts by weight.

Retardation Developing Agent A

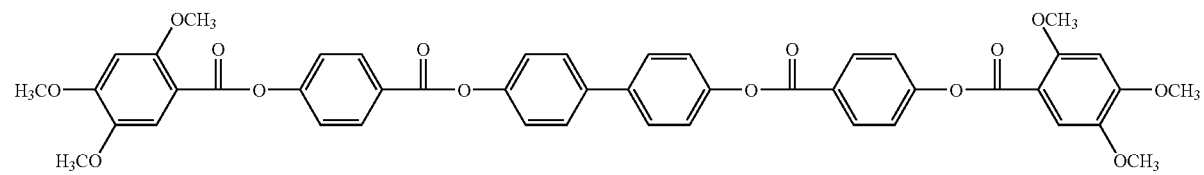

(Casting)

The above dope was cast by using a band casting machine. When the amount of the remaining solvent is 25 to 35% by weight, the film was stripped off from the band and stretched in the lateral direction at 140° C. of the air-supply temperature in the tender zone (the ventilation temperature ranges 90° C. to 125° C.) at a stretching ratio of 25% to give a cellulose acylate film of 80 μm thickness. The casting film thickness was regulated that the film thickness after the stretch was 80 μm. Re and Rth of the prepared cellulose acylate film were measured and shown in Table 1.

Examples 2 to 4 and Comparative Examples 1 to 6

A cellulose acylate film was prepared by conducting the same procedures as in Example 1 with changing the kind and the amount of retardation increasing agent, the film thickness and the stretching ratio as shown in Table 1.

Retardation Developing Agent B

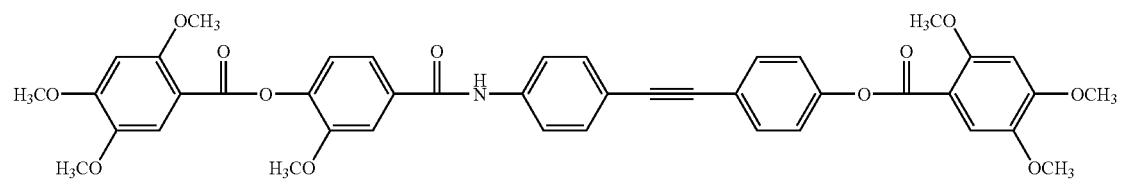

<Production of Polarizing Plate>

Iodine was adsorbed on a stretched polyvinyl alcohol film to form a polarizer. The cellulose acylate film produced above was bonded to one side of a polarizer with the use of a polyvinyl alcohol-based adhesive. In addition, saponification was carried out under the following conditions. A 1.5 mol/L aqueous solution of sodium hydroxide was prepared and maintained at 55° C. A 0.01 mol/L dilute aqueous solution of sulfuric acid was prepared and maintained at 35° C. The cellulose acylate film thus prepared was dipped in the aqueous sodium hydroxide solution for 2 minutes and then dipped in water to thereby sufficiently wash away the aqueous sodium hydroxide solution. Subsequently, it was dipped in the above dilute aqueous sulfuric acid solution for 1 minute and then dipped in water to thereby sufficiently wash away the dilute aqueous sulfuric acid solution. Finally, the sample was sufficiently dried at 120° C.

A marketed cellulose triacylate film (FUJITAC TD80UF, manufactured by FUJI PHOTOFILM Co., Ltd.) was saponified and bonded to the opposite side of the polarizer with the use of a polyvinyl alcohol-based adhesive, which was dried at 70° C. for 10 minutes or more.

As FIG. 1 shows, the slow axis of the cellulose acylate film was in parallel to the polarizing axis of the polarizer. On the other hand, the slow axis of the marketed cellulose triacylate film was perpendicular to the transmission axis of the polarizer.

<Production of Liquid Crystal Cell>

In the liquid crystal cell, the gap between the substrates was set to 3.6 μm. A liquid crystal material having a negative dielectric anisotropy (MLC6608 manufactured by MERCK Co.) was dropped and sealed between the substrates to form a liquid crystal layer, thereby giving the liquid crystal cell. The retardation of the liquid crystal layer (i.e., the product of the liquid crystal layer thickness d (μm) and the refractive index anisotropy Δn: Δn·d) was adjusted to 300 nm. The liquid crystal material was vertically aligned.

<Mounting to VA Panel>

To the upper polarizing plate (the observer side) in the liquid crystal display device (FIG. 3) using the vertically aligned liquid crystal cell as described above, a marketed super high contrast product (HLC2-5618 manufactured by SANRITZ) was used. To the lower polarizing plate thereof, the polarizing plates having the cellulose acylate film prepared in Example 1 were installed in such a manner that the cellulose acylate film prepared in Example 1 was located in the liquid crystal cell side. The upper polarizing plate and the lower polarizing plate were bonded to the liquid crystal cell through an adhesive. The polarizing plates were in the cross Nicols arrangement with the transmission axis of the upper polarizing plate being vertical and the transmission axis of the lower polarizing plate being horizontal.

(Measurement Method of Re, a Retardation Value in a Film Plane, and Rth, a Retardation Value in a Direction Perpendicular to the Film Plane)

30 mm×40 mm of a sample was regulated for humidity control at 25° C. and 60% RH for two hours. Re(λ) was measured by the incidence of a light having a wavelength λ nm in a normal direction of the film with the use of KOBRA 21 ADH (manufactured by OJI KEISOKU KIKI). Rth(λ) was determined by using a presumptive average refractive index 1.48 and the film thickness based on retardation values measured in three directions, i.e., Re(λ) as described above, a retardation value measured by the incidence of the light having the wavelength of λ nm in a direction inclining at an angle of +40° to the normal direction of the film using the slow axis in the plane as the incline angle, and a retardation value measured by the incidence of the light having the wavelength of λ nm in a direction inclining at an angle of −40° to the normal direction of the film using the slow axis in the plane as the incline angle.

(Corner Irregularity)

Evaluation of light leakage in the black display was carried out by thermal treating the liquid crystal display device at 50° C. and 95% RH for 120 hours, conditioning in humidity at 25° C. and 60% RH for 20 hours, and then lighting the backlight. For the evaluation, 20-inch liquid crystal panel was used.

⊚: No light leakage at four corners
◯: Small light leakage occurred at any one of four corners
x: Light leakage occurred at four corners (unacceptable)

(Bleeding)

Visual observation was made for the presence of bleeding (generation of precipitate) on the surface of the formed cellulose acylate film.

◯: No precipitate seen with visual examination
◯Δ: A little precipitate seen with visual examination on the formed cellulose acylate film (acceptable)
x: Precipitate seen with visual examination on the whole side of the formed cellulose acylate film.

On the contrary, for the liquid crystal display devices wherein the cellulose acylate films of Comparative Examples 1 and 2, whose film thickness is thick, were used, the corner irregularity was generated remarkably. For the liquid crystal display devices wherein the cellulose acylate films of Comparative Examples 3 and 4, whose film thickness is thin, were used, no corner irregularity was seen to be generated. However, the cellulose acylate film of Comparative Example 3 could not be ensured for the calculated retardation on the optical compensation sheet. The cellulose acylate film of Comparative Example 4 could be ensured for the calculated retardation on the optical compensation sheet, while precipitate (bleeding) was seen on the film surface since large amount of the retardation increasing agent was added to the thin cellulose acylate film to ensure the retardation.

The cellulose acylate film of Comparative Example 5, to which no retardation increasing agent was added, could not be ensured for the calculated retardation on the optical compensation sheet.

In addition, the cellulose acylate film of Comparative Example 6, for which no stretch was carried out, could not gain desired Re.

From the results above, it was found that the cellulose acylate film of the invention can contribute to reduction of corner irregularity while ensuring the calculated retardation on the optical compensation sheet.

INDUSTRIAL APPLICABILITY

According to the invention, it is possible to provide a VA mode liquid crystal display device which has excellent display property and viewing angle property.

TABLE 1

|  | Cellulose acylate film thickness (μm) | Stretch ratio (Cast axis direction)(%) | Retardation developing agent Type/Content (parts by weight) | Re (nm) | Rth (nm) | Bleeding | Corner irregularity |
|---|---|---|---|---|---|---|---|
| Example 1 | 80 | 25 | A/2.5 | 70 | 165 | ◯ | ◯ |
| Example 2 | 70 | 25 | A/2.5 | 61 | 145 | ◯ | ◯ |
| Example 3 | 70 | 25 | B/3.0 | 61 | 152 | ◯ | ◯ |
| Example 4 | 50 | 25 | A/5.0 | 74 | 171 | ◯Δ | ⊚ |
| Comparative Example 1 | 92 | 25 | A/2.5 | 80 | 190 | ◯ | X |
| Comparative Example 2 | 92 | 25 | B/3.0 | 80 | 200 | ◯ | X |
| Comparative Example 3 | 30 | 25 | A/5.0 | 43 | 103 | ◯Δ | ⊚ |
| Comparative Example 4 | 30 | 25 | A/7.5 | 68 | 156 | X | ⊚ |
| Comparative Example 5 | 80 | 25 | absent | 2 | 59 | ◯ | ◯ |
| Comparative Example 6 | 80 | 0 | A/2.5 | 8 | 150 | ◯ | ◯ |

The cellulose acylate films of Examples 1 to 4 were relatively thin having the film thickness of 40 to 90 μm, while having the calculated retardation in the optical compensation film. In addition, the surfaces of these cellulose acylate films had no bleeding observed. For the liquid crystal display device wherein the cellulose acylate film of Example 4 was used as a protective film of the polarizing plate, no corner irregularity was generated, and for the liquid crystal display devices wherein the cellulose acylate films of Examples 1 to 3 were used, the corner irregularity was in acceptable level.

The invention claimed is:

1. A cellulose acylate film comprising a retardation developing agent consisting of a rod-shaped compound, wherein the in-plane retardation (Re) is in the range of 50 to 100 nm, the retardation (Rth) in the thickness direction is in the range of 130 to 250 nm, and the thickness is in the range of 40 to 90 m, wherein the rod-shaped compound is a compound represented by Formula (2), Formula (2)

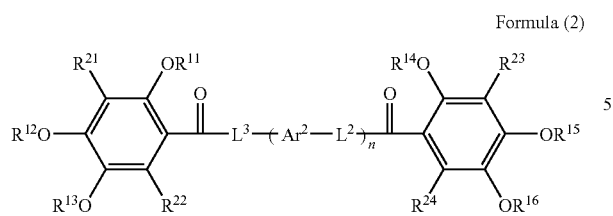

wherein, $R^{11}, R^{12}, R^{13}, R^{14}, R^{15}, R^{16}, R^{21}, R^{22}, R^{23}$ and $R^{24}$ are each independently a hydrogen atom or a substituent, $Ar^2$ is an arylene group or an aromatic heterocyclic ring, and $L^2$ and $L^3$ are each independently a single bond or a divalent linking group, n is an integer of 3 or greater, and $Ar^2$ and $L^2$ may be the same as or different from each other, respectively.

2. The cellulose acylate film according to claim 1, wherein the film is stretched by 10% or more in the slow axis direction of the film or in the direction perpendicular to the slow axis.

3. The cellulose acylate film according to claim 1, wherein the cellulose acylate film satisfies the following numerical formulas (VI-a), (VI-b) and (IV):

$$2.0 \leq DS2+DS3+DS6 \leq 3.0 \quad \text{(VI-a)}$$

$$DS6/(DS2+DS3+DS6) \geq 0.315; \quad \text{(VI-b)}$$

and $$1.0 \leq D(MD)/D(TD) \leq 3.0 \quad \text{(VI)}$$

when DS2 represents the degree of substitution of a hydroxyl group by an acyl group at the 2-position of a glucose unit in the cellulose acylate film, DS3 represents the degree of substitution of a hydroxyl group by an acyl group at 3-position and DS6 represents the degree of substitution of a hydroxyl group by an acyl group at 6-position, D(MD) represents the thermal expansion coefficient of the cellulose acylate film in the MD direction, and D(TD) represents the thermal expansion coefficient of the cellulose acylate film in the TD direction.

4. The cellulose acylate film according to claim 1, wherein the cellulose acylate film contains at least one of a plasticizer, an ultraviolet absorbent and a peel promoting agent.

5. The cellulose acylate film according to claim 1, wherein the cellulose acylate film was subjected to uniaxial stretching, simultaneous biaxial stretching or sequential biaxial stretching.

6. A polarizing plate, which comprises a polarizing film and a pair of protective films having the polarizing film disposed in between, wherein at least one sheet of the protective films is the cellulose acylate film according to claim 1.

7. A liquid crystal display device, which comprises the cellulose acylate film according to claim 1.

8. An OCB or VA mode liquid crystal display device, which comprises a liquid crystal cell and a pair of polarizing plates, wherein one of said pair of polarizing plates is disposed on each side of the liquid crystal cell, wherein at least one of the pair of polarizing plates is the polarizing plate according to claim 6.

9. A VA mode liquid crystal display device, which comprises the polarizing plate according to claim 6 on a backlight side.

* * * * *